(12) United States Patent
Kawakami

(10) Patent No.: US 7,778,927 B2
(45) Date of Patent: Aug. 17, 2010

(54) CONTENTS REPRODUCING DEVICE, CONTENTS PROCESSING DEVICE, CONTENTS DISTRIBUTION SERVER, CONTENTS REPRODUCING METHOD, CONTENTS PROCESSING METHOD, AND PROGRAM

(75) Inventor: Takashi Kawakami, Tokyo (JP)

(73) Assignee: Sony Corporation, Tokyo (JP)

( * ) Notice: Subject to any disclaimer, the term of this patent is extended or adjusted under 35 U.S.C. 154(b) by 1183 days.

(21) Appl. No.: 10/567,642

(22) PCT Filed: Jul. 21, 2005

(86) PCT No.: PCT/JP2005/013407

§ 371 (c)(1), (2), (4) Date: Feb. 9, 2006

(87) PCT Pub. No.: WO2006/009215

PCT Pub. Date: Jan. 26, 2006

(65) Prior Publication Data

US 2008/0167954 A1      Jul. 10, 2008

(30) Foreign Application Priority Data

Jul. 21, 2004   (JP)   ............................. 2004-238929

(51) Int. Cl.
*G06F 21/00*   (2006.01)
(52) U.S. Cl. ...................................................... 705/59
(58) Field of Classification Search .................... 705/59
See application file for complete search history.

(56) References Cited

U.S. PATENT DOCUMENTS 6,170,060 B1*   1/2001   Mott et al. .................... 726/29

2002/0023121 A1*   2/2002   Sugiyama et al. ........... 709/201
2002/0085721 A1*   7/2002   Saneto et al. ................ 380/277

(Continued)

FOREIGN PATENT DOCUMENTS

EP        1594028 A2 *   11/2005

(Continued)

OTHER PUBLICATIONS

Rosenblatt et. al. Digital Rights Management Business and Technology. 2002. M&T Books. All pages.*

(Continued)

*Primary Examiner*—Evens J Augustin
*Assistant Examiner*—Calvin K Cheung
(74) *Attorney, Agent, or Firm*—Oblon, Spivak, McClelland, Maier & Neustadt, L.L.P.

(57) ABSTRACT

A content reproduction apparatus includes a group ID storage section L for storing a group ID produced uniquely in a unit of a user; a radio transmitter section 524 for transmitting a content stored in a storage medium by radio communication; a radio receiver section 522 for receiving a content transmitted from a different apparatus by radio communication; a reproduction permission/inhibition decision section 242 for deciding whether or not the content can be reproduced; a reproduction execution section 244 for reproducing the content received by the radio receiver section; an ID recording section 539 for recording a content ID and the group ID into a first list; and a data communication section 220 for transmitting the content ID and the group ID recorded in the first list to a content distribution server.

15 Claims, 30 Drawing Sheets

U.S. PATENT DOCUMENTS

2004/0003253 A1* 1/2004 Ogino et al. ................ 713/176
2006/0008256 A1* 1/2006 Khedouri et al. ............ 386/124

FOREIGN PATENT DOCUMENTS

| EP | 1703409 A1 * | 9/2006 |
|----|----|----|
| JP | 2001-217846 | 8/2001 |
| JP | 2001-519562 | 10/2001 |
| JP | 2002-278935 | 9/2002 |

OTHER PUBLICATIONS

Kahney, Leander, "Feel Free Jack Into My IPod" [online], Wired News, 2003.

* cited by examiner

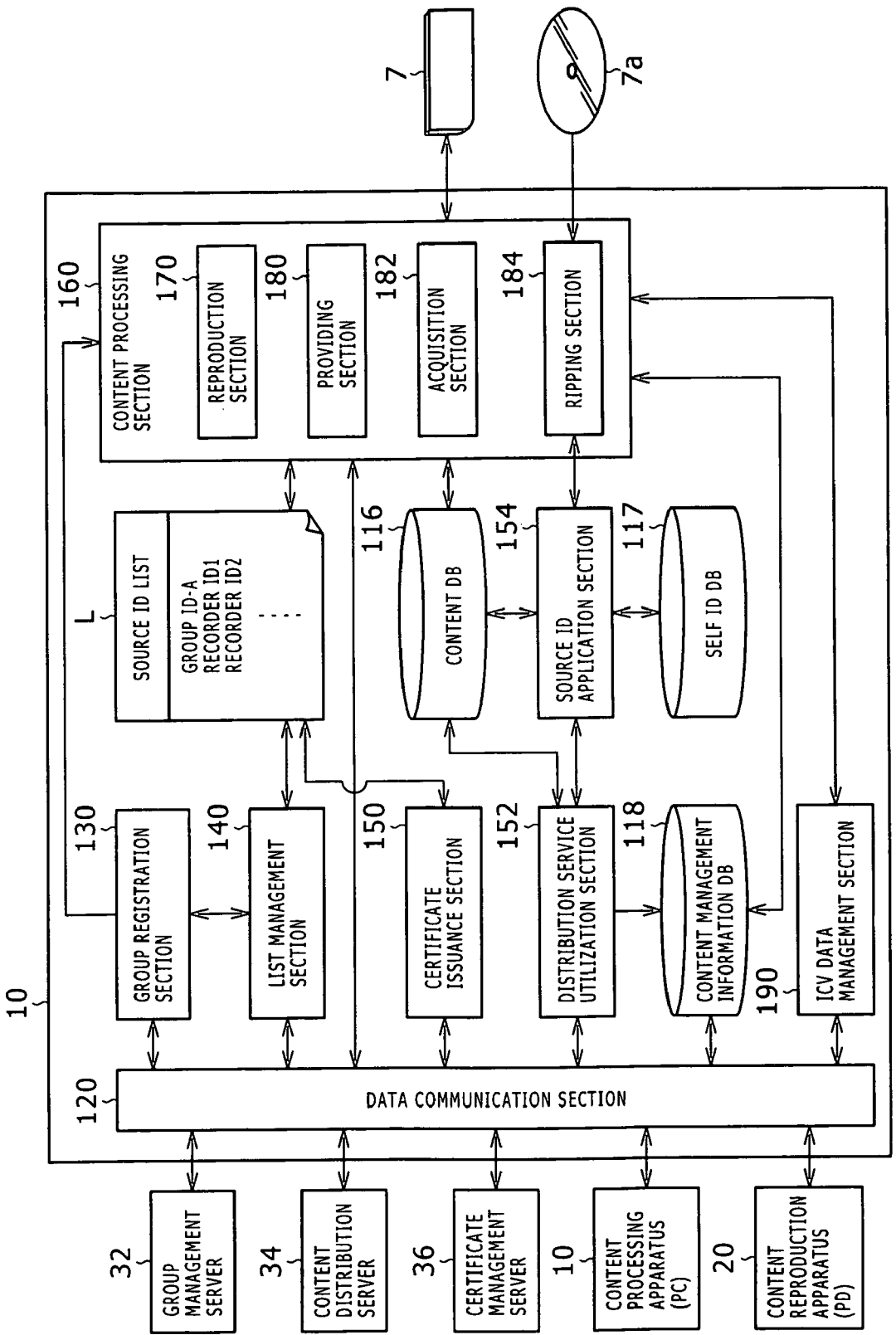

FIG. 12

| USER ID 3241 | CREDIT CARD NUMBER 3242 | LEAF ID 3243 | APPARATUS ID 3244 | RECORDER ID 3245 |
|---|---|---|---|---|
| Yamada Taro | XXX-XXXX | LEAF ID-A | TERMINAL ID1 | RECORDER ID1 |
| | | | TERMINAL ID2 | RECORDER ID2 |
| | | | DEVICE ID1 | — |
| | | | DEVICE ID2 | — |
| Suzuki Jiro | YYY-YYYY | LEAF ID-B | TERMINAL ID10 | RECORDER ID10 |
| | | | DEVICE ID12 | — |
| | | | DEVICE ID13 | — |
| ... | ... | ... | ... | ... |

FIG.23

| GROUP ID (5331) | CONTENT ID (5332) |
|---|---|
| 01234-0000A | 11111 |
| 01234-0000B | 22222 |
| 01234-0000C | 33333 |
| 01234-0000D | 44444 |
| ⋮ | ⋮ |

FIG.26

| GROUP ID 5671 | RELIABILITY INFORMATION 5672 |
|---|---|
| 01234-0000A | 105 |
| 01234-0000B | 30 |
| 01234-0000C | 0 |
| 01234-0000D | 120 |
| ⋮ | ⋮ |

CONTENTS REPRODUCING DEVICE, CONTENTS PROCESSING DEVICE, CONTENTS DISTRIBUTION SERVER, CONTENTS REPRODUCING METHOD, CONTENTS PROCESSING METHOD, AND PROGRAM

TECHNICAL FIELD

This invention relates to a content reproduction apparatus, a content processing apparatus, a content distribution server, a content reproduction method, a content processing method and a program.

BACKGROUND ART

In recent years, portable players such as WALKMAN (Registered Trademark of Sony Corporation) which allow a user to enjoy music and so forth readily in a hand-free fashion have been spread widely. Also a portable player has been proposed which is configured so as to be more convenient in carrying by adopting wireless connection between the body and a pair of headphones of the portable player (for example, Japanese Patent Laid-Open No. Hei 7-143587).

A wireless portable player is a reproduction apparatus which makes use of a radio communication system to transmit and receive music data between the body and the headphones. Where music data are transmitted and received by a radio communication system, for example, music data are transmitted from the body by radio communication and received and reproduced by the headphones. Music can be enjoyed with the body placed in a bag or the like and with the headphones secured to the head, and the user is not disturbed by a cable, which is convenient to the user.

However, in a case wherein a different user who has a similar wireless portable player is in the proximity of the user, music data transmitted from the body may be received by the headphones of the different user. If the different user receiving the data records the data illegally and then distributes the data to another different user, then this gives rise to a problem in regard to the copyright.

Incidentally, digital contents such as music contents recently suffer from increasing illegal distribution and exchange of contents without a license of the copyright together with popularization of the Internet and increase in speed of operation and capacity of a PC (Personal Computer) and so forth. Therefore, in order to prevent such illegal acts as just described, a copyright management system which applies restrictions to distribution and utilization of contents is being spread.

Where the copyright management system is used, such a situation that data transmitted from the body of a wireless portable player are received and reproduced by the headphones of another wireless portable player as described above can be prevented.

However, there is a problem that, as a result of restriction to distribution and utilization of contents, an essential pleasure of music that the music is shared with many and unspecific persons is limited. Also there is another problem that a content provider is less likely to spread the music widely.

DISCLOSURE OF THE INVENTION

Therefore, the present invention has been made in view of such problems as described above, and it is an object of the present invention to provide a novel and improved content reproduction apparatus, content processing apparatus, content distribution server, content reproduction method, content processing method and program by which a content in which a content ID and a user identification number are included is transmitted and received by radio communication so that the content is shared legally by many and unspecific persons and can be spread widely and in safety.

In order to solve the subject described above, according to an aspect of the present invention, there is provided a content reproduction apparatus, including a group ID storage section for storing a group ID produced uniquely in a unit of a user when the content reproduction apparatus is registered in a unit of a user into a management server; a radio transmitter section for transmitting a content stored in a content storage section to a different apparatus by radio communication; a radio receiver section for receiving a content transmitted from the different apparatus by radio communication; a reproduction permission/inhibition decision section for deciding, based on a group ID added to the content received by the radio receiver section and the group ID stored in the group ID storage section, whether or not the content received by the radio receiver section can be reproduced; a reproduction execution section for reproducing the content received by the radio receiver section when the reproduction permission/inhibition decision section decides that the content can be reproduced; an ID recording section for recording a content ID corresponding to the content reproduced by the reproduction execution section and the group ID added to the content into an ID storage section; and a data communication section for transmitting, where a content distribution server which provides a download service of the content and the content reproduction apparatus are connected to each other directly/indirectly, the content ID and the group ID recorded in the ID storage section to the content distribution server.

With such a configuration as just described, it is possible to transmit and receive a content by radio communication between content reproduction apparatus and further to restrict reproduction of the received content based on the group ID. Here, the group ID is user identification information produced uniquely in a unit of a user and may include a code representative of a type of a content or a type of a content distribution service. For example, if such a configuration is adopted that users whose group IDs have the same service type are permitted to transmit and receive a content and reproduce a received content, then the content can be shared legally between the content reproduction apparatus.

Further, where the content ID and the group ID of a content received from a different apparatus and reproduced are stored, information of the content can be transmitted to the content distribution server. For example, it is possible to transmit the stored content ID to the server to purchase and download a content corresponding to the content ID. At this time, since also the group ID can be transmitted together with the content ID, the server can recognize from the group ID unique to the user from which user the content has been transmitted.

The content reproduction apparatus may be configured such that it is composed of a body section and a headphones section, and the body section includes the radio transmitter section, the ID recording section and the data communication section while the headphones section includes the radio receiver section, the reproduction permission/inhibition section and the reproduction execution section.

With such a configuration as just described, it becomes possible to form the body and the headphones as apparatus separate from each other. For example, the body can be placed in a bag while the pair of headphones is secured to the head to listen to a reproduced content. Although the content reproduction apparatus may be configured such that the body and the headphones are connected to each other by means of a wire to transmit and receive a content therebetween, where the body and the headphones can communicate by radio with each other, the user is not disturbed by any cable, which is convenient for the user to carry the content reproduction apparatus.

The content reproduction apparatus may further include a reproduction permission information setting section for applying reproduction permission information for permitting reproduction of the content to be transmitted from the radio transmitter section to the content. The reproduction permission/inhibition decision section may decide whether or not the content can be reproduced based on the reproduction permission information applied to the content received by the radio receiver section. With the configurations, reproduction of a content transmitted can be restricted.

The content reproduction apparatus may further include a display control section for outputting, when the radio receiver section receives a content transmitted from the different apparatus by radio communication, that the content is received to a display apparatus. With the configuration, when a content is received, it is possible to notify the user who owns the content reproduction apparatus that a content is received.

The content reproduction apparatus may further include a reproduction control section for controlling, when the radio receiver section receives a content transmitted from the different apparatus by radio communication, the reproduction execution section to interrupt reproduction of a content stored in a storage medium provided in the content reproduction apparatus and reproduce the content transmitted from the different apparatus by radio communication.

With such a configuration as just described, even while a content is being reproduced, if a different content is received from a different apparatus, then it is possible to interrupt the reproduction of the content being reproduced and reproduce the received content.

The reproduction control section may control, when the radio receiver section receives a content transmitted from the different apparatus by radio communication and reliability information included in the content has a value higher than a predetermined value, the reproduction control section to interrupt the reproduction of the content stored in the storage medium provided in the content reproduction apparatus and reproduce the content transmitted from the different apparatus by radio communication.

With such a configuration as just described, if the reliability of the received content has a value higher than the particular value, then it is possible to interrupt reproduction of a content being currently reproduced and reproduce the received content. Here, the reliability is a degree representing how much the user who owns the content reproduction apparatus having transmitted the content is supported from other users, and the reliability is information applied to and transmitted together with the content.

Alternatively, the reproduction control section may control, when the radio receiver section receives a content transmitted from the different apparatus by radio communication and the group ID included in the content and the group ID provided from a server for providing the download service and having a high degree of reliability coincide with each other, the reproduction control section to interrupt the reproduction of the content stored in the storage medium provided in the content reproduction apparatus and reproduce the content transmitted from the different apparatus by radio communication.

With such a configuration as just described, it is possible to reproduce a content only of a user having a group ID having high reliability. Since a list of group IDs having high reliability is provided from the server, the content reproduction apparatus can decide whether or not the user of the group ID included in the received content has high reliability.

In order to solve the subject described above, according to another aspect of the present invention, there is provided a content processing apparatus, including a connection decision section for deciding connection with a content reproduction apparatus which stores a group ID produced uniquely in a unit of a user when the content processing apparatus is registered in a unit of a user into a management server; a first communication section for receiving, when the connection is decided by the connection decision section, a content ID and the group ID stored in the content reproduction apparatus; a second communication section for transmitting the content ID and the group ID to a content distribution server which provides a download service of a content; and a content storage section for storing a content corresponding to the content ID transmitted from the content distribution server and received through the second communication section; the contents stored in the content storage section being transmitted to the content reproduction apparatus through the first communication section.

With such a configuration as just described, it is possible to transmit data stored in the content reproduction apparatus to the content distribution server or transmit data recorded in the content distribution server to the content reproduction apparatus. For example, even if the content reproduction apparatus is an apparatus which cannot be connected directly to the content distribution server, where the content processing apparatus is interposed, a content distributed from the content distribution server can be recorded and reproduced by the content reproduction apparatus.

The content processing apparatus may be configured such that the second communication section receives reliability information corresponding to the group ID from the content distribution server, and the first communication section transmits the reliability information received by the second communication section to the content reproduction apparatus. The content processing apparatus may be configured such that the second communication section receives a group ID having a high degree of reliability from the content distribution server, and the first communication section transmits the received group ID having a high degree of reliability to the content reproduction apparatus.

In order to solve the subject described hereinabove, according to a further aspect of the present invention, there is provided a content distribution server, including a content database in which content IDs and contents are stored in an associated relationship with each other; a reliability information database in which group IDs each produced uniquely in a unit of a user when a content reproduction apparatus is registered in a unit of a user into a management server and reliability information are stored in an associated relationship with each other; a data receiver section for receiving a content ID and a group ID stored in the content reproduction apparatus directly/indirectly; a content search section for searching for a content corresponding to the content ID; a reliability information updating section for updating, when a group ID and a content ID are received by the data receiver section, reliability information corresponding to the group ID; and a data transmitter section for transmitting the content searched out by the search section to the content reproduction apparatus directly/indirectly.

With such a configuration as just described, a content corresponding to a received content ID can be transmitted to the content reproduction apparatus. Further, it can be recognized from the group ID received together with the content ID by which user the content has been reproduced. Further, since the content is purchased through the user, it is possible to add points as reliability information to the user and manage the group ID and the reliability information in an associated relationship with each other.

The content distribution server may be configured such that the content search section searches, when the data receiver section receives the group ID, reliability information corresponding to the group ID, and the data transmitter section transmits the reliability information to the content reproduction apparatus directly/indirectly.

The content distribution server may further include a reward setting section for setting, in response to the reliability information, a reward to the corresponding group ID.

In order to solve the subject described hereinabove, according to a still further aspect of the present invention, there is provided a content reproduction controlling method for controlling a content reproduction apparatus to reproduce a content, including a group ID storage step of storing, into a group ID storage section, a group ID produced uniquely in a unit of a user when the content reproduction apparatus is registered in a unit of a user into a management server; a radio transmission step of transmitting a content stored in a content storage section to a different apparatus by radio communication; a radio reception step of receiving a content transmitted from the different apparatus by radio communication; a reproduction permission/inhibition decision step of deciding, based on a group ID added to the received content and the group ID stored in the group ID storage section, whether or not the received content can be reproduced; a reproduction execution step of reproducing the received content when it is decided at the reproduction permission/inhibition decision step that the content can be reproduced; an ID recording step of recording a content ID corresponding to the reproduced content and the group ID added to the content into an ID storage section; and a data communication step of transmitting, where a content distribution server which provides a download service of the content and the content reproduction apparatus are connected to each other directly/indirectly, the content ID and the group ID recorded in the ID storage section to the content distribution server.

In order to solve the subject described hereinabove, according to a yet further aspect of the present invention, there is provided a content processing method for controlling a content processing apparatus to process a content, including a connection decision step of deciding connection with a content reproduction apparatus which stores a group ID produced uniquely in a unit of a user when the content processing apparatus is registered in a unit of a user into a management server; a first communication step of receiving, when the connection to the content reproduction apparatus is decided, content ID and the group ID stored in the content reproduction apparatus; a second communication step of transmitting the content ID and the group ID to a content distribution server which provides a download service of a content; a content storage steps of storing a content corresponding to the content ID received from the content distribution server into a content storage section; and a transmission step of transmitting the stored contents to the content reproduction apparatus.

In order to solve the subject described hereinabove, according to a yet further aspect of the present invention, there is provided a computer program for causing a content reproduction apparatus to execute a group ID storage process of storing, into a group ID storage section, a group ID produced uniquely in a unit of a user when the content reproduction apparatus is registered in a unit of a user into a management server; a radio transmission process of transmitting a content stored in a content storage section to a different apparatus by radio communication; a radio reception process of receiving a content transmitted from the different apparatus by radio communication; a reproduction permission/inhibition decision process of deciding, based on a group ID added to the received content and the group ID stored in the group ID storage section, whether or not the received content can be reproduced; a reproduction execution process of reproducing the received content when it is decided at the reproduction permission/inhibition decision process that the content can be reproduced; an ID recording process of recording a content ID corresponding to the reproduced content and the group ID added to the content into an ID storage section; and a data communication process of transmitting, where a content distribution server which provides a download service of the content and the content reproduction apparatus are connected to each other directly/indirectly, the content ID and the group ID recorded in the ID storage section to the content distribution server.

In order to solve the subject described hereinabove, according to a yet further aspect of the present invention, there is provided a computer program for causing a content processing apparatus to execute a connection decision process of deciding connection with a content reproduction apparatus which stores a group ID produced uniquely in a unit of a user when the content processing apparatus is registered in a unit of a user into a management server; a first communication process of receiving, when the connection to the content reproduction apparatus is decided, content ID and the group ID stored in the content reproduction apparatus; a second communication process of transmitting the content ID and the group ID to a content distribution server which provides a download service of a content; a content storage steps of storing a content corresponding to the content ID received from the content distribution server into a content storage section; and a transmission process of transmitting the stored contents to the content reproduction apparatus.

As described above, according to the present invention, a content in which a content ID and a user identification number are included is transmitted and received by radio communication so that the content is shared legally by many and unspecific persons and can be spread widely and in safety.

BRIEF DESCRIPTION OF THE DRAWINGS

FIG. 5 is a block diagram schematically showing functions of the content processing apparatus according to the embodiment.

FIG. 12 is an explanatory view illustrating a data structure of a group registration database according to the embodiment.

FIG. 23 shows a data structure of a favorite list according to the embodiment.

FIG. 26 is a view illustrating a data structure of a reliability information database according to the embodiment.

MODE FOR CARRYING OUT THE INVENTION

Figure 1:
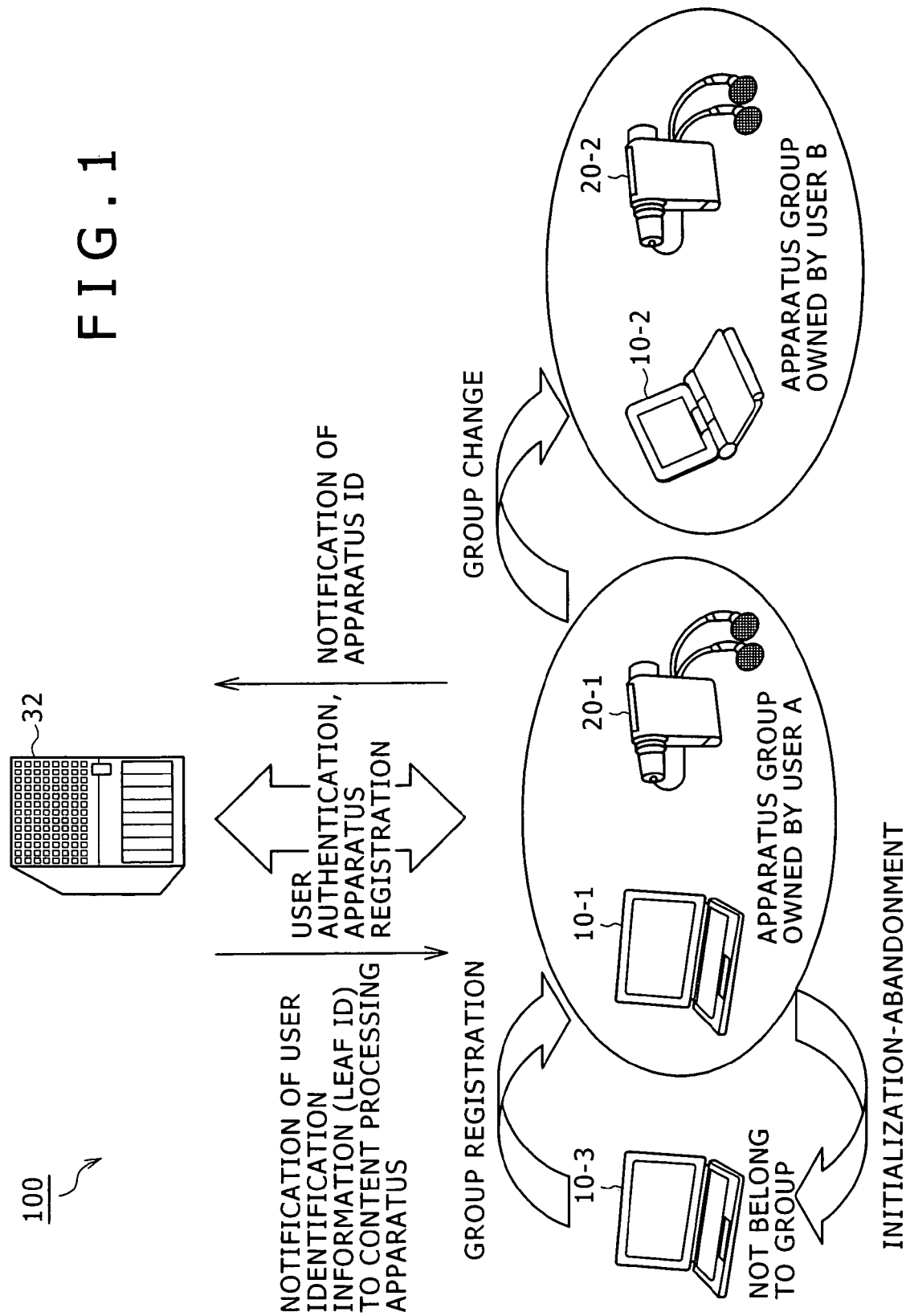
FIG. 1 is an explanatory view illustrating an outline of group registration of a content sharing system according to a first embodiment of the present invention.

In the following, preferred embodiments of the present invention are described in detail with reference to the accompanying drawings. It is to be noted that those components which have substantially same functional configurations are denoted by like reference characters and overlapping description of them is omitted herein.

First, an outline of a content sharing system ready for copyright management of the group management type according to the present invention is described.

The content sharing system according to the present embodiment is configured as a copyright management system for managing contents between a plurality of apparatus (content processing apparatus, content reproduction apparatus and so forth) to protect the copyright of the contents. In particular, the content sharing system restricts sharing of contents between apparatus owned by different users in order to prevent such illegal utilization of the contents as an act of mass distribution and so forth of contents through the Internet or the like.

On the other hand, the content sharing system is configured also as a system which implements a content sharing service by which contents can be shared freely to some degree between a plurality of apparatus owned by a same user (including not only a sole user but also a user group within a limited range such as members of a family, friends, colleagues and so forth: this similarly applies to the following expression).

In this manner, the content sharing system according to the present embodiment adopts a copyright management method (a copyright management scheme of "Group Management Type" hereinafter described) wherein, while copyright management is performed, sharing of contents is acknowledged within a range of private utilization such that the convenience and the degree of freedom in content sharing between a plurality of apparatus owned by a same user can be enhanced.

As described hereinabove, in the conventional copyright management system ready only for the "check-in check-out method" complying with the SDMI, illegal utilization of contents is restricted by restricting the copy number (number of times of check-in and check-out) of a content in a "unit of a content" based on a license which is right information which prescribes utilization authority of the content. In such a system as just described, since a copyright management process must be performed every time a content is copied (check-in check-out) between a plurality of content processing apparatus, the content sharing system has a drawback in that the system configuration is complicated and the processing speed is low and besides the degree of freedom in content utilization within a range of private utilization is low, resulting in lack of the convenience. Further, in such a conventional copyright management system of the check-in check-out type as described above, the user must always be conscious of the copy source or the number of times of copying of a content when it utilizes the system. Further, "prevention of copying of a content to an apparatus owned by another person" which is the original object of the copyright management system is not implemented.

In contrast, the content sharing system according to the present embodiment is characterized in that it can execute copyright management not only of the conventional check-in check-out type but also of the group management type. In the copyright management system of the group management type, such copyright management that the management unit in content utilization is a "content providing source (source)" unit (particularly, a "unit of a user by whom a content is owned first" or a "unit of an apparatus by which a content is produced") and reproduction of a content by each apparatus is permitted/inhibited in response to a providing source of the content.

More particularly, in the copyright management system of the group management type, a plurality of apparatus owned by each user are group-registered in a unit of a user into a group management server, and each of the apparatus registered as a group controls reproduction of a content based on a source ID representative of a providing source of the content and a source ID list. By the control, a content of the same providing source can be copied and reproduced between and by the apparatus registered in the apparatus group of the same user.

It is to be noted that the content may be an arbitrary content such as a sound (Audio) content of music, a lecture, or a radio program, an image (Video) content formed from a still picture or pictures or moving pictures which form a movie, a television program, a video program, a photograph, a painting, a chart or the like, an electronic book (E-book), a game or software. In the following description, a music content, particularly a music content distributed from a distribution server or ripped from a music CD, is described as an example of a content. However, the present invention is not limited to such an example as just mentioned.

Now, an outline of group registration into the content sharing system 100 according to the present embodiment for performing such copyright management of the group management type as described above is described with reference to FIG. 1. It is to be noted that FIG. 1 is an explanatory view showing an outline of group registration of the content sharing system 100 according to the present embodiment.

As shown in FIG. 1, content processing apparatus (PC) 10-1 and 10-2 and content reproduction apparatus (PD) 20-1 and 20-2 are grouped, for example, into an apparatus group (content processing apparatus 10-1 and content reproduction apparatus 20-1) owned by a user A and another apparatus group (content processing apparatus 10-2 and content reproduction apparatus 20-2) owned by another user B. Such grouping of the apparatus is performed by registering the content processing apparatus 10 and the content reproduction apparatus 20 in a unit of a user as a group into a group management server 32.

The group registration is described particularly taking the content processing apparatus 10-1 owned by the user A as an example. First, the user A would use the content processing apparatus 10-1 owned by the user A itself to access the group management server 32 to perform a user authentication process and transmit an apparatus ID (for example, a terminal ID) of the content processing apparatus 10-1 to the group management server 32. Then, the group management server 32 stores the apparatus ID of the content processing apparatus 10-1 in a coordinated relationship with the user A and group-registers the apparatus ID of the content processing apparatus 10-1. Further, the group management server 32 transmits user identification information (for example, a leaf ID hereinafter described) representative of the user A to the content processing apparatus 10-1, and the content processing apparatus 10-1 stores the received user identification into a storage section of the content processing apparatus 10-1 itself. Similarly, also the other content processing apparatus 10 is group-registered. Although the group registration of each of the content reproduction apparatus (PD) 20 is performed through a content processing apparatus (PC) 10, details are hereinafter described.

In such group registration, one apparatus (content processing apparatus 10 and content reproduction apparatus 20) can be registered only into an apparatus group of a single user but cannot be registered into apparatus groups of different users at a time. Accordingly, if the owner of the content processing apparatus 10-2 is changed from the user A to the user B, it is necessary to change the group registration of the content processing apparatus 10-2, that is, to perform registration cancellation from the apparatus group of the user A and re-registration into the apparatus group of the user B.

Further, for example, if the user A newly purchases a content processing apparatus 10-3, since the content processing apparatus 10-3 is in a state wherein it does not belong to any group, the content processing apparatus 10-3 can be group-registered into the apparatus group of the user A. On the other hand, also it is possible to cancel the group registration of the content processing apparatus 10-1 registered already in the apparatus group of the user A so that it does not belong to any group.

In this manner, in the content sharing system 100, individual apparatus are group-registered in a unit of a user who owns the apparatus into the group management server 32. As a result, between apparatus registered in an apparatus group of the same user, a content can be shared freely. On the other hand, a content cannot be shared between apparatus which are registered in apparatus groups of different users.

Here, an outline of a management technique of such content sharing as described above is described with reference to FIG. 2. It is to be noted that FIG. 2 is a block diagram showing principal components of the content sharing system 100 according to the present embodiment.

Figure 2:
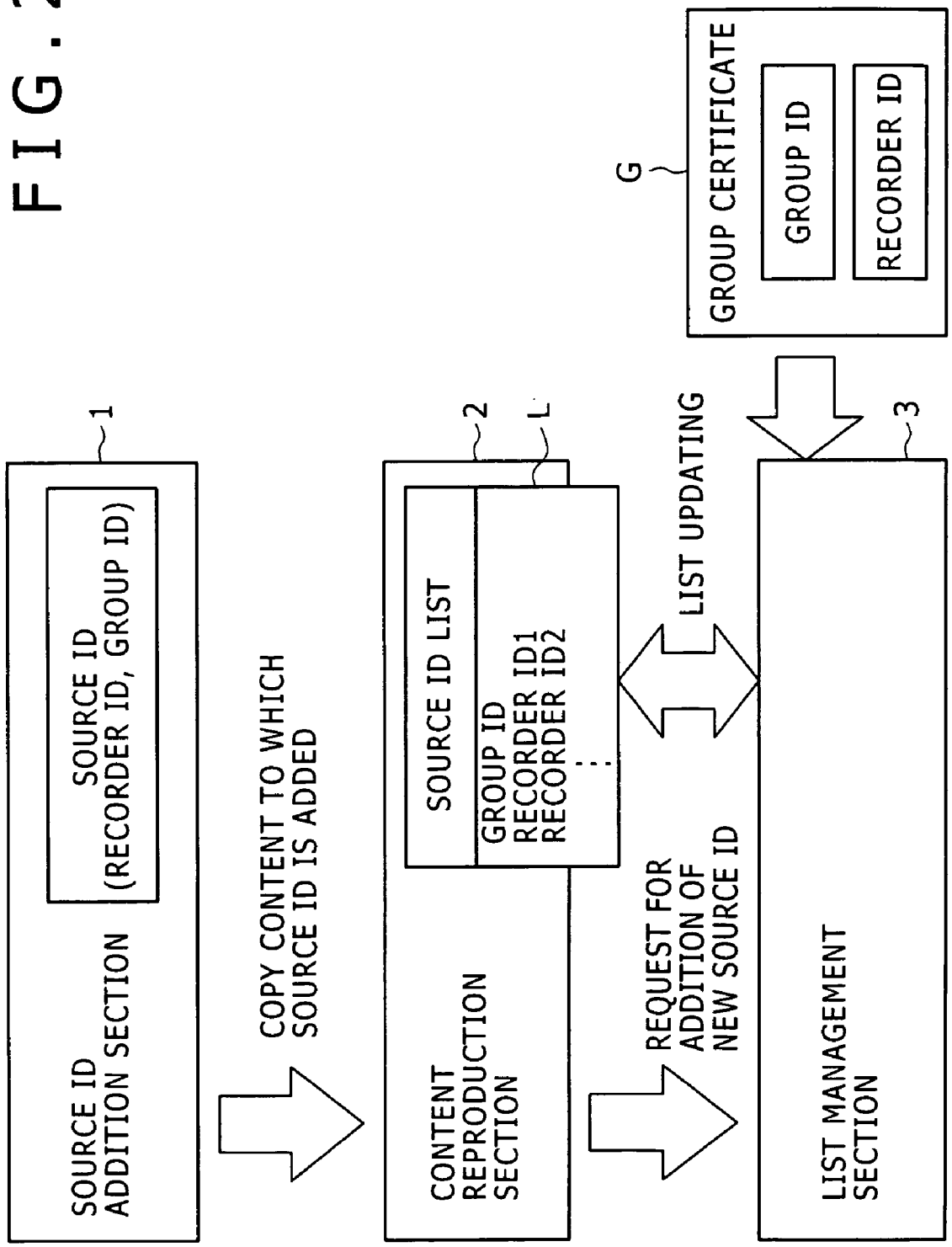
FIG. 2 is a block diagram showing principal components of the content sharing system of the embodiment.

As shown in FIG. 2, the content sharing system 100 according to the present embodiment includes a source ID addition section 1, a content reproduction section 2 and a list management section 3 as principal components thereof.

The source ID addition section 1 is provided, for example, in a content processing apparatus 10 or the like and has a function of applying, to a content, a source ID representative of a providing source of the content. It is to be noted that "to apply a source ID to a content" signifies to coordinate a source ID with a content, and this includes, for example, a process of adding data of a source ID into a file (content file) which includes content data, another process of coordinating the content file and a file including the data of the source ID with each other, and so forth.

Further, the "providing source of a content" signifies the source on the personal user level of a content shared in the content sharing system 100. In particular, the providing source of a content is, for example, (1) a user who utilizes a content distribution service to acquire (purchase or the like) the content, (2) a content processing apparatus 10 which produces the content by ripping, self recording or the like. The source ID mentioned hereinabove is an identifier applied uniquely to each of such content providing sources. A providing source of a content which is distributed in the system can be specified by applying the source ID to the content.

In the present embodiment, for example, a recorder ID and a group ID are used each as a source ID. The recorder ID is a source ID used where a content processing apparatus 10 is a providing source of a content, and the group ID is a source ID used where a user is a providing source of a content.

The recorder ID is an identifier applied uniquely in a unit of a content processing apparatus 10 (PC or the like) which has a content ripping function. The recorder ID is produced by a content processing apparatus 10 having a ripping function mentioned hereinabove based on an apparatus ID or the like of the content processing apparatus 10 and is retained safely in the content processing apparatus 10. When a content is ripped from a removable recording medium such as a music CD, the content processing apparatus 10 applies the recorder ID of the content processing apparatus 10 itself to the ripped content (hereinafter referred to as "ripped content"). Accordingly, a content processing apparatus 10 of a producing source of a ripped content (accordingly, a providing source of the content) can be specified from such a recorder ID as just described.

Meanwhile, the group ID is an identifier applied uniquely in a unit of a user who owns a content processing apparatus 10 and/or a content reproduction apparatus 20. In particular, the group ID is applied in a unit of a user account of a content sharing service provided by the content sharing system 100 according to the present embodiment. An apparatus group to which a content processing apparatus 10 or a content reproduction apparatus 20 and an owner of the apparatus belong can be identified from such a group ID as just described.

In the present embodiment, the group ID is produced based on a leaf ID, for example, upon group registration of a content processing apparatus 10 or upon reception of a distribution content by the content processing apparatus 10. The leaf ID is an identifier applied in a unit of a user and is produced, for example, upon user registration into the group management server 32 by the group management server 32. Such a leaf ID as just described is formed as an example of user identification information and is conveyed from the group management server 32 to the content processing apparatus 10 upon group registration of or upon content distribution to each apparatus.

The content processing apparatus 10 produces a group ID based on a leaf ID and a service ID received from the group management server 32. The service ID is an ID unique in a unit of a content distribution service or a ripping content sharing service implemented by the content sharing system 100. Here, the content distribution service is a service of distributing a content from the content distribution server to a content processing apparatus 10. Meanwhile, the ripping content sharing service is a service of performing the group registration described hereinabove to make it possible to share a ripped content between a plurality of content processing apparatus 10 and content reproduction apparatus 20 owned by the same user.

For example, where the content distribution service and the ripped content sharing service are not managed separately from each other but a common service ID is used for both services, the service ID and the leaf ID are joined together in the following manner to produce one group ID.

"Group ID"="service ID"+"leaf ID"

On the other hand, where the content distribution service and the ripped content sharing service are managed separately from each other, a content distribution service ID unique in a unit of a ripped content sharing service and a ripped content sharing service ID unique in a unit of a ripped content sharing service are produced. Therefore, the service ID and the leaf ID of the services are joined together in the following manner to produce two group IDs corresponding to the two services.

"First group ID"="content distribution service ID"+"leaf ID"

"Second group ID"="ripped content sharing service ID"+"leaf ID"

The first group ID of the two IDs is applied to a distribution content, which is distributed from the content distribution server, in order to identify a user who purchases the distribution content. Meanwhile, the second group ID is used as a reference with which, when a recorder ID is to be added to a source ID list hereinafter described in order for a content processing apparatus 10 and a content reproduction apparatus 20 to share a ripped content therebetween, it is decided whether or not such addition should be permitted.

In the present embodiment, for example, the latter technique wherein a first group ID and a second group ID are produced is adopted. However, in the following description, the first group ID and the second group ID are not distinguished from each other but are both represented as group ID for the convenience of description.

Such a group ID as just mentioned is applied to a distribution content distributed from the content distribution server, for example, by the content processing apparatus 10. By applying a group ID to a distribution content in this manner, a user of a purchasing source of the distribution content (that is, a providing source of the content) can be identified.

As described above, a content to which a source ID (recorder ID, group ID) is applied by the source ID addition section 1 of the content processing apparatus 10 can be copied freely between the content processing apparatus 10 and the content reproduction apparatus 20. In other words, in the copyright management system of the group management type, upon copying of a content to which a source ID is applied (that is, a content of an object of copyright management), such a restriction process for the number of times of copying as is performed in the conventional copyright management system of the check-in check-out type is not performed at all.

The content reproduction section 2 is formed from a reproduction machine or reproduction software for a content or the like and provided in a content processing apparatus 10 or a content reproduction apparatus 20. The content reproduction section 2 has a source ID list L to which a source ID with regard to which reproduction is permitted by the content reproduction section is added. The source ID list L is provided for each content reproduction section 2, and in different content reproduction sections 2, the source IDs included in the source ID lists L of the content reproduction sections 2 are different from each other.

When a content to which the source ID described above is applied is to be reproduced, the content reproduction section 2 checks the source ID list L to enable/disable reproduction of the content. In particular, if the source ID applied to the content is included in the source ID list L, then the content can be reproduced, but if the source ID applied to the content is not included in the source ID list L, then the content cannot be reproduced. In this manner, the content reproduction section 2 controls reproduction of a content in a unit of a source ID, that is, in a unit of a content providing source.

Further, the content reproduction section 2 can issue a request for addition of a new source ID to the source ID list L included in the content reproduction section 2 thereof, for example, to the list management section 3. In particular, in order to reproduce a content to which a new source ID which is not included in the source ID list L held by the content reproduction section 2 itself is added, it is necessary for the content reproduction section 2 to add the new source ID to the source ID list L. The content reproduction section 2 issues a request for permission of addition of a new source ID to the list management section 3 which permits updating of the source ID list L.

The list management section 3 is provided, for example, in each content processing apparatus 10 and updates the source ID list L held in the content reproduction section 2. Here, the updating of the source ID list L is addition or deletion of a source ID to or from the source ID list L. The list management section 3 can add/delete a source ID to/from the source ID list L to enable/disable reproduction of a content to which the source ID is applied by the content reproduction section 2.

Such a list management section 3 as described above acquires a group certificate G which is sharing information by which a group ID and a recorder ID are coordinated with each other and updates the source ID list L based on such a group certificate G as just described. More particularly, where a group ID included in the group certificate G is same as a group ID included in the source ID list L, the list management section 3 adds a recorder ID included in the group certificate G to the source ID list L. Consequently, a recorder ID of a content processing apparatus 10 registered in an apparatus group of the same user can be added to the source ID list L to make it possible to reproduce a ripped content ripped by such a content processing apparatus 10 as just described.

As described above, in the content sharing system 100 according to the present embodiment, reproduction of a content by each of the content processing apparatus 10 and the content reproduction apparatus 20 is controlled by the source ID addition section 1, content reproduction section 2 and list management section 3 to manage the copyright of a content copied between the content processing apparatus 10. It is to be noted that, although the content sharing system 100 is configured such that it can execute not only copyright management of such a group management type as described above but also copyright management of the conventional check-in check-out type, details are hereinafter described.

Now, a general configuration of the content sharing system 100 according to the present embodiment is described with reference to FIG. 3. It is to be noted that FIG. 3 is a block diagram schematically showing a general configuration of the content sharing system 100 according to the present embodiment.

Figure 3:
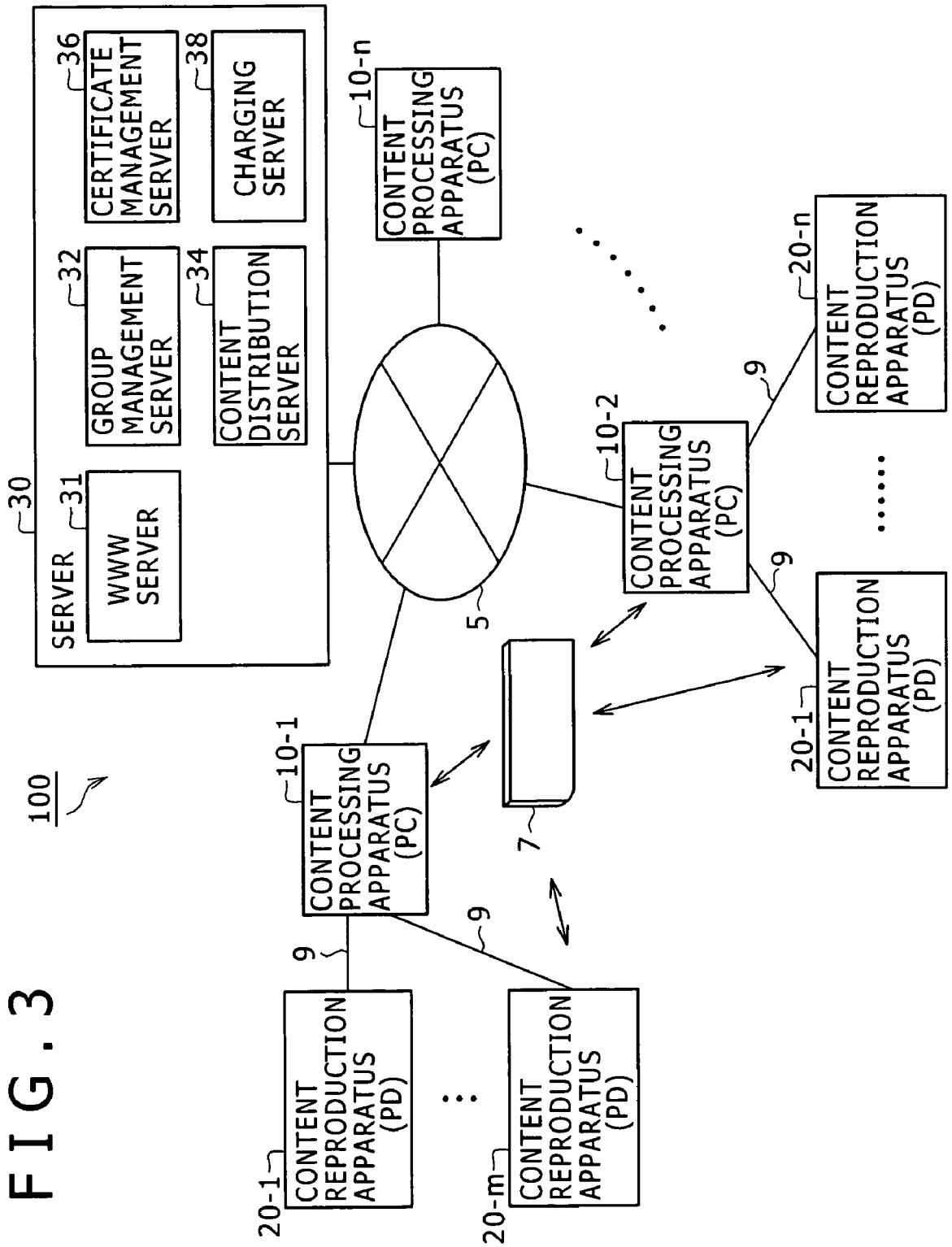
FIG. 3 is a block diagram schematically showing a general configuration of the content sharing system according to the embodiment.

As shown in FIG. 3, the content sharing system 100 according to the present embodiment includes a plurality of content processing apparatus 10-1, 10-2, . . . , 10-n (in the following description, any of them may be generally referred to as "content processing apparatus 10"), a plurality of content reproduction apparatus 20-1, 20-2, . . . , 20-m, 20-n (in the following description, any of them may be generally referred to as "content reproduction apparatus 20"), a server 30, a network 5 and a local line 9 which interconnect the apparatus mentioned, and a storage medium 7. The server 30 includes, for example, a WWW (World Wide Web) server 31, a group management server 32, a content distribution server 34, a certificate management server 36, a charging server 38 and so forth.

Each content processing apparatus 10 is an apparatus which can record and reproduce a content. More particularly, the content processing apparatus 10 is formed from a computer apparatus (which may be of the notebook type or of the desk top type) such as a personal computer (PC). However, the content processing apparatus 10 is not limited to any of such examples as just mentioned but may be any apparatus such as a PDA (Personal Digital Assistant), a game machine for home use, or an information appliance only if the apparatus has a communication function through the network 5.

The content processing apparatus 10 can connect for communication to the server 30, for example, through the network 5. The content processing apparatus 10 can install, for example, software for a content distribution service and software for a ripped content sharing service. Consequently, the content processing apparatus 10 can receive a content distributed from the content distribution server 34 and record the distribution content on a recording medium such as a storage apparatus or a storage medium 7.

Further, the content processing apparatus 10 can produce a content newly, for example, by self recording (self sound recording, image recording or the like), or ripping and record the content on the storage apparatus or the storage medium 7. It is to be noted that the self recording signifies to record images/sound and so forth picked up/collected by an image pickup apparatus/sound collection apparatus provided in the content processing apparatus 10 itself as video/audio digital data. Meanwhile, the ripping signifies to extract content data (sound data, image data or the like) of the digital type recorded on a recording medium such as a music CD, a video DVD, and a software CD-ROM, convert the content data into data of a file format which can be processed by a computer and record the data on the storage apparatus or the storage medium 7.

Each content processing apparatus 10 can compression-code the distribution content and the ripped content described above in accordance with a predetermined compression coding method such as the ATRAC3 (registered trademark of Sony Corporation) (Advanced Transform Acoustic Coding 3) method or the MP3 (MPEG Audio Layer-3) method, encrypt the content using an encryption method such as the DES (Data Encryption Standard) and record the encrypted content.

Further, the content processing apparatus 10 transmits and receives the distribution content or the ripped content to and from another content processing apparatus 10 or a content reproduction apparatus 20 through the network 5 or the local line 9 or can transfer the distribution content or ripped content through the storage medium 7. Consequently, a content can be shared between a plurality of content processing apparatus 10 and a plurality of content reproduction apparatus 20 through provision/acquisition of the content.

Further, the content processing apparatus 10 is group-registered into the group management server 32 connected thereto through the network 5. Further, the content processing apparatus 10 includes components which correspond, for example, to such source ID addition section 1, content reproduction section 2 and list management section 3 as described hereinabove. In this manner, the content processing apparatus 10 is configured so as to be ready for a copyright management system of the group management type described hereinabove. Furthermore, while the content processing apparatus 10 is configured so as to be ready, for example, also for a copyright management system of the conventional check-in check-out type, details are hereinafter described.

Each of the content reproduction apparatus 20 is a portable device (PD) which is a portable content reproduction apparatus. More particularly, the content reproduction apparatus 20 is formed, for example, from a portable audio player which includes a hard disk drive (HDD) having a storage capacity of several tens GB or the like. However, the content reproduction apparatus 20 is not limited to such an example as just described but may be any of various portable apparatus such as a portable video/audio player, a PDA, a portable telephone set and a PHS. Further, a storage medium in the content reproduction apparatus 20 or the storage medium 7 which can be loaded into the content reproduction apparatus 20 is not limited to a HDD but may be any recording medium which can be accessed at random such as an optical disk, a magneto-optical disk, a flash memory, a FeRAM or a magnetic memory. It is to be noted that the content reproduction apparatus 20 may be a machine only for reproduction of a content.

The content reproduction apparatus 20 can be locally connected to the content processing apparatus 10, for example, through the local line 9 and can communicate various kinds of data with the content processing apparatus 10. The local line 9 is formed from a wire cable such as such as a USB (Universal Serial Bus) cable or a SCSI (Small Computer System Interface) cable. It is to be noted that the content processing apparatus 10 and the content reproduction apparatus 20 may be configured for data communication with each other by ratio communication.

Any of such content reproduction apparatus 20 as described above can reproduce a content transferred from a content processing apparatus 10 through the local line 9 or a content provided by the storage medium 7.

Further, the content reproduction apparatus 20 is group-registered into the group management server 32 through the content processing apparatus 10. Further, the content reproduction apparatus 20 includes a configuration corresponding, for example, to the content reproduction section 2 described hereinabove. In this manner, the content reproduction apparatus 20 is configured so as to be ready for the copyright management method of the group management type described hereinabove. Further, the content reproduction apparatus 20 is ready also for the copyright management method of the check-in check-out type, and the group management type and the check-in check-out type can be changed over therebetween in response to setting by the content reproduction apparatus 20. However, details are hereinafter described.

The server 30 is formed from a computer apparatus which includes a server function or the like. The server 30 includes, for example, a WWW server 31, a group management server 32, a content distribution server 34, a certificate management server 36 and a charging server 38.

The WWW server 31 establishes communication with a content processing apparatus 10 which has connected thereto through a network to perform a user registration process, a user authentication process and so forth. When user authentication is completed, the WWW server 31 causes the content processing apparatus 10 to connect to the group management server 32 or the content distribution server 34.

The group management server 32 group-registers the content processing apparatus 10 and the content reproduction apparatus 20 in a unit of a user in response to a registration request from a content processing apparatus 10 owned by a user-registered user described hereinabove.

The content distribution server 34 is a server which provides a content distribution service and distributes, in response to a distribution request from a content processing apparatus 10 owned by the user, a content to the content processing apparatus 10 through the network 5. The content distribution server 34 is, for example, an EMD server which provides an electronic music distribution (EMD) service or the like. The content distribution server 34 compression-codes a music content of an object of distribution in accordance with a compression coding method such as the ATRAC3 method or the MP3 method, encrypts the coded music content in accordance with an encryption method such as the DES and distributes the encrypted music content to the content processing apparatus 10. Further, the content distribution server 34 encrypts a content key for decrypting the distribution content to the content processing apparatus 10 together with the encrypted distribution content.

The certificate management server 36 acquires and manages a group certificate G issued by each content processing apparatus 10 and distributes the group certificate G to the content processing apparatus 10 which belong to the same apparatus group. Consequently, the content processing apparatus 10 can add a recorder ID of any other content processing apparatus 10 belonging to the same apparatus group and share the ripped content.

The charging server 38 performs a charging process for a user who purchases a content in response to distribution of the content by the content distribution server 34 described hereinabove.

The WWW server 31, group management server 32, content distribution server 34, certificate management server 36 and charging server 38 may entirely or partly be formed integrally as hardware or may be formed from individually different server apparatus.

The network 5 is a communication line network which interconnects the content processing apparatus 10 and the server 30 for bidirectional communication. The network 5 is formed from a public network such as the Internet, a telephone network or a satellite communication network or a dedicated network such as a WAN, a LAN or an IP-VPN and may be any of a wire network and a radio network.

Further, such a network 5 as described above includes a private network. The private network is a network which interconnects a plurality of content processing apparatus 10 among which a content is shared within a private use as viewed from a point of view of copyright management. A particular example of such a private network as just mentioned may be, for example, a network which interconnects a plurality of content processing apparatus 10 used by the same user, a home network used in the same home, a LAN which interconnects a plurality of content processing apparatus 10 used within a limited group (company, friends or the like) of a small scale, or the like.

The storage medium 7 is a removable medium which can store various kinds of data such as contents, group certificates G and programs and may be any of various optical disks such as a DVD-R, a DVD-WR, DVD-RAM, a CD-R, a CD-RW, and a magneto-optical disk, magnetic disks such as a flexible disk and a hard disk, and various semiconductor memories. It is to be noted that the storage medium 7 may be a recording medium with a copyright management function which, for example, uses a cryptographic key or the like to limit copying, reproduction and so forth of a content.

The storage medium 7 functions as a content providing/acquiring medium between the content processing apparatus 10. For example, if the storage medium 7 in which a content is written by the content processing apparatus 10-1 is loaded into the content processing apparatus 10-2 so that the content may be read out, then the content can be provided from the content processing apparatus 10-1 to the content processing apparatus 10-2. Further, the content processing apparatus 10-1 can provide/acquire a content to and from a content reproduction apparatus 20, which cannot be connected to the network 5, through the storage medium 7. Further, the storage medium 7 functions also as a providing/acquiring medium of a group certificate G between the content processing apparatus 10. Furthermore, the storage medium 7 can be inserted into a content selling terminal (not shown) provided at a sales situation or the like and store and provide a content purchased in response to a user operation to a content processing apparatus 10.

Now, a configuration of a content processing apparatus (PC) 10 according to the present embodiment is described in detail.

First, a hardware configuration of a content processing apparatus 10 according to the present embodiment is described with reference to FIG. 4. It is to be noted that FIG. 4 is a block diagram schematically showing an example of a hardware configuration of the content processing apparatus 10 according to the present embodiment.

Figure 4:
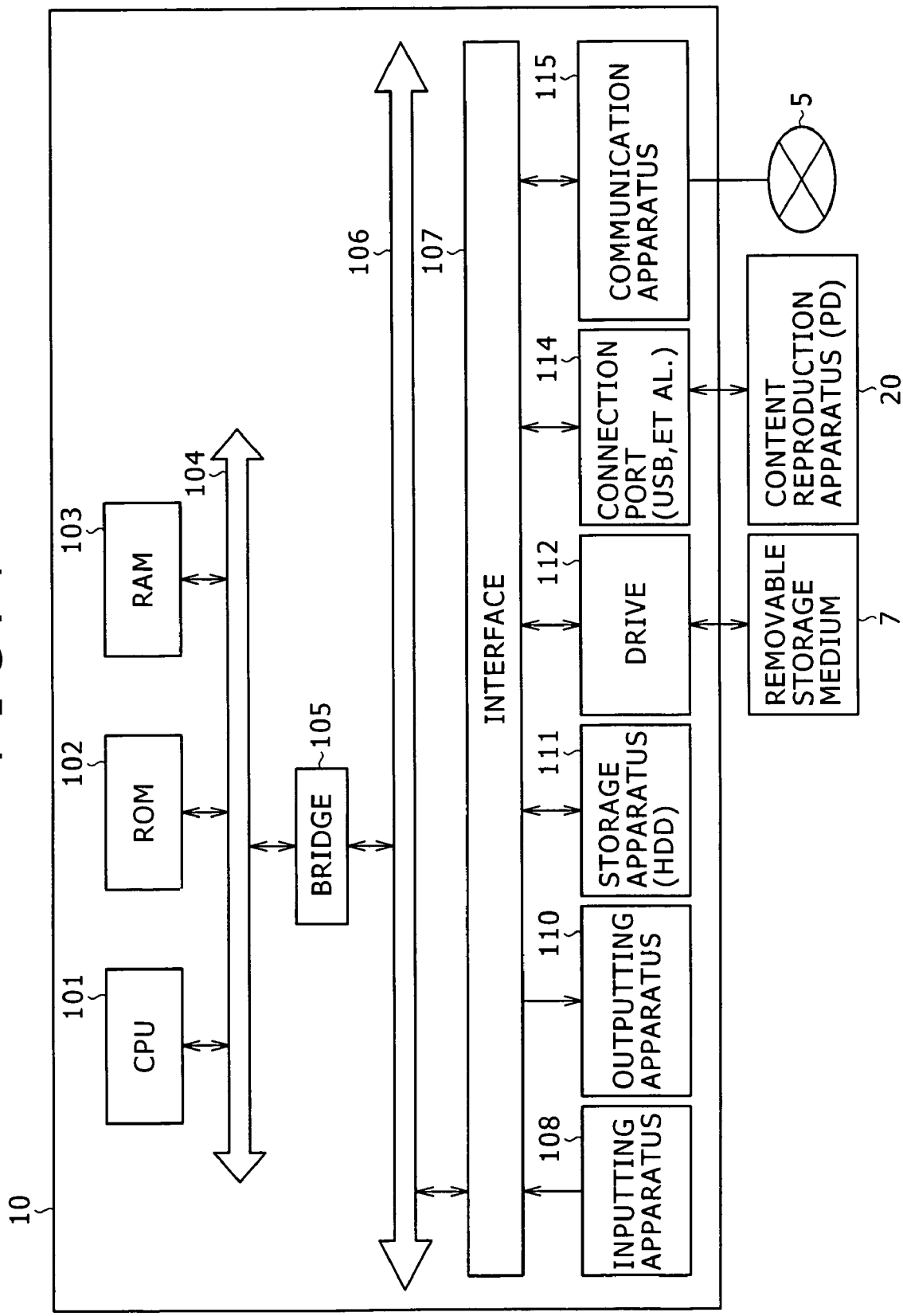
FIG. 4 is a block diagram schematically showing an example of a hardware configuration of a content processing apparatus according to the embodiment.

As shown in FIG. 4, the content processing apparatus 10 includes a CPU (Central Processing Unit) 101, a ROM (Read Only Memory) 102, a RAM (Random Access Memory) 103, a host bus 104, a bridge 105, an external bus 106, an interface 107, an inputting apparatus 108, an outputting apparatus 110, a storage apparatus (HDD) 111, a drive 112, a connection port 114, and a communication apparatus 115.

The CPU 101 functions as an arithmetic operation processing apparatus and a control apparatus and operates in accordance with the programs to control the components in the content processing apparatus 10. The ROM 102 stores programs, arithmetic operation parameters and so forth to be used by the CPU 101. The RAM 103 temporarily stores a program to be used for execution by the CPU 101, parameters which vary suitably during the execution and so forth. The CPU 101, ROM 102 and RAM 103 are connected to each other by the host bus 104 formed from a CPU bus or the like.

The host bus 104 is connected to the external bus 106 such as a PCI (Peripheral Component Interconnect/Interface) bus or the like through the bridge 105.

The inputting apparatus 108 is formed from inputting elements such as a mouse, a keyboard, a touch panel, buttons, switches and levers, an input control circuit for producing and outputting an input signal to the CPU 101, and so forth. The user of the content processing apparatus 10 can operate the inputting apparatus 108 to input various data to the content processing apparatus 10 and issue an instruction of a processing operation to the content processing apparatus 10.

The outputting apparatus 110 is formed from a display apparatus such as a CRT (Cathode Ray Tube) display apparatus, a liquid crystal display (LCD) apparatus, lamps or the like and a sound outputting apparatus such as a speaker. The outputting apparatus 110 outputs, for example, a reproduced content. In particular, the display apparatus displays various kinds of information such as produced video data in the form of a text or an image. Meanwhile, the sound outputting apparatus emits sound of reproduced sound data or the like.

The storage apparatus 111 is an apparatus for data storage formed as an example of a storage section of the content processing apparatus 10 according to the present embodiment and is formed from, for example, a HDD (Hard Disk Drive) or the like. The storage apparatus 111 drives the hard disk to store programs to be executed by the CPU 101 and various data. Further, a source ID list L, a content database 116, a self ID database 117, a content management information database 118 and so forth hereinafter described with reference to FIG. 5 are stored in the storage apparatus 111.

The drive 112 is a reader/writer for a storage medium and is built in or externally provided for the content processing apparatus 10. The drive 112 records/reproduces various data of contents, group certificates G and programs on/from the storage medium 7 such as a magnetic disk, an optical disk, a magneto-optical disk or a semiconductor memory loaded in the content processing apparatus 10.

In particular, the drive 112 reads out data recorded on the removable storage medium 7 and supplies the data to the RAM 103 through the interface 107, external bus 106, bridge 105 and host bus 104. The CPU 101 stores the data into the ROM 102, the storage apparatus 111 or the like as occasion demands. Meanwhile, the drive 112 receives data stored in the ROM 102, the storage apparatus 111 or the like, data newly produced or data acquired from an external apparatus from the CPU 101 and writes the data on the removable storage medium 7.

The connection port 114 is a port for connecting an external peripheral apparatus such as a content reproduction apparatus 20 and has connection terminals such as USB terminals and IEEE1394 terminals. The connection port 114 is connected to the CPU 101 and so forth through the interface 107, external bus 106, bridge 105, host bus 104 and so forth. By such a connection port 114 as just described, the content processing apparatus 10 can communicate various data through the content reproduction apparatus 20 and the local line 9.

The communication apparatus 115 is a communication interface formed from a communication device or the like for connecting, for example, to the network 5. The communication apparatus 115 transmits and receives various data of a content, a source ID list L, a group certificate G, a control signal and so forth to and from an external apparatus such as another content processing apparatus 10 or the server 30 through the network 5.

Now, principal functions of the content processing apparatus 10 according to the present embodiment are described with reference to FIG. 5. It is to be noted that FIG. 5 is a block diagram schematically showing functions of the content processing apparatus 10 according to the present embodiment.

As shown in FIG. 5, each content processing apparatus 10 includes, for example, a data communication section 120, a group registration section 130, a list management section 140, a certificate issuance section 150, a distribution service utilization section 152, a source ID application section 154, a content processing section 160, an ICV data management section 190, a content database 116, a self ID database 117 and a content management information database 118.

The data communication section 120 transmits and receives various data between the content processing apparatus 10 and an external apparatus. For example, the data communication section 120 utilizes the communication apparatus 115 to transmit and receive data between the content processing apparatus 10 and another content processing apparatus 10 or the server 30 through the network 5. Further, the data communication section 120 utilizes the connection port 114 to transmit and receive data between the content processing apparatus 10 and a content reproduction apparatus 20 through the local line 9.

The group registration section 130 performs a user registration process and a group registration process (apparatus registration process) of the content processing apparatus 10 into the group management server 32. In the group registration process, the group registration section 130 transmits group registration request information (for example, a group registration request notification, the user ID, the password, the terminal ID, the recorder ID and so forth) to the group management server 32. Here, the terminal ID is an ID for uniquely identifying the content processing apparatus 10 formed from a PC or the like. The terminal ID and the recorder ID are produced uniquely, for example, based on a random number generated originally, a device ID of each content processing apparatus 10 or the like by each content processing apparatus 10.

Further, the group registration section 130 receives service data (a leaf ID, a service common key and so forth) issued from the group management server 32 in response to group registration of the content processing apparatus 10. The group registration section 130 outputs, for example, the received leaf ID to the list management section 140 and outputs the received service common key to the content processing section 160. The service common key (secret key) is a key necessary to decrypt encrypted content data and stored safely so that it may not be falsified.

Further, the group registration section 130 performs a group registration cancellation request process of the content processing apparatus 10 to the group management server 32. Also in this instance, the group registration section 130 transmits group registration cancellation request information (for example, a group registration cancellation request notification, the user ID, the password, the terminal ID and so forth) to the group management server 32 similarly as upon registration. If registration cancellation is performed, then the group registration section 130 notifies the list management section 140 of this.

Furthermore, the group registration section 130 can group-register a content reproduction apparatus 20 connected to the content processing apparatus 10 into the group management server 32. Details of such a group registration process and a registration cancellation process of the content processing apparatus 10 and the content reproduction apparatus 20 by the group registration section 130 as described above are hereinafter described.

The list management section 140 is a component corresponding to the list management section 3 shown in FIG. 2. The list management section 140 has, for example, a function of updating the source ID list L held by the content processing apparatus 10.

For example, upon group registration described hereinabove, the list management section 140 adds the service ID to the leaf ID received from the group registration section 130, converts the leaf ID having the service ID added thereto into a group ID and adds the group ID to the source ID list L. Further, when the list management section 140 acquires a group certificate G distributed from the group management server 32 or another content processing apparatus 10, if the group ID included in the group certificate G and the group ID included in the source ID list L coincide with each other, then the list management section 140 adds the recorder ID included in the group certificate G to the source ID list L. It is to be noted that, where validity term information is set to the source ID such as the group ID or the recorder ID, the list management section 140 describes also the validity term information of the source ID in the source ID list L upon addition of the source ID to the source ID list L.

Further, the list management section 140 deletes, upon group registration cancellation, all source IDs in the source ID list L. Furthermore, also it is possible for the list management section 140 to update the source ID list L of a content processing apparatus 10 connected to the content processing apparatus 10. It is to be noted that details of such a list updating process by the list management section 140 as just mentioned are hereinafter described.

It is to be noted that the source ID list L is stored safely in the storage apparatus 111, the ROM 102 or the like of the content processing apparatus 10. The source ID list L is stored in a state wherein, for example, it is encrypted and has a digital signature applied thereto in order to prevent illegal falsification thereof by a user.

In the present embodiment, a group ID produced based on a leaf ID upon group registration is stored in the content processing apparatus 10 in such a manner that it is included in the source ID list L as described above. This is because the group ID is utilized as a source ID for making it possible to reproduce a distribution contents to which the group ID is applied to perform reproduction control of the distribution content based on the group ID. It is to be noted that, for example, where a group ID is utilized not as a source ID but only as a source ID (second group ID described hereinabove) for reference to addition of a recorder ID to the source ID list L in a ripped content sharing service, the group ID need not necessarily be stored in the source ID list L. In this instance, the group ID may be stored, for example, in another storage region of the storage apparatus 111, for example, in the self ID database 117 or may be stored in some other portion such as the ROM 102.

The certificate issuance section 150 has, for example, a function of issuing a group certificate G for certifying an apparatus group to which the content processing apparatus 10 itself belongs. More particularly, the certificate issuance section 150 issues a group certificate G which coordinates, for example, in a state wherein the content processing apparatus 10 is group-registered and has a group IDA as described above, a recorder ID 1 corresponding to the content processing apparatus 10 and the group IDA with each other. It can be certified by the group certificate G that the content processing apparatus 10 corresponding to the recorder ID 1 belongs to an apparatus group which is owned by the user and specified by the group IDA. Further, a digital signature for detection of falsification, for example, a MAC (Message Authentication Code), is applied to the group certificate G. Falsification of the group certificate G can be prevented by this.

When such a group certificate G as described above is to be issued, the certificate issuance section 150 reads out the recorder ID and the group ID corresponding to the content processing apparatus 10 itself from the storage apparatus 111 and encrypts the read out recorder ID and group ID with the digital signature applied thereto to produce and issue a group certificate G.

The certificate issuance section 150 can issue a group ID, for example, at an arbitrary timing after group registration of the content processing apparatus 10. For example, the certificate issuance section 150 may issue a group certificate G corresponding to the content processing apparatus 10 itself in response to an input by the user through the content processing apparatus 10 or a certification request from another content processing apparatus 10. Further, the certificate issuance section 150 may issue and transmit a group certificate G to the certificate management server 36 after group registration of the content processing apparatus 10.

Further, the certificate issuance section 150 may apply validity term information to the group certificate G to be issued. By this, any content processing apparatus 10 which acquires the group certificate G can add the recorder ID included in the group certificate G to the source ID list L only within the term of validity represented by validity term information included in the group certificate G.

Further, while the certificate issuance section 150 can arbitrarily set a route to be used when a group certificate G issued in such a manner as described above is to be distributed to another content processing apparatus 10, the group certificate G may be distributed to another content processing apparatus 10, for example, through the certificate management server 36. By this, the certificate management server 36 can manage group certificates G of the content processing apparatus 10 in a centralized manner and distribute any group certificate G to another content processing apparatus 10 which belongs to the same apparatus group.

Also the distribution method of the group certificate G can be set arbitrarily. For example, the group certificate G may be transmitted directly through the network 5 or the local line 9 or may be attached to and transmitted together with an electronic mail or otherwise may be adhered to a homepage. Or else, the group certificate G may be provided to the content processing apparatus 10 through the storage medium 7 on which the group certificate G is recorded. Furthermore, the group certificate G may be distributed through the storage medium 7 on which the group certificate G is recorded together with the content. By this, for example, together with a ripped content, a recorder ID applied to the ripped content and a group ID of a content processing apparatus 10 by which the ripped content is ripped can be distributed at a time. Therefore, any content processing apparatus 10 can immediately reproduce the ripped content if the content processing apparatus 10 belongs to the same apparatus group.

The group certificate G distributed in this manner is utilized for sharing registration, that is, for addition of a recorder ID to the source ID list L by the other content processing apparatus 10. Consequently, the other content processing apparatus 10 which receives the distribution of the group certificate G from the content processing apparatus 10 which belongs to the same apparatus group can acquire the recorder ID of the apparatus which owns the same group ID and add the recorder ID to the source ID list L.

By issuing and distributing a group certificate G in which a group ID and a recorder ID are coordinated with each other in this manner, those content processing apparatus 10 which belong to the same apparatus group can share the recorder IDs of each other even if they are not connected directly to each other.

It is to be noted that a certificate management section (not shown) wherein a group certificate G issued by the certificate issuance section 150 or a group certificate G acquired from another content processing apparatus 10 or the certificate management server 36 is stored and managed may be provided. By this, the certificate management section can read out the group certificates G acquired in the past from such a certificate database as just mentioned and distribute the group certificates G to another content processing apparatus 10 and so forth.

The distribution service utilization section 152 performs a process relating to a content distribution service to or from the content distribution server 34.

In particular, the distribution service utilization section 152 transmits and receives various kinds of information such as user authentication information (a user ID, a password and so forth) necessary to utilize the content distribution service described hereinabove, charging information and content distribution request information to and from the content distribution server 34 or supports inputting/outputting of such information.

Further, the distribution service utilization section 152 receives a distribution content and a license of the distribution content transmitted from the content distribution server 34 through the network 5 and the communication apparatus 115. In particular, if the user of the content processing apparatus 10 utilizes the content distribution service to acquire a content, then the distribution service utilization section 152 downloads a file of the distribution content and another file of the license which prescribes utilization conditions of the distribution content, for example, as different files from each other from the content distribution server 34. In the case of a content for which copyright management of the group management type is performed, a leaf ID allocated to the user by the group registration described above is described in the license of the distribution content. On the other hand, in the case of another content for which copyright management of the check-in check-out type is performed, information of check-in check-out time number restriction, reproduction time number restriction, reproduction term and so forth which are utilization condition information (Usage Rule) of the content is described in the license.

The distribution service utilization section 152 works data of the distribution content and data of the license received in this manner to produce, for example, a content file which includes the content and the license as a same file.

At this time, as regards a distribution content of the group management type, a group ID is applied to the content data of the distribution content by the source ID application section 154. The source ID application section 154 is a component which corresponds to the source ID addition section 1 described hereinabove. The source ID application section 154 applies a group ID to the distribution content. Particularly, the source ID application section 154 executes a process of converting the leaf ID described in the license corresponding to the distribution content into a group ID. The conversion process of a leaf ID into a group ID is performed by adding, for example, a service ID of the content distribution service to the leaf ID similarly as described hereinabove. By this, a group ID representative of the user and the service by and through which the distribution content is purchased is coordinated with the distribution content.

In this manner, the distribution service utilization section 152 and the source ID application section 154 produce a content file in which a file of a distributed content and a file of a license are joined together.

Figure 6A:
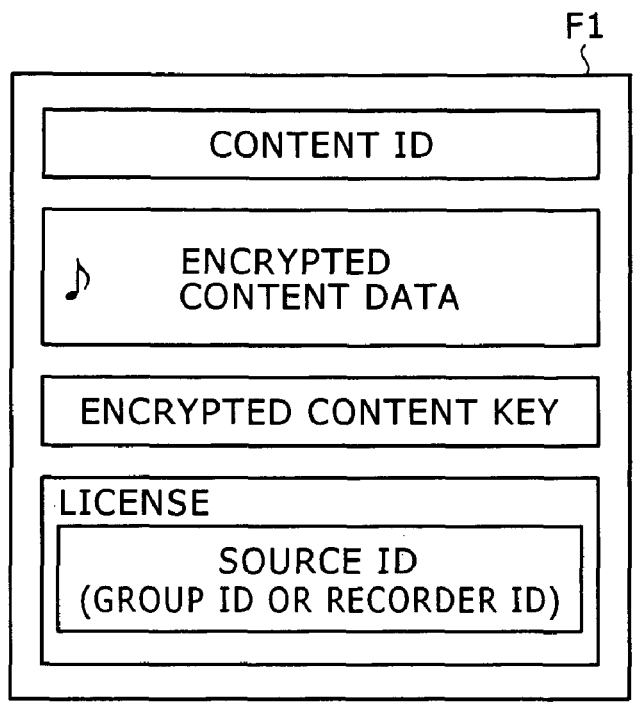
FIG. 6A is an explanatory view schematically showing a configuration of a content of a group management type and a content of a check-in check-out type according to the embodiment.

In particular, as shown in FIG. 6(a), a content file F1 of the group management type includes, for example, a content ID, content data encrypted with a content key, a content key encrypted with a system common key which can be handled only by the content sharing system 100 and a license in which a source ID such as a group ID is described.

Figure 6B:
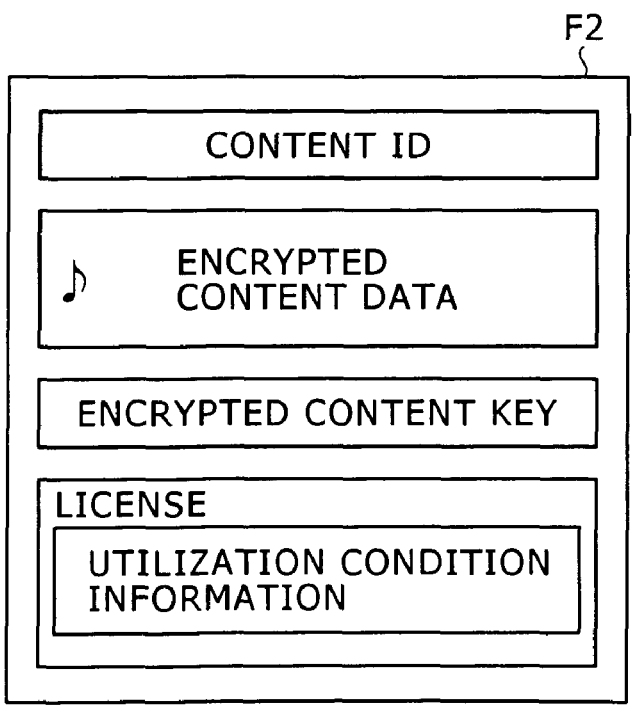
FIG. 6B is an explanatory view schematically showing a configuration of a content of a group management type and a content of a check-in check-out type according to the embodiment.

Meanwhile, as shown in FIG. 6(b), a content file F2 of the check-in check-out type includes, for example, a content ID, content data encrypted with a content key, a content key encrypted with the system common key and a license in which utilization condition information is described. A license in such content files F1 and F2 as described above is in an encrypted form so that falsification thereof can be detected. Consequently, a source ID or a utilization condition can be coordinated safely with a content. Further, the content processing apparatus 10 holds common secret information so that it can perform, for example, decoding of an encrypted content key or falsification checking of a license. Therefore, even if a content is shared in the content sharing system 100, falsification of the source ID or the utilization condition applied to the content can be prevented suitably from being falsified.

The distribution service utilization section 152 records a content file produced in such a manner as described above, for example, into the content database 116 in the storage apparatus 111. It is to be noted that, while, in the present embodiment, a content and a license which correspond to each other are managed in the same file and stored in the content database 116 as described hereinabove, the manner of management is not limited to this example. For example, a content and a file are managed in separate files. In this instance, the file of the content may be stored in the content database 116 while the file of the license is stored in the license database such that the content and the license are coordinated with each other by content IDs or the like included in the two files.

Further, the distribution service utilization section 152 receives, upon distribution of a content, attribute information of the distribution content from the content distribution server 34. The attribute information of the distribution content includes, for example, title information (for example, a tune name, an artist (singer) name, an album name, a genre, reproduction time and so forth), the content ID of the distribution content, the distribution date and hour, the data size, a data format, and the type of the copyright management method. The distribution service utilization section 152 records such attribute information of a distribution content, a recording place (for example, an address in the content DB 116) of the distribution content and so forth as content management information into the content management information database 118.

Such a distribution service utilization section 152 as described above is configured, for example, by installing software for the content distribution service corresponding to a content distribution service to be utilized into the content processing apparatus 10. It is to be noted that a plurality of such distribution service utilization sections 152 may be provided each for one of a plurality of content distribution services to be utilized by the user.

Further, the source ID application section 154 applies the group ID of the content processing apparatus 10 itself to a content (ripped content) ripped from the recording medium 7a or the like by a ripping section 184 hereinafter described. More particularly, the source ID application section 154 reads out a recorder ID of the content processing apparatus 10 stored in the self ID database 117, produces a license which includes the recorder ID, and coordinates such a license as just described with content data of the ripped content. In particular, the source ID application section 154 produces such a content file F1 which includes a content ID, encrypted content data of a ripped content, an encrypted content key and a license in which a recorder ID is described as shown in FIG. 6(a). The source ID application section 154 records the ripped content to which the recorder ID is applied in this manner into the content database 116.

It is to be noted that the timing of the application of a recorder ID preferably is a point of time at which, for example, ripping of the content is completed. By applying the recorder ID to the ripped content immediately in this manner, the recorder ID can be applied with certainty before the ripped content which requires copyright management thereof is distributed in the system 100. It is to be noted that the timing of application of a recorder ID is not limited to such an example as described above, but may be, for example, a point of time at which the ripped content is reproduced for the first time, another point of time at which the ripped content is copied into another content processing apparatus 10, or the like.

In the self ID database 117, IDs corresponding to the content processing apparatus 10 itself, such as a device ID, a recorder ID, and a terminal ID, are stored.

The device ID is an identifier which is applied uniquely to various kinds of apparatus (content processing apparatus 10, content reproduction apparatus 20 and so forth) in a unit of an apparatus. The device ID is applied, for example, upon shipment of the content processing apparatus 10 from a factory and is stored safely in the self ID database 117.

Meanwhile, the terminal ID is an ID applied uniquely in a unit of a content processing apparatus 10 such as a PC. Further, the recorder ID is an identifier applied uniquely in a unit of a content processing apparatus 10 having a ripping function as described above. Such terminal ID and recorder ID are produced so as to be unique to each content processing apparatus 10 based on a device ID or a random number by the content processing apparatus 10. The IDs are encrypted in order to prevent illegal falsification and stored safely in the self ID database 117.

The content processing section 160 performs various processes for a content. The content processing section 160 is formed by installing, for example, an application program which utilizes (for example, reproduces, transfers or the like) a content, a DRM module for managing the copyright for such utilization and so forth into the content processing apparatus 10. The content processing section 160 includes, for example, a content reproduction section 170, a content providing section 180, a content acquisition section 182 and a ripping section 184.

The content reproduction section 170 is a component corresponding to the content reproduction section 2 shown in FIG. 2. The content reproduction section 170 is formed from, for example, a reproduction apparatus having a content reproduction function or software for content utilization installed in the content processing apparatus 10, and can reproduce various kinds of contents. Content data reproduced by the content reproduction section 170 are outputted from the outputting apparatus 110.

The content reproduction section 170 is ready, for example, for both of a content of the group management type and another content of the check-in check-out type and can execute reproduction control of the group management type and reproduction control of the check-in check-out type. In particular, where the group management type is used for reproduction control, the content reproduction section 170 controls reproduction of a content of an object of reproduction based on whether or not the source ID applied to the content of the reproduction object is included in the source ID list L. Meanwhile, where the check-in check-out type is used for reproduction control, the content reproduction section 170 controls reproduction of a content of a reproduction object based on whether or not utilization condition information of a license corresponding to the content of the reproduction object is satisfied. Details of such a content reproduction section 170 as just described are hereinafter described.

It is to be noted that two or more content reproduction sections 170 may be provided in one content processing apparatus 10. For example, by installing two or more kinds of software for content reproduction into one content processing apparatus 10, by providing two or more reproduction apparatus, or by using software for content reproduction and reproduction apparatus, two or more content reproduction sections 170 ready for different content distribution services or different copyright management methods may be configured in one content processing apparatus 10.

The content providing section 180 provides a content to another content processing apparatus 10 or a content reproduction apparatus 20. Further, the content acquisition section 182 acquires a content from another content processing apparatus 10 or a content reproduction apparatus 20. The content providing section 180 and the content acquisition section 182 may execute a content providing/acquisition process, for example, by a transmission/reception process through the network 5 or the local line 9 or through the storage medium 7.

It is to be noted that, upon such reproduction, provision or acquisition of a content as described above, the content processing section 160 may control the process described above based on the content management information in the content management information database 118 and the content management information may be displayed on the outputting apparatus 110.

The ripping section 184 rips a content recorded on a recording medium 7a such as a CD or a DVD on which music contents and/or video contents are recoded. More particularly, the ripping section 184 controls the drive 112, for example, in response to a user input to extract music/video data or the like from the recording medium 7a and produce a content in which such music/video data are converted in data of a format (for example, the ATRAC3 format or the like) which can be processed by the content processing apparatus 10. To the content ripped in this manner, the recorder ID of the content processing apparatus 10 is applied by the source ID application section 154.

It is to be noted that a self recording section (not shown) for producing a content newly by self audio and/or video recording in addition to the ripping section 184. The self recording section may collect sound and/or pick up an image around the content processing apparatus 10 to produce audio data and/or video data and perform a predetermined data process for such data to produce a content newly. Alternatively, the self recording section may convert video/audio data of a television program, a radio program or the like received through the communication apparatus 115 or the like into data of a recordable format to produce a new content. Also to a content produced by the self recording section, a recorder ID can be applied to manage the copyright of the content in accordance with the group management type.

The ICV data management section 190 manages ICV (Integrity Check Value) data of the content processing apparatus 10 and ICV data of a content reproduction apparatus 20 connected to the content processing apparatus 10. The ICV data are data for checking, when a process is performed for a content, the validity of the process.

In the copyright management process of the group management type, the ICV data include a MAC value (hash value with a key) of the source ID list L. Therefore, the ICV data management section 190 detects based on such ICV data whether or not the source ID list L is legal, that is, whether or not the source ID list L is falsified illegally. On the other hand, in the copyright management process of the check-in check-out type, the ICV data include a MAC value (hash value with a key) of a license of a content. Therefore, the ICV data management section 190 detects based on such ICV data whether or not the license is legal, that is, whether or not the license is falsified illegally.

As a result, if it is decided that the source ID list L or the license is legal, then the ICV data management section 190 permits the process of the content processing section 160, but if it is decided that the source ID list L or the license is not illegal, then the ICV data management section 190 does not permit the process of the content processing section 160.

Further, the ICV data include a flag which is an example of method identification information of whether the copyright management method is of the group management type or of the check-in check-out type. For example, if the flag is "0", then the copyright management method is of the group management type, but if the flat is "1", then the copyright management method is of the check-in check-out type. Therefore, the content processing section 160 can decide based on the flag in accordance with which one of the copyright management methods the content should be processed.

Further, the ICV data management section 190 can manage not only ICV data relating to the content processing apparatus 10 but also ICV data of any content reproduction apparatus 20 connected to the content processing apparatus 10 similarly. Consequently, by setting the value of the flag (method identification information) in the ICV data of any of the content reproduction apparatus 20 connected to the content processing apparatus 10 using the content processing apparatus 10, the copyright management method for the content reproduction apparatus 20 can be set. At this time, the setting of the copyright management method of the content reproduction apparatus 20 may be executed based on region information representative of a region in which the system 100 is used. For example, if the content reproduction apparatus 20 is used in the United States, then the copyright management method may be set to the group management type, but if the content reproduction apparatus 20 is used in Japan, then the copyright management method may be set to the check-in check-out type.

Further, though not shown in the drawings, the content processing apparatus 10 may include a transfer control section for controlling transfer of a content between the content processing apparatus (PC) 10 and the content reproduction apparatus (PD) 20. The transfer control section controls, for example, in response to a transfer request based on a user input, transfer of a content stored in the content processing apparatus 10 to the content reproduction apparatus 20 or transfer of a content stored in the content reproduction apparatus 20 to the content processing apparatus 10.

Further, the transfer control section can perform not only transfer control of a content of an object of copyright management (a content to which a source ID is applied) but also transfer control of a content which is not under copyright management (for example, a raw content to which no source ID is applied). For example, if a transfer request from the content processing apparatus 10 to the content reproduction apparatus 20 or an transfer request from the content reproduction apparatus 20 to the content processing apparatus 10 is inputted with regard to a content which is not under copyright management, then the transfer control section compares the group ID in the source ID list of the content processing apparatus 10 and the group ID in the source ID list of the content reproduction apparatus 20 with each other. If a result of the comparison proves that the two group IDs coincide with each other, then the transfer control section permits the transfer, but if the two group IDs do not coincide with each other, then the transfer control section does not permit the transfer. Consequently, it is possible to restrict utilization (unrestricted copying between apparatus) not only of a content which is under copyright management by the group management system but also of a content which is not protected under the copyright.

In the foregoing, the components of the content processing apparatus 10 are described. The data communication section 120, group registration section 130, list management section 140, certificate issuance section 150, distribution service utilization section 152, source ID application section 154, content processing section 160, ICV data management section 190, transfer control section and so forth described hereinabove may be formed, for example, as hardware having the functions described hereinabove, or may alternatively be formed by installing a program for implementing the functions described above into the content processing apparatus 10.

Now, the content reproduction section 170 according to the present embodiment is described in detail with reference to FIG. 7. It is to be noted that FIG. 7 is a block diagram schematically showing functions of the content reproduction section 170 according to the present embodiment.

Figure 7:
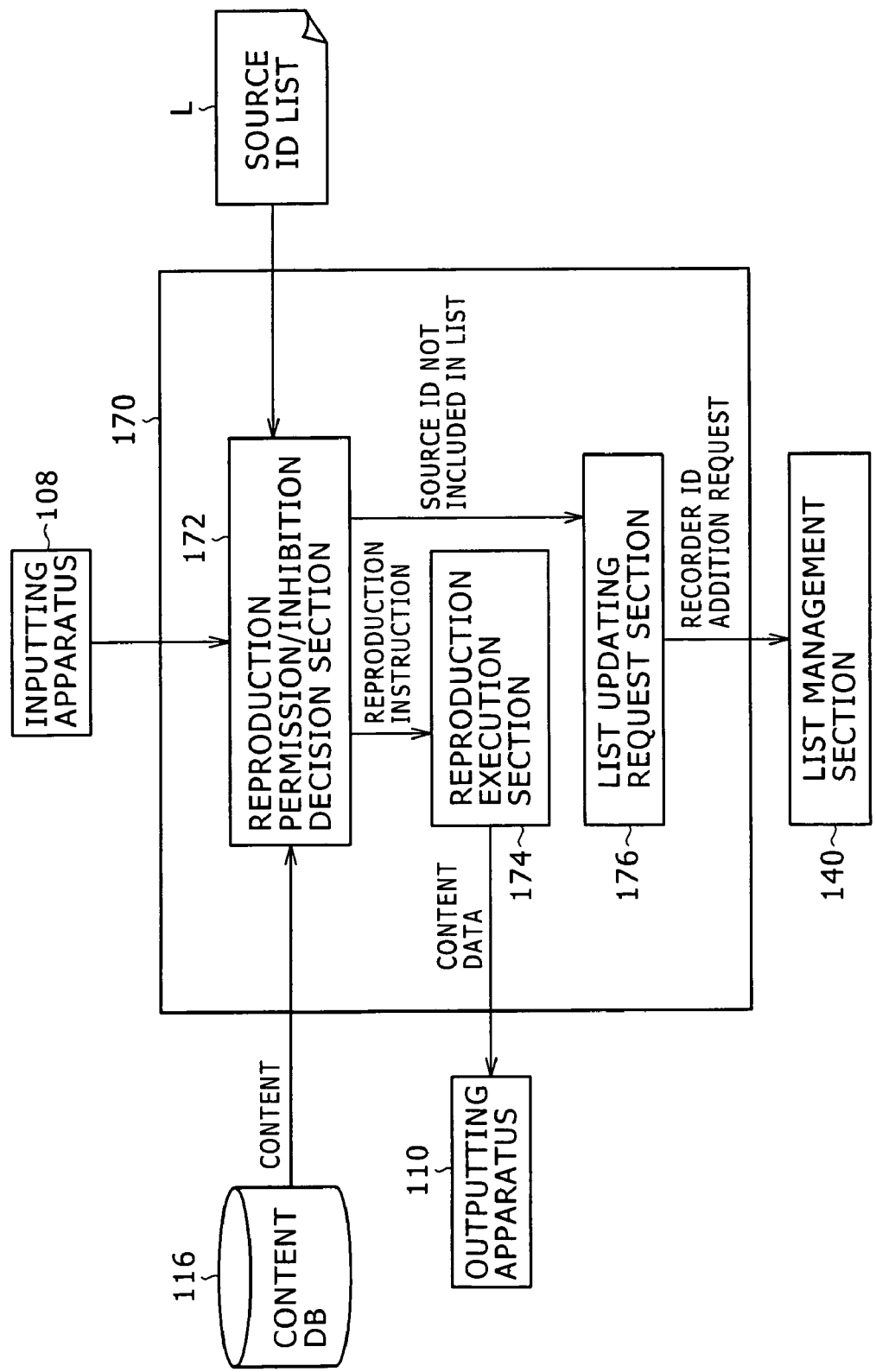
FIG. 7 is a block diagram schematically showing functions of a content reproduction section according to the embodiment.

As shown in FIG. 7, the content reproduction section 170 includes, for example, a reproduction permission/inhibition decision section 172, a reproduction execution section 174 and a list updating request section 176.

The reproduction permission/inhibition decision section 172 controls reproduction of a content for which a request for reproduction is issued. The reproduction permission/inhibition decision section 172 can execute both of reproduction control of the group management type and reproduction control of the check-in check-out type.

When the reproduction control of the group management type is to be performed, the reproduction permission/inhibition decision section 172 decides based on a source ID (recorder ID or group ID) applied to a content for which a reproduction request is issued and the source ID list L whether or not reproduction of the content may be permitted.

In particular, if a request for reproduction of a content designated by a user is accepted, for example, from the inputting apparatus 108, then the reproduction permission/inhibition decision section 172 reads out the content whose reproduction request is accepted from the content database 116 and decides whether or not a source ID is applied to the content, that is, whether or not a source ID is described in the license in the content file. If no source ID is applied to the content, then the reproduction permission/inhibition decision section 172 decides that the content requires no copyright management and permits reproduction of the content, and outputs a reproduction instruction signal of the content to the reproduction execution section 174. On the other hand, if a source ID (recorder ID or group ID) is applied to the content, then the reproduction permission/inhibition decision section 172 decides that the content requires copyright management and performs the following processes.

First, the reproduction permission/inhibition decision section 172 reads out (extracts) a source ID from the license in the content file and reads out and interprets the source ID list L. Then, the reproduction permission/inhibition decision section 172 compares the source ID read out from the content and the source IDs included in the source ID list L with each other to decide whether or not the source ID read out from the content is included in the source ID list L. If, as a result of the comparison, the source ID read out from the content is included in the source ID list L, then the reproduction permission/inhibition decision section 172 checks the term of validity of the source ID. If the source ID is within the term of validity, then the reproduction permission/inhibition decision section 172 permits reproduction of the content and outputs a reproduction instruction signal of the content to the reproduction execution section 174. On the other hand, if the source ID read out from the content is not included in the source ID list L or the source ID is not within the term or validity, then the reproduction permission/inhibition decision section 172 inhibits reproduction of the content and does not output a reproduction instruction signal. Therefore, the reproduction execution section 174 cannot reproduce the content. It is to be noted that, in this instance, an error notification representing that the reproduction conditions are not satisfied may be displayed.

In this manner, the reproduction permission/inhibition decision section 172 according to the present embodiment performs such reproduction restriction as to completely inhibit reproduction of a content to which a source ID which is not included in the source ID list L is applied. However, the reproduction restriction of a content is not limited to the example just described, but the reproduction permission/inhibition decision section 172 may perform such reproduction control as, for example, to permit reproduction while restricting the reproduction of the content only to part of the content in time or in contents, to permit reproduction while the picture quality, sound quality or the like is deteriorated or to permit reproduction only by a predetermined number of times (for example, only once) at first but inhibit later reproduction.

Further, for example, where the source ID applied to the content is not included in the source ID list L as described hereinabove, the reproduction permission/inhibition decision section 172 outputs such a source ID as just described to the list updating request section 176.

On the other hand, when reproduction control of the check-in check-out type is to be performed, the reproduction permission/inhibition decision section 172 decides based on utilization condition information (reproduction time number restriction, reproduction validity term) in the license corresponding to the content of the object of the reproduction request whether or not reproduction of the content should be permitted. If it is decided as a result of the decision that the utilization condition of the license is satisfied, then the reproduction permission/inhibition decision section 172 permits the reproduction of the content and outputs a reproduction instruction signal of the content to the reproduction execution section 174. On the other hand, if it is decided that the utilization condition of the license is satisfied, then the reproduction permission/inhibition decision section 172 inhibits reproduction of the content and does not output a reproduction instruction signal.

The reproduction execution section 174 reproduces the designated content in response to the reproduction instruction signal of the reproduction permission/inhibition decision section 172. In particular, the reproduction execution section 174 uses a service common key to decrypt the encoded content key and then uses the decrypted content key to decrypt the encoded content, whereafter the reproduction execution section 174 decodes and reproduces the decrypted content and outputs the reproduced content from the outputting apparatus 110.

The list updating request section 176 issues a request for addition of the recorder ID to the source ID list L to the list management section 140. The addition requesting process in this instance is performed, for example, by outputting an ID addition requesting signal representing a recorder ID of the object of addition to the list management section 140.

In particular, for example, if a source ID which is not included in the source ID list L is inputted from the reproduction permission/inhibition decision section 172, then the list updating request section 176 decides whether the source ID is a recorder ID or a group ID. If, as a result of the decision, the source ID is a recorder ID, then the list updating request section 176 requests the list management section 140 to add the recorder ID to the source ID list L. The list updating request section 176 may perform the addition requesting process automatically or may perform the addition request process after it confirms whether or not the user wants addition of the recorder ID. On the other hand, if the result of the decision indicates that the source ID is a group ID, then the list updating request section 176 does not perform the addition requesting process. This is because the content processing apparatus 10 can be registered into an apparatus group of only one user.

Now, the list management section 140 according to the present embodiment is described in detail with reference to FIG. 8. It is to be noted that FIG. 8 is a block diagram schematically showing a configuration of the list management section 140 according to the present embodiment.

Figure 8:
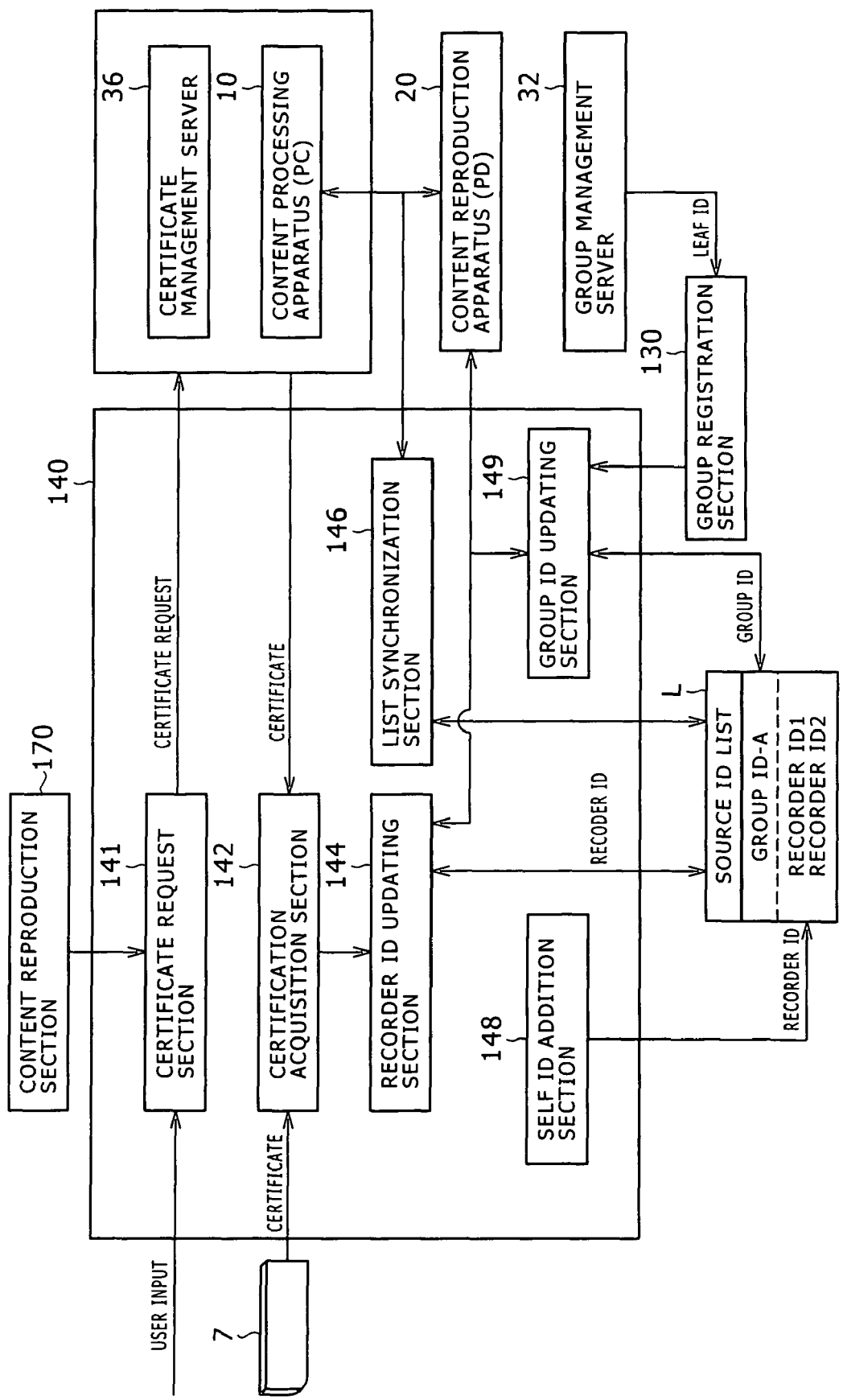
FIG. 8 is a block diagram schematically showing a configuration of a list management section according to the embodiment.

As shown in FIG. 8, the list management section 140 includes, for example, a certificate request section 141, a certification acquisition section 142, a recorder ID updating section 144, a list synchronization section 146, a self ID addition section 148 and a group ID updating section 149.

The certificate request section 141 transmits a certificate requesting signal to a different content processing apparatus 10 or the certificate management server 36 in response to a user input or automatically to request for a group certificate G issued by the different content processing apparatus 10 which belongs to the same apparatus group. For example, the certificate request section 141 may issue a notification of a recorder ID relating to the request for addition from the content reproduction section 170 to a particular content processing apparatus 10 or the certificate management server 36 to request for a group certificate G which includes the recorder ID. Alternatively, the certificate request section 141 may transmit the group ID owned by the content processing apparatus 10 itself to a different content processing apparatus 10 or the certificate management server 36 at an arbitrary timing to request for one, two or more group certificates G which each includes a recorder ID relating to the recorder ID (that is, the recorder ID of the different content processing apparatus 10 which belongs to the same apparatus group).

The certification acquisition section 142 acquires a group certificate G from a different content processing apparatus 10 or the certificate management server 36. In particular, the certification acquisition section 142 can receive and acquire a group certificate G from an external content processing apparatus 10 or the certificate management server 36 through the network 5 and the communication apparatus 115. Further, the certification acquisition section 142 can use the drive 112 to read out and acquire a group certificate G recorded on the storage medium 7 provided from a different content processing apparatus 10. The certification acquisition section 142 outputs the group certificate G acquired in this manner to the recorder ID updating section 144.

The recorder ID updating section 144 adds the recorder ID to the source ID list L based on the group certificate G inputted from the certification acquisition section 142. In particular, the recorder ID updating section 144 first reads out the group ID included in the group certificate G and reads out the group ID in the source ID list L. Then, the recorder ID updating section 144 decides whether or not the two group IDs coincide with each other. If a result of the decision indicates that the two group IDs coincide with each other, then the recorder ID updating section 144 reads out the recorder ID corresponding to the different content processing apparatus 10 included in the group certificate G and adds the recorder ID to the source ID list L. On the other hand, if the two group IDs do not coincide with each other, then the recorder ID included in the group certificate G is not added to the source ID list L.

Consequently, only a recorder ID corresponding to each content processing apparatus 10 recorded in the same apparatus group can be added to the source ID list L. It is to be noted that the recorder ID updating section 144 may restrict addition of recorder IDs by providing an upper limit to the number of recorder IDs which can be added to the source ID list L.

The list synchronization section 146 has a function of synchronizing a plurality of source ID lists L with each other. The synchronization of source ID lists L here signifies merging of a plurality of source ID lists L which are different from each other, and the source ID list L after the synchronization includes all of those recorder IDs which have been included in the plural original source ID lists L without any overlap.

The synchronization process of source ID lists L can be executed only between those content processing apparatus 10 which have the same group ID. In particular, the list synchronization section 146 acquires the source ID lists L possessed by another content processing apparatus 10 or content reproduction apparatus 20 and, only when the group ID included in the source ID list L and the group ID included in the source ID list L of the self content processing apparatus 10 coincide with each other, the list synchronization section 146 can synchronize the two source ID lists L.

By such a synchronization process as described above, the recorder IDs included in the source ID lists L possessed by a plurality of apparatus registered in the same apparatus group can be made same as each other. Therefore, a ripped content can be shared between and reproduced by the content processing apparatus 10.

It is to be noted that the synchronization process may be performed periodically or automatically at an arbitrary timing between the content processing apparatus 10, for example, in a private network by the list synchronization section 146 or may be performed between designated particular content processing apparatus 10 in response to an instruction of the user. Further, such a synchronization process as described above can be executed not only between the content processing apparatus 10 connected to each other by a private network or between the content processing apparatus 10 connected to each other by the local line 9 but also between the content processing apparatus 10 connected remotely to each other through the network 5.

The self ID addition section 148 adds the recorder ID corresponding to the content processing apparatus 10 itself, for example, unconditionally to the source ID list L. In particular, the self ID addition section 148 reads out the recorder ID corresponding to the content processing apparatus 10 itself, for example, from the self ID database 117 and writes the recorder ID into the source ID list L. Consequently, the content processing apparatus 10 can reproduce a ripped content ripped by the content processing apparatus 10 itself irrespective of whether or not there exists a group registration. It is to be noted that the group ID may be produced based on a random number or the like by the self ID addition section and recorded into the self ID database 117.

The group ID updating section 149 adds, for example, when a group ID is inputted from the group registration section 130 upon group registration of the content processing apparatus 10, such a group ID as just mentioned into the source ID list L. Consequently, the content processing apparatus 10 is enabled to reproduce a distribution content having the group ID applied thereto.

Further, if a group registration cancellation notification is inputted from the group registration section 130, then the group ID updating section 149 deletes all source IDs (recorder IDs, group IDs) included in the source ID list L. However, only the recorder ID corresponding to the content processing apparatus 10 itself is not deleted from the source ID list L. Consequently, the content processing apparatus 10 is permitted to reproduce only a ripped content produced by the content processing apparatus 10 itself and those contents which are not under copyright management.

It is to be noted that the recorder ID updating section 144 and the group ID updating section 149 can update and return the source ID list L received from the content reproduction apparatus 20.

The list management section 140 according to the present embodiment is described above. In this manner, the list management section 140 adds a group ID obtained by group registration to the source ID list L and adds the recorder ID of any content processing apparatus 10 which belongs to the same apparatus group based on whether or not the group ID is same to the source ID list L. Consequently, those content processing apparatus 10 which are registered in the same apparatus group can freely reproduce a copied distribution content and a ripped content. On the other hand, reproduction of a copied content can be restricted and illegal utilization of a content can be prevented between those content processing apparatus 10 which are registered in different apparatus groups or are not registered as yet.

It is to be noted that only one representative list management section 140 may be provided in a certain content processing apparatus 10 from among a plurality of content processing apparatus 10 and content reproduction apparatus 20 in a private network such that such a list management section 140 as just mentioned collectively updates the source ID lists L of the content processing apparatus 10 and the content reproduction apparatus 20. In this instance, the representative list management section 140 is preferably provided, for example, in a connection server apparatus in a private network.

Now, a configuration of the content reproduction apparatus (PD) 20 according to the present embodiment is described in detail.

First, a hardware configuration of the content reproduction apparatus 20 according to the present embodiment is described with reference to FIG. 9. It is to be noted that FIG. 9 is a block diagram schematically showing an example of a hardware configuration of the content reproduction apparatus 20 according to the present embodiment.

Figure 9:
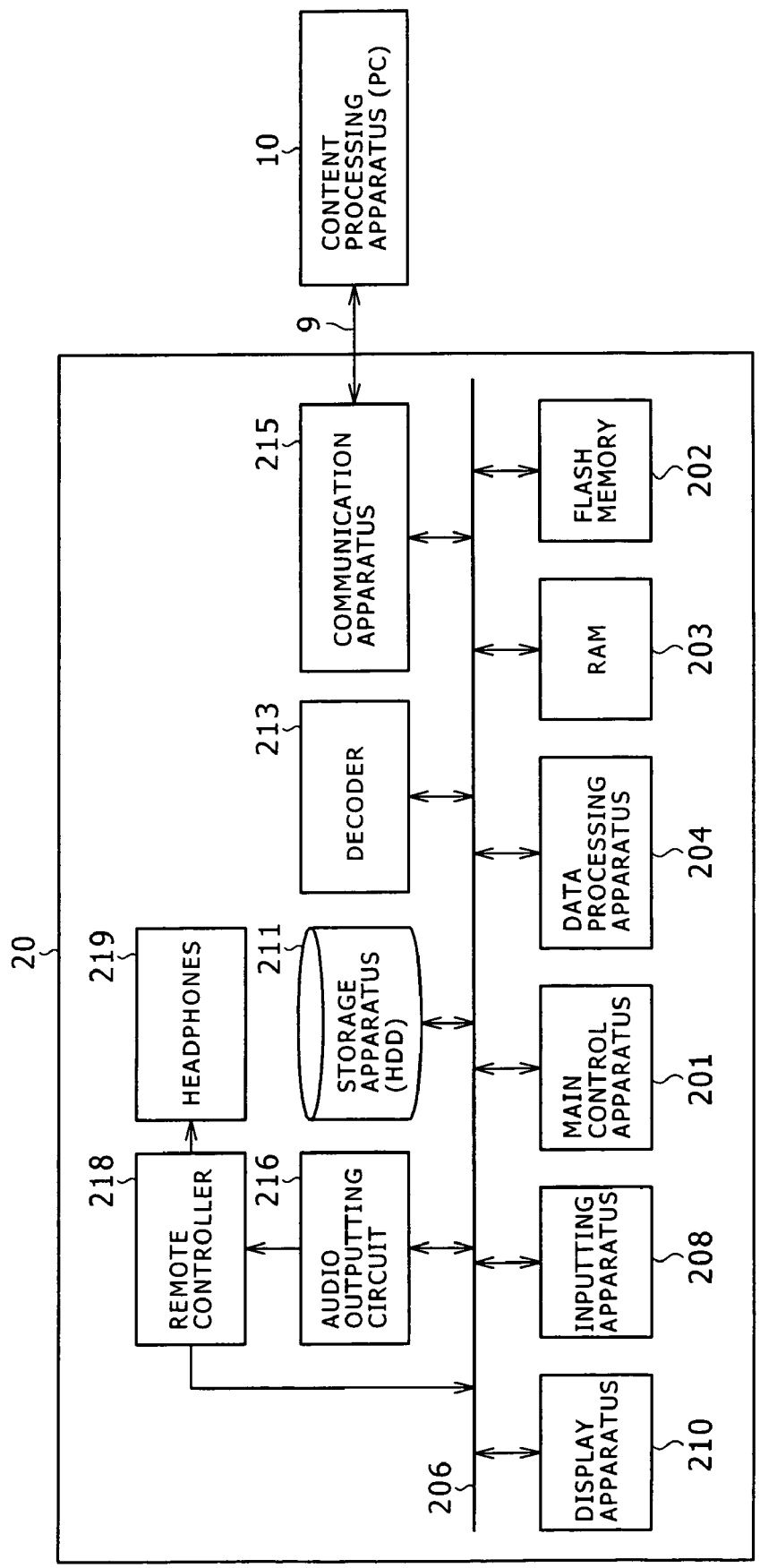
FIG. 9 is a block diagram schematically showing an example of a hardware configuration of a content reproduction apparatus according to the embodiment.

As shown in FIG. 9, the content reproduction apparatus 20 includes, for example, a main control apparatus 201, a flash memory 202, a RAM 203, a data processing apparatus 204, a bus 206, an inputting apparatus 208, a display apparatus 210, a storage apparatus (HDD) 211, a decoder 213, a communication apparatus 215, an audio outputting circuit 216, a remote controller 218, and headphones 219.

The main control apparatus 201 functions as a control apparatus and controls the components of the content reproduction apparatus 20. The flash memory 202 stores, for example, a program which defines action of the main control apparatus 201 and various data. Meanwhile, the RAM 203 is formed from, for example, an SDRAM (Synchronous DRAM) and temporarily stores various data relating to processes of the main control apparatus 201.

The data processing apparatus 204 is formed from a system LSI or the like and processes data to be transferred in the content reproduction apparatus 20. The bus 206 is a data line which interconnects the main control apparatus 201, flash memory 202, RAM 203, data processing apparatus 204, inputting apparatus 208, display apparatus 210, storage apparatus (HDD) 211, decoder 213, communication apparatus 215, audio outputting circuit 216 and so forth.

The inputting apparatus 208 and the remote controller 218 are formed from operation elements such as a touch panel, button keys, levers, and dials, and an input control circuit which produces an input signal in response to an operation of any of the operation elements by the user and outputs the input signal to the main control apparatus 201. The user of the content reproduction apparatus 20 can input various data or input a processing action instruction to the content reproduction apparatus 20 by operating the inputting apparatus 208 or the remote controller 218 which is hereinafter described.

The display apparatus 210 is formed from, for example, an LCD panel, and an LCD control circuit. The display apparatus 210 displays various kinds of information in the form of a text or an image under the control of the main control apparatus 201. For example, the display apparatus 210 can display title information of contents held in the content reproduction apparatus 20 such that it can be decided whether or not reproduction is permitted as hereinafter described.

The storage apparatus 211 is an apparatus for data storage formed as an example of a storage section of the content reproduction apparatus 20 according to the present embodiment. The storage apparatus 211 is formed from, for example, a hard disk drive (HDD) having a storage capacity of several tens GB and stores compressed contents, programs of the main control apparatus 201 and various data such as processing data.

The decoder 213 performs a decryption process, a decoding process, a surround process, a conversion process into PCM data and so forth of encrypted contents data.

The communication apparatus 215 is formed from a USB controller, a USB terminal and so forth and transmits and receives various data such as contents, a source ID list L, ICV data, content management information and control signals to and from a content processing apparatus 10 connected through the local line 9 such as a USB cable.

The audio outputting circuit 216 amplifies analog audio data decoded by the decoder 213 and DA converted by the CPU and outputs the amplified analog audio data to the remote controller 218. The analog audio data are outputted from the remote controller 218 to the headphones 219 and outputted from a speaker built in the headphones 219.

Here, principal data flows in the content reproduction apparatus 20 having such a hardware configuration as described above are described.

First, a data flow when the content reproduction apparatus (PD) 20 receives a content from a content processing apparatus (PC) 10 is described. When the content reproduction apparatus 20 and the content processing apparatus 10 are connected to each other by the local line 9 such as a USB cable, the content processing apparatus 10 recognizes the content reproduction apparatus 20 as a removable HDD. If, in this state, the content processing apparatus 10 transmits content data and control information such as ICV data to the content reproduction apparatus 20, then the communication apparatus 215 receive the data. Then, the received content data are stored directly into the storage apparatus 211 by the communication apparatus 215. Meanwhile, the control information received by the communication apparatus 215 is inputted to the main control apparatus 201 via the data processing apparatus 204 and stored into a predetermined storage region.

Now, a data flow when the content reproduction apparatus (PD) 20 reproduces a content is described. First, a reproduction request of a content is inputted to the main control apparatus 201, and if reproduction of the content is permitted by the main control apparatus 201, then the data processing apparatus 204 reads out content data of an object of reproduction from the storage apparatus 211 and transfers the content data to the RAM 203 and simultaneously and parallelly transfers the content data transferred to the RAM 203 to the decoder 213. Then, the decoder 213 performs a decryption process, a decoding process, a surround process, a conversion process into PCM data and so forth of the content data in an encrypted form and transfers resulting data to the main control apparatus 201. Further, the display apparatus 210 performs volume adjustment of the PCM data inputted thereto by means of a DA converter (not shown) and converts resulting data into analog audio data, and transfers the analog audio data to an amplifier of the audio outputting circuit 216. The audio outputting circuit 216 outputs the analog audio data from the headphones 219 through the remote controller 218.

Now, principal functions of the content reproduction apparatus 20 according to the present embodiment are described with reference to FIG. 10. It is to be noted that FIG. 10 is a block diagram schematically showing functions of the content reproduction apparatus 20 according to the present embodiment.

Figure 10:
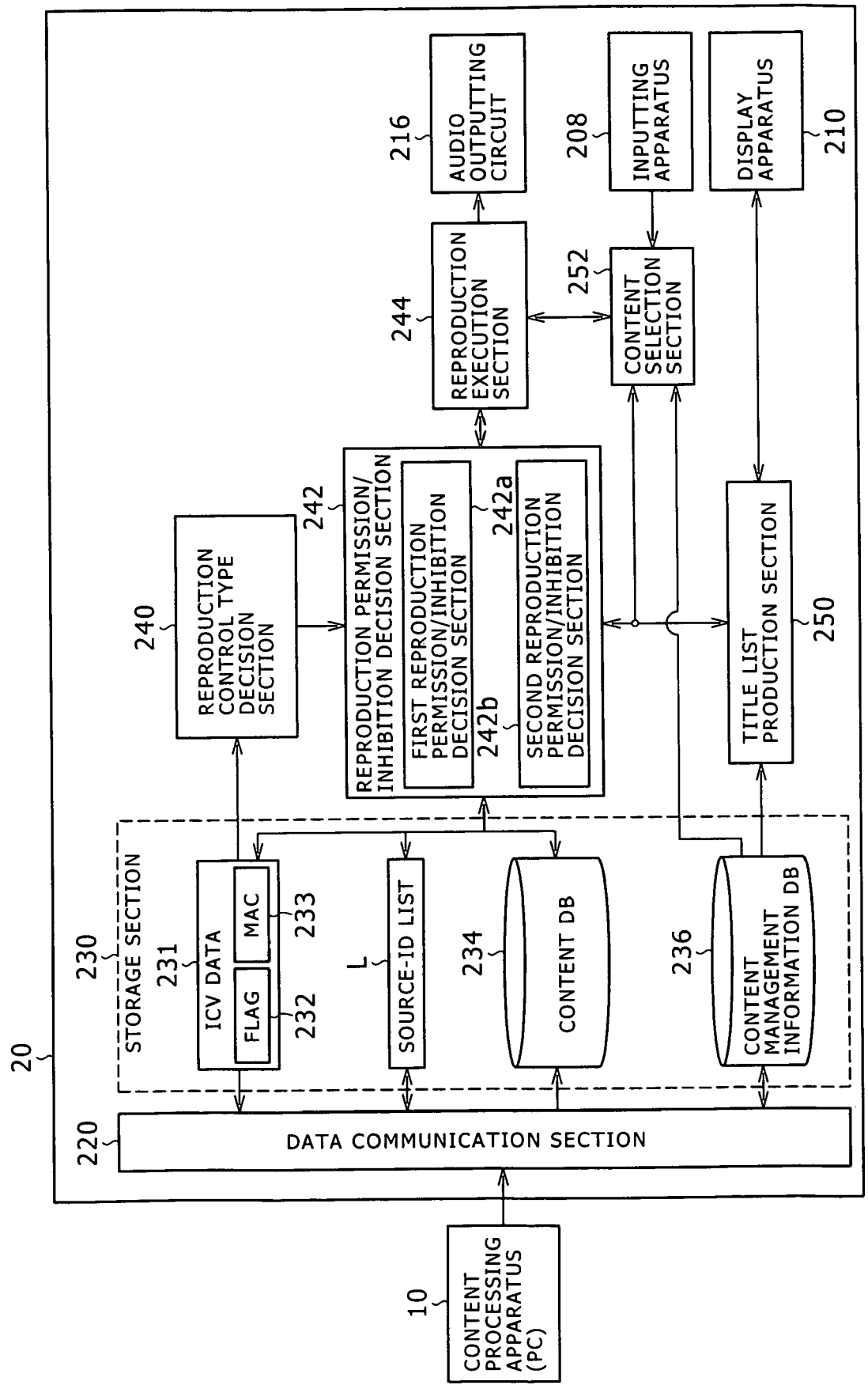
FIG. 10 is a block diagram schematically showing functions of the content reproduction apparatus according to the embodiment.

As shown in FIG. 10, each content reproduction apparatus 20 includes, for example, a data communication section 220, a storage section 230, a reproduction control type decision section 240, a reproduction permission/inhibition decision section 242, a reproduction execution section 244, a title list production section 250 and a content selection section 252.

The data communication section 220 utilizes the communication apparatus 215 to transmit and receive data to and from a content processing apparatus 10 through the local line 9.

The storage section 230 is formed from, for example, the storage apparatus 211, flash memory 202 and so forth described hereinabove and stores various data in the content reproduction apparatus 20. The storage section 230 has, for example, ICV data 231, a source ID list L, a content database 234 and a content management information database 236 stored therein.

The ICV data 231 are produced by the ICV data management section 190 of a content processing apparatus 10 and transferred to the content reproduction apparatus 20, and are used to check the validity of a content reproduction process in the content reproduction apparatus 20. The ICV data 231 include, for example, a 1-bit flag 232 applied to a header part, and a MAC value 233.

The flag 232 is an example of method identification information representative of a reproduction control method (copyright management method) of the content reproduction apparatus 20. For example, where the reproduction control method of the content reproduction apparatus 20 is set to the group management type, the flag 232 is "0", but where the reproduction control method is set to the check-in check-out type, then the flag 232 is "1".

Further, where the reproduction control method of the content reproduction apparatus 20 is set to the group management type by the content processing apparatus 10, the MAC value 233 is a MAC value of the source ID list L. On the other hand, where the reproduction control method is set to the check-in check-out type, the MAC value 233 is a MAC value produced based on a license including utilization condition information of each content.

Further, the source ID list L in the storage section 230 is substantially same as the source ID list L of a content processing apparatus 10 described hereinabove. As the content reproduction apparatus 20 is group-registered, the group ID is added, and also the recorder ID of each of the content processing apparatus 10 which belong to the same apparatus group is added. In the present embodiment, the source ID list L is updated by the list management section 140 of the content processing apparatus 10. However, a list management section may be provided in the content reproduction apparatus 20 such that the content reproduction apparatus 20 itself updates the source ID list L.

Further, the content database 234 stores a content transferred from a content processing apparatus 10. Where the reproduction control method of the content reproduction apparatus 20 is set to the group management type, the content to which such a license including a source ID as shown in FIG. 6(a) is applied is stored in the content database 234. However, where the reproduction control method is set to the check-in check-out type, the content to which such a license including utilization condition information as illustrated in FIG. 6(b) is applied is stored in the content database 234.

In the content management information database 236, attribute information of each content stored in the content database 234 such as a content ID and title information (tune name, artist name, album name and so forth) of the title, recording place information (for example, an address in the content database 234) and so forth are recorded similarly as in the content management information database 118 of the content processing apparatus 10 described hereinabove.

Further, for example, the device ID of the content reproduction apparatus 20 is stored safely in a self ID database not shown in the storage section 230. The device ID is an ID applied uniquely in a unit of a content reproduction apparatus 20 upon shipment from a factory, and is used upon group registration of the content reproduction apparatus 20.

The reproduction control type decision section 240 reads out, for example, upon reproduction of a content or the like, the flag 232 of the ICV data 231 described hereinabove and decides a reproduction control method of the content reproduction apparatus 20 set by the content processing apparatus 10 based on the flag 232. In particular, for example, where the flag 232 is "0", the reproduction control type decision section 240 decides that the reproduction control method is of the group management type (first reproduction control method), but where the flag 232 is "1", the reproduction control type decision section 240 decides that the reproduction control method is of the check-in check-out type (second reproduction control method). The reproduction control type decision section 240 outputs a result of the decision to the reproduction permission/inhibition decision section 242.

The reproduction permission/inhibition decision section 242 decides based on the reproduction control method decided by the reproduction control type decision section 240 whether or not reproduction of the content whose request for reproduction is received should be permitted. The reproduction permission/inhibition decision section 242 includes a first reproduction permission/inhibition decision section 242a which performs reproduction control in accordance with a copyright management scheme of the group management type and a second reproduction permission/inhibition decision section 242b which performs reproduction control in accordance with a copyright management scheme of the check-in check-out type.

If it is decided by the reproduction control type decision section 240 that the reproduction control method of the content reproduction apparatus 20 is of the group management type (first reproduction control method), then the reproduction permission/inhibition decision section 242 renders the first reproduction permission/inhibition decision section 242a operative to decide whether or not reproduction of the content should be performed based on the source ID applied to the content of the object of reproduction and the source ID list L. It is to be noted that, if a term of validity is set to the source ID in the source ID list L, then reproduction of the content is permitted when the source ID is within the term of validity.

On the other hand, if it is decided that the reproduction control method of the content reproduction apparatus 20 is of the check-in check-out type (first reproduction control method), then the reproduction permission/inhibition decision section 242 renders the second reproduction permission/inhibition decision section 242b operative to decide whether or not reproduction of the content should be permitted based on utilization condition information (reproduction time number restriction, term of validity for reproduction and so forth) of the license applied to the content of the object of reproduction. It is to be noted that the reproduction permission/inhibition decision section 242 has substantially same functions as those of the reproduction permission/inhibition decision section 172 of the content processing apparatus 10 described hereinabove, and therefore, detailed description of the same is omitted.

The reproduction execution section 244 reproduces a content, which is decided to be permitted to be reproduced by the reproduction permission/inhibition decision section 242 and outputs the content to the audio output circuit. It is to be noted that the reproduction execution section 244 has substantially same functions as those of the reproduction execution section 174 of the content processing apparatus 10 described hereinabove, and therefore, detailed description of the same is omitted.

The title list production section 250 reads out title information of all or some of contents stored in the content database 234 from the content management information database 236 and produces a list (hereinafter referred to as "title list")

of the contents. The title list is a table of tune names of music contents and includes, as incidental information, an artist name or an album name, reproduction time and so forth of each music content. Further, the title list production section 250 causes the produced title list to be displayed on the display apparatus 210. Consequently, the user can read the title list to select a content whose reproduction is desired and operate the inputting apparatus 208 to designate the title information of the content and issue a reproduction request. In this manner, the title list production section 250 and the display section 210 in the present embodiment are configured as an example of a display section which displays title information of one, two or more contents held by the content reproduction apparatus 20.

The content selection section 252 selects a content of an object of reproduction based on a user input to the inputting apparatus 208 and outputs a result of the selection to the reproduction permission/inhibition decision section 242. In particular, the content selection section 252 reads out a content ID and a storage place of a content, whose reproduction is requested by the user, corresponding to text information of the content from the content management information database 236 and outputs such information to the reproduction permission/inhibition decision section 242. As a result, the reproduction permission/inhibition decision section 242 performs reproduction permission/inhibition decision regarding the selected content of the object of reproduction, and only those contents which can be reproduced are reproduced by the reproduction execution section 244.

Further, the title list production section 250 may produce a title list such that title information of those contents which can be reproduced and title information of those contents which cannot be reproduced can be decided and cause the title list to be displayed. In this instance, the title list production section 250 first requests the reproduction permission/inhibition decision section 242 described above to decide whether or not each content of an object of display can be reproduced, and produces, based on a result of the decision, a title list in which those contents which can be reproduced and those contents which cannot be reproduced can be identified from each other. Consequently, the user can selectively designate a content whose reproduction is desired from among those contents which can be reproduced. In this manner, where title information of a content desired by the user is selected from among those contents which are displayed on the display apparatus 210 and can be reproduced, the content selection section 252 outputs a content ID and a storage place of a content corresponding to the selected title information to the reproduction permission/inhibition decision section 242 so that the reproduction permission/inhibition decision section 242 reproduces the content without performing a decision with regard to whether or not reproduction is permitted.

The functional configuration of the content reproduction apparatus 20 according to the present embodiment is described above. The content reproduction apparatus 20 can selectively execute reproduction control of the group management type and reproduction control of the check-in check-out type in accordance with setting by the content processing apparatus 10. Therefore, not only the convenience of the content reproduction apparatus 20 to the user is enhanced, but also enhancement of the efficiency in development work and reduction of the cost can be anticipated because there is no necessity to design and develop content reproduction apparatus 20 of different models which are ready for the individual reproduction control methods.

Further, each content reproduction apparatus 20 is ready for such copyright management of the group management type that reproduction of a content is controlled based on the source ID applied to the content and the source ID list L. Therefore, since the user can freely download and reproduce a content from a content processing apparatus 10 owned by the user itself to the content reproduction apparatus 20, the content utilization by the user is higher in the degree of freedom and is more user-friendly than that of the conventional check-in check-out type.

It is to be noted that the data communication section 220, reproduction control type decision section 240, reproduction permission/inhibition decision section 242, reproduction execution section 244, title list production section 250, content selection section 252 and so forth described hereinabove may be configured, for example, as hardware having the functions described hereinabove or may be configured by installing a program, which causes a computer to implement the functions described hereinabove, into the content reproduction apparatus 20.

Further, in the embodiment described above, where a source ID is not applied to a content, the reproduction permission/inhibition decision section 242 of the content reproduction apparatus 20 decides that the content does not require copyright management and permits reproduction of the content and then outputs a reproduction instruction signal of the content to the reproduction execution section 244. In particular, the content reproduction apparatus 20 is configured such that it can freely reproduce a content which is not protected by the copyright such as a content to which no source ID is applied. Utilization restriction of such a content which is not under copyright protection as described above can be implemented by the group management system described above. A technique therefor is described below.

First, if the transfer control section (not shown) of the content processing apparatus 10 described above accepts a request for transfer of a content, which is stored in the content database 116 but is not protected by the copyright, to the content reproduction apparatus 20, then it acquires the source ID list L in the content reproduction apparatus 20 connected to the content processing apparatus 10 by the local line 9 (step 1).

Then, the transfer control section compares the group ID in the acquired source ID list L of the content reproduction apparatus 20 and the group ID in the source ID list L owned by the transfer control section itself with each other (step 2).

If a result of the comparison reveals that the two group IDs described above coincide with each other, then the transfer control section permits the transfer of the content which is not protected by the copyright and whose transfer request has been received from the content processing apparatus 10 to the content reproduction apparatus 20, but if the two group IDs do not coincide with each other, then the transfer control section inhibits the transfer (step 3).

Further, although transfer of a content which is not protected by the copyright from the content reproduction apparatus 20 to the content processing apparatus 10 is basically inhibited, also it is possible to adopt an alternative configuration that transfer of part of the content is permitted by the group management system described above. In the following, a technique for the alternative configuration is described.

First, if the transfer control section of the content processing apparatus 10 accepts a request for transfer of a content, which is stored in the content reproduction apparatus 20 but is not protected by the copyright, to the content processing apparatus 10 from the content reproduction apparatus 20 connected to the content processing apparatus 10 through the local line 9, then it acquires the source ID list L in the content reproduction apparatus 20 (step 1).

Then, the transfer control section compares the group ID in the acquired source ID list L of the content reproduction apparatus 20 and the group ID in the source ID list L owned by the transfer control section itself with each other (step 2).

If a result of the comparison reveals that the two group IDs described above coincide with each other, then the transfer control section permits the transfer of the content which is not protected by the copyright and whose transfer request has been received from the content reproduction apparatus 20 to the content processing apparatus 10, but if the two group IDs do not coincide with each other, then the transfer control section inhibits the transfer (step 3).

In this manner, in the copyright management system of the group management system according to the present embodiment, copying transfer also of a content which is not protected by the copyright is restricted for utilization restriction by controlling transfer between the content processing apparatus 10 and the content reproduction apparatus 20.

Now, a configuration of the server 30 according to the present embodiment is described in detail with reference to FIG. 11. It is to be noted that FIG. 11 is a block diagram schematically showing functions of the server 30 according to the present embodiment.

Figure 11:
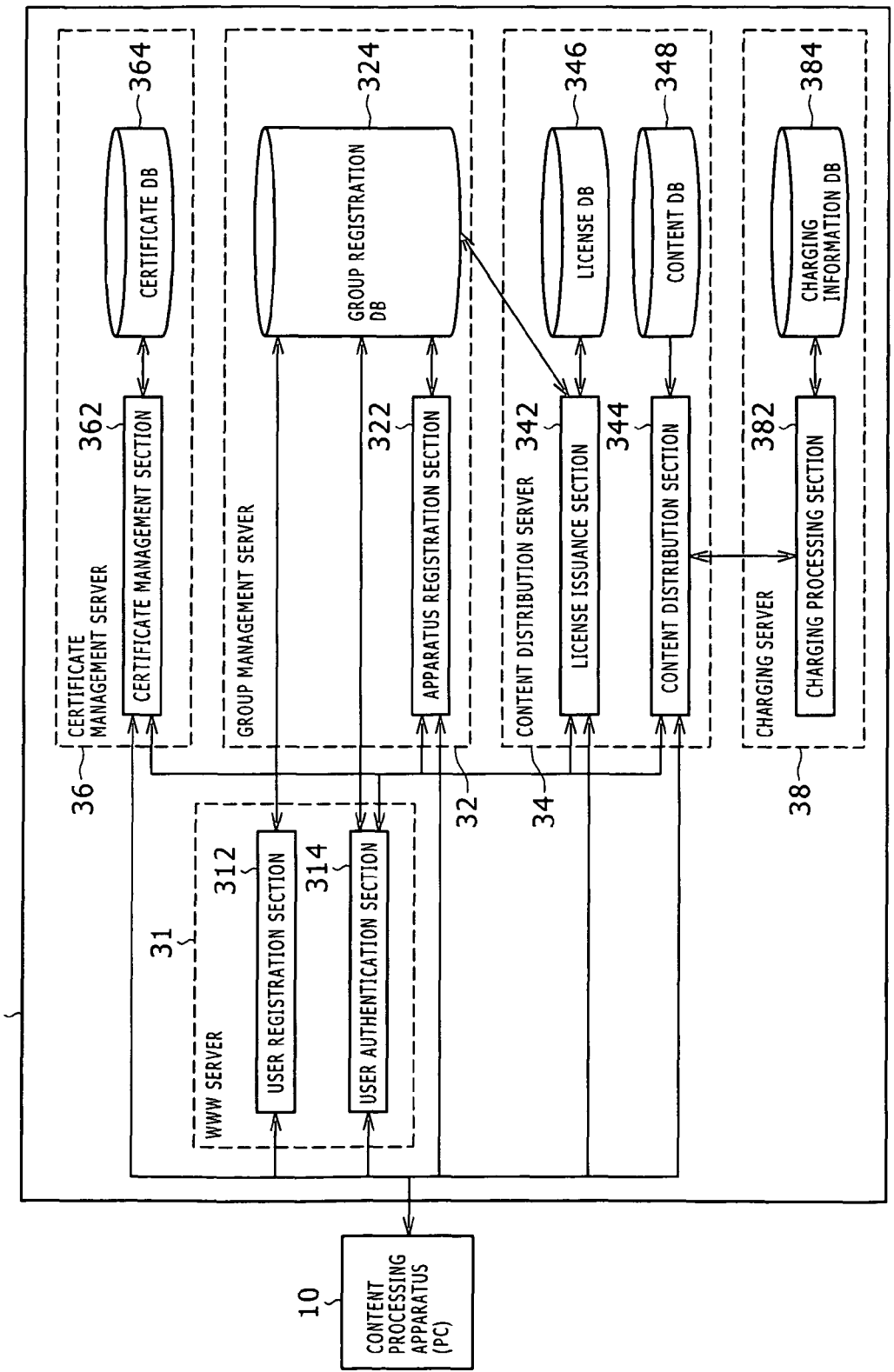
FIG. 11 is a block diagram schematically showing functions of a server according to the embodiment.

As shown in FIG. 11, the server 30 includes a WWW server 31, a group management server 32, a content distribution server 34, a certificate management server 36 and a charging server 38.

Of the components mentioned, the WWW server 31, group management server 32 and certificate management server 36 form a content sharing service execution section and execute a content sharing service of group-registering a plurality of content processing apparatus 10 and content reproduction apparatus 20 and sharing a content among the group-registered apparatus. Further, the WWW server 31, content distribution server 34 and charging server 38 form a distribution service execution section and perform a content distribution service of distributing a content to the user of the content processing apparatus 10, for example, for pay.

In the following, functional configurations of the servers 31, 32, 34, 36 and 38 according to the present embodiment are described individually. It is to be noted that the hardware configuration of the servers 31, 32, 34, 36 and 38 according to the present embodiment is similar to the hardware configuration of the content processing apparatus (PC) 10 described hereinabove with reference to FIG. 4, and therefore, description of the same is omitted.

First, the WWW server 31 is described. The WWW server 31 accepts a request from a content processing apparatus 10 accessing thereto through the network 5 and controls communication between the content processing apparatus 10 and the server 30. The WWW server 31 includes a user registration section 312 and a user authentication section 314.

The user registration section 312 performs a registration process of a new user who desires utilization of the content sharing service and/or content distribution service, a registration changing process, a registration cancellation process, management of user account information (such as user ID, credit number, and password), and so forth. To a service-registered user, a unique leaf ID is applied in a unit of a user. Various user account information and leaf IDs determined by such a registration process by the user registration section 312 as described above are stored into a group registration database 324. However, the management is not limited to such an example as just described, but a user registration database may be provided in the WWW server 31 such that the user account information and leaf IDs are managed in the user registration database.

The user authentication section 314 performs a user authentication process of authenticating, for example, in response to a connection request (registration request, registration cancellation request, content distribution request, certificate request, user account information changing request or the like) from a content processing apparatus 10 owned by the user registered in the content sharing service and/or the content distribution service in such a manner as described above, the user who owns the content processing apparatus 10 of the source of the request. The user authentication is performed, for example, based on user account information and so forth inputted by the user and the user account information of the group registration database 324. The authenticated user is, for example, permitted to log in the group management server 32, content distribution server 34, certificate management server 36 or the like.

Now, the group management server 32 is described. The group management server 32 group-registers a plurality of content processing apparatus 10 and content reproduction apparatus 20 owned by the same user. The group management server 32 includes an apparatus registration section 322 and a group registration database 324.

The group registration database 324 is stored in a storage apparatus (not shown) such as an HDD provided in the group management server 32. As seen in FIG. 12, in the group registration database 324, for example, user account information (user ID 3241, credit card number 3242) of a user who enjoys provision of the content sharing service and the content distribution service, a leaf ID 3243 corresponding to the user, an apparatus ID 3244 of a group-registered content processing apparatus 10 or content reproduction apparatus 20, and a recorder ID 3245 of an apparatus having a ripping function from among the group-registered content processing apparatus 10 are stored in an associated relationship with each other.

To one user ID (user account) 3241, for example, one leaf ID 3243 is allocated. Further, with the leaf ID 3243 of each user, apparatus IDs (terminal IDs or device IDs) 3244 of one, two or more content processing apparatus 10 and content reproduction apparatus 20 registered in an apparatus group of the user represented by the leaf ID are associated. Here, the terminal ID described above is registered as the apparatus ID 3244 of the content processing apparatus (PC) 10, and the device ID described above is registered as the apparatus ID 3244 of the content reproduction apparatus (PD) 20. Furthermore, with the terminal ID, the recorder ID of the content processing apparatus 10 having a ripping function is associated.

The apparatus registration section 322 group-registers a content processing apparatus 10 or a content reproduction apparatus 20 of a registration requesting source into an apparatus group owned by a user authenticated by the user authentication section 314 described hereinabove. The group registration process is performed, for example, when group registration request information (for example, a registration requesting notification, a terminal ID or a device ID, a recorder ID or the like) is received from the group registration section 130 of the content processing apparatus 10 after the user authentication process is performed. When an apparatus is to be group-registered, an apparatus ID (terminal ID or device ID, a recorder ID and so forth) of the content processing apparatus 10 or the content reproduction apparatus 20 of the registration requesting source is written into a location of the column of the apparatus ID 3244 of the group registration database 324 described hereinabove which corresponds to the authenticated user described above. By this, the apparatus ID of the group-registered apparatus and the leaf ID (apparatus group) applied to the authenticated user described hereinabove are associated with each other.

Further, the apparatus registration section 322 inhibits the same content processing apparatus 10 from being registered into different apparatus groups. To this end, the apparatus registration section 322 searches the group registration database 324 and, if the apparatus ID of the content processing apparatus 10 of the registration requesting source is stored already, the apparatus registration section 322 rejects registration of the content processing apparatus 10 or the content reproduction apparatus 20 so that the apparatus ID may not be written newly into the group registration database 324. Consequently, it is possible to cause one content processing apparatus 10 or one content reproduction apparatus 20 to belong to only one apparatus group.

Further, it is also possible for the apparatus registration section 322 to set an upper limit to the number of content processing apparatus 10 or content reproduction apparatus 20 which can be registered into the same apparatus group, particularly an upper limit of the number of content processing apparatus 10 which can be associated with a leaf ID of the same user. For example, the apparatus registration section 322 may set the upper limit number to the number of content processing apparatus (PC) 10 which can be registered in the same apparatus group, for example, to a predetermined number (for example, three) such that only a number of terminal IDs up to the predetermined upper limit number (for example, to three) are associated with a certain leaf ID. In this instance, if a number of registration requests exceeding such an upper limit number as described above are received from content processing apparatus (PC) 10 each having a terminal ID as an apparatus ID, then the apparatus registration section 322 rejects the registration of the registration requests. By this, the number of content processing apparatus (PC) 10 which can be registered in the same apparatus group can be restricted, for example, to three or less, and consequently, the number of content processing apparatus 10 which can receive a distribution content in the same apparatus group can be restricted.

Further, as another example of the number described above, for example, the apparatus registration section 322 may set an upper limit number (for example, 10) to recorder IDs which can be associated with the same group ID. In this instance, if a number of registration requests exceeding such an upper limit number as described above are received from content processing apparatus (PC) 10 each having a recorder ID, then the apparatus registration section 322 rejects the registration. Consequently, since the number of content processing apparatus 10 having a ripping function which can be registered in the same apparatus group can be restricted, the number of content processing apparatus 10 which can serve as a providing source of a ripped content which can be shared in the same apparatus group can be restricted.

Further, when a content processing apparatus 10 is registered into a predetermined apparatus group, the apparatus registration section 322 notifies the group-registered content processing apparatus 10 of service data. The service data include, for example, a leaf ID corresponding to the authenticated user (registered apparatus group) described above, and a service common key for utilizing a content. Consequently, the group-registered content processing apparatus 10 can receive a leaf ID, convert the leaf ID into a group ID and adds the group ID to the source ID list L of the content processing apparatus 10 itself.

It is to be noted that a leaf ID may not be conveyed from the 322 of the group management server 32 to the content processing apparatus 10 in this manner, but the apparatus registration section 322 may produce a group ID based on the leaf ID and so forth and notify the content processing apparatus 10 of the produced group ID. In this instance, the content processing apparatus 10 by itself may not produce a group ID but can add the group ID received from the group management server 32 as it is to the source ID list L.

Further, the apparatus registration section 322 cancels a registration of a content processing apparatus 10 of a registration cancellation requesting source from an apparatus group owned by an authenticated user. This group registration cancellation process is performed when group registration cancellation request information (for example, a group registration cancellation requesting notification, a terminal ID or a device ID, a recorder ID or the like) is received from the group registration section 130 of the content processing apparatus 10 after the user authentication process is performed. When a group registration of an apparatus is to be cancelled, an apparatus ID (terminal ID, device ID) of a content processing apparatus 10 or a content reproduction apparatus 20 which is the registration cancellation requesting source described hereinabove is deleted from the column of the apparatus ID 3244 of the group registration database 324 described hereinabove. However, a recorder ID is not deleted even if a registration of a corresponding content processing apparatus (PC) 10 is canceled. Consequently, if a number of content processing apparatus 10, which have a ripping function, equal to the predetermined upper limit number described hereinabove (for example, 10) are group-registered once, then even if the registration of one of the content processing apparatus 10 is canceled later, a new content processing apparatus 10 cannot be registered additionally. Accordingly, the registration number of content processing apparatus 10 which can produce a ripped content which can be shared can be suppressed to make copyright management of ripped contents severe.

Now, the certificate management server 36 is described. The certificate management server 36 collects and manages group certificates G issued by the content processing apparatus 10 and distributes a group certificate G to any other content processing apparatus 10 which belongs to an apparatus group of the same user. The certificate management server 36 includes a certificate management section 362 and a certificate database 364.

The certificate database 364 is stored in a storage apparatus (not shown) such as an HDD provided in the certificate management server 36. The certificate database 364 stores the group certificates G issued by the content processing apparatus 10 in an associated relationship with the users (leaf IDs) of the content processing apparatus 10.

The certificate management section 362 acquires the group certificates G issued by the content processing apparatus 10 through the network 5 and stores the acquired group certificates G in an associated relationship with the users into the certificate database 364. Further, the certificate management section 362 reads the group certificates G of one, two or more content processing apparatus 10 which belong to an apparatus group of a certain user from such a certificate database 364 as described above and distributes the group certificates G to the other content processing apparatus 10 and so forth which belong to the same apparatus group.

For example, when a content processing apparatus 10 is group-registered by the group management server 32, the certificate management section 362 acquires a group certificate G in which the recorder ID of the content processing apparatus 10 and the group ID are associated with each other from the registered content processing apparatus 10 and stores the group certificate G into the certificate database 364. Further, when another content processing apparatus 10 is registered newly into the same apparatus group, the certificate management section 362 distributes the group certificates G of the content processing apparatus 10 registered already in the same apparatus group to the newly registered content processing apparatus 10. Consequently, the newly registered content processing apparatus 10 can share a ripped content by acquiring the recorder IDs of the registered content processing apparatus 10 and adding the acquired recorder IDs to the source ID list L.

Further, when a certificate distribution request is received from a content processing apparatus 10 registered already, when the content processing apparatus 10 accesses the server 30 or in a like case, the certificate management section 362 may distribute, to the content processing apparatus 10, the group certificates G of the other content processing apparatus 10 which belong to the same apparatus group.

Further, if a registration of a content processing apparatus 10 is canceled, then the certificate management section 362 deletes the group certificate G of the content processing apparatus 10 whose registration is canceled from the certificate database 364.

In this manner, the certificate management section 362 of the certificate management server 36 manages the group certificates G issued by the content processing apparatus 10 in a centralized fashion and distributes the group certificates G to the other content processing apparatus 10 which belong to the same apparatus group. Consequently, any content processing apparatus 10 can acquire the group certificates G of the other content processing apparatus 10 without directly connecting the content processing apparatus 10 to each other. Furthermore, since the certificate management server 36 performs centralized management of the group certificates G, any content processing apparatus 10 can always acquire the latest group certificates G. For example, any content processing apparatus 10 can acquire the group certificates G of all of the content processing apparatus 10 which belong to an apparatus group of the same user and add the recorder IDs of the content processing apparatus 10 to the source ID list L.

Now, the content distribution server 34 is described. The content distribution server 34 distributes a content, for example, for pay to a content processing apparatus 10 of a user who has a user registration for the content distribution service. The content distribution server 34 is configured so as to be capable of distributing both of contents which are ready for the copyright management scheme of the group management type described hereinabove and contents which are ready for the copyright management scheme of the check-in check-out type described hereinabove.

The content distribution server 34 includes, for example, a license issuance section 342, a content distribution section 344, a license database 346 and a content database 348.

The license database 346 and the content database 348 are stored in a storage apparatus (not shown) such as a HDD provided in the content distribution server 34. The license database 346 is a database for storing a license issued upon distribution of a content. The content database 348 is a database for a plurality of contents which are an object of distribution of the content distribution service.

The content distribution section 344 allows, for example, a user who has been authenticated successfully to read a list of distributable contents and select that one of the distribution contents which the user wants to be distributed. Further, the content distribution section 344 distributes a selected distribution content to a content processing apparatus 10 utilized by the user through the network 5. It is to be noted that the distribution process requires, for example, such a charging process as hereinafter described as a requirement.

Further, the content distribution section 344 transmits also information (content ID, title information (tune name, artist name, album name, reproduction time and so forth)) relating to a distribution content stored, for example, in the content database 348 or the like in an associated relationship with the distribution content.

The license issuance section 342 issues a license (right information; Usage Right) of a content distributed by the content distribution section 344 described hereinabove. The license issuance section 342 can issue a license of a different type depending upon the type of the copyright management method.

For example, where copyright management of the group management type is to be performed, the license issuance section 342 issues a license including a leaf ID corresponding to the user who purchases a distribution content in an associated relationship with the distribution content. Thereupon, the license issuance section 342 may acquire the leaf ID corresponding to the user from the group registration database 324 described hereinabove or may be acquired from the user authentication section 314.

After the license issuance section 342 issues a license in this manner, the content distribution server 34 transmits a file of the distribution content and a file of the license including the leaf ID corresponding to the user who purchases the distribution contents in an associated relationship with each other to the content processing apparatus 10. As a result, the content processing apparatus 10 receiving such a distribution content and a license as described above converts the leaf ID into a group ID and applies the group ID to the distribution content such that the group ID functions as a source ID for the distribution content to execute copyright management of the group management type described hereinabove.

On the other hand, where copyright management of the check-in check-out type is to be performed, the license issuance section 342 issues a license, in which utilization condition information (Usage rule) such as check-in/out time number restriction, reproduction time number restriction, reproduction validity term and so forth is described, in an associated relationship with the distribution content. Thereupon, the license issuance section 342 may produce a license of a utilization condition type desired by the user based on license model information of the license database 346.

After the license issuance section 342 issues a license in this manner, the content distribution server 34 transmits a file of the distribution content and a file of the license including the utilization condition information in an associated relationship with each other to the content processing apparatus 10. As a result, the content processing apparatus 10 receiving such a distribution content and a license including the utilization condition information as described above executes copyright management of the check-in check-out type based on the license.

The license issuance section 342 stores and manages the issued license into and in the license database 346.

As described above, upon distribution of a content to a content processing apparatus 10, the content distribution server 34 transmits the distribution content and the license thereof in a set. Thereupon, when a content of the group management type is to be distributed, the content distribution server 34 places the leaf ID into the license, but when a content of the check-in check-out type is to be distributed, the content distribution server 34 places the utilization condition information into the license.

It is to be noted that, while, in the foregoing description, the content distribution server 34 transmits a distribution content and a license in separate files, the content distribution server 34 may otherwise transmit them in the same file. Further, while, in the foregoing description, the content distribution server 34 notifies, upon distribution of a content of the group management type, a content processing apparatus 10 of a leaf ID and the content processing apparatus 10 produces a group ID based on the received leaf ID, the production of a group ID is not limited to the example described above. For example, the content distribution server 34 may produce a group ID based on a leaf ID in advance and notify the content processing apparatus 10 of the produced group ID.

Now, the charging server is described. The charging server 38 performs a charging process in response to distribution of a content by the content distribution server 34 described hereinabove. The charging server 38 includes, for example, a charging processing section 382 and a charging information database 384.

The charging information database 384 is a database including charging information for each user and stored in a storage apparatus (not shown) such as a HDD provided in the charging server 38.

The charging processing section 382 performs a charging process of requesting, for example, a user who receives distribution of a content to pay an amount of money according to the content to be distributed. Accounting information such as an amount of money claimed, a settling method and a settling date generated by the charging process is stored, for example, into the charging information database 384.

Figure 13:
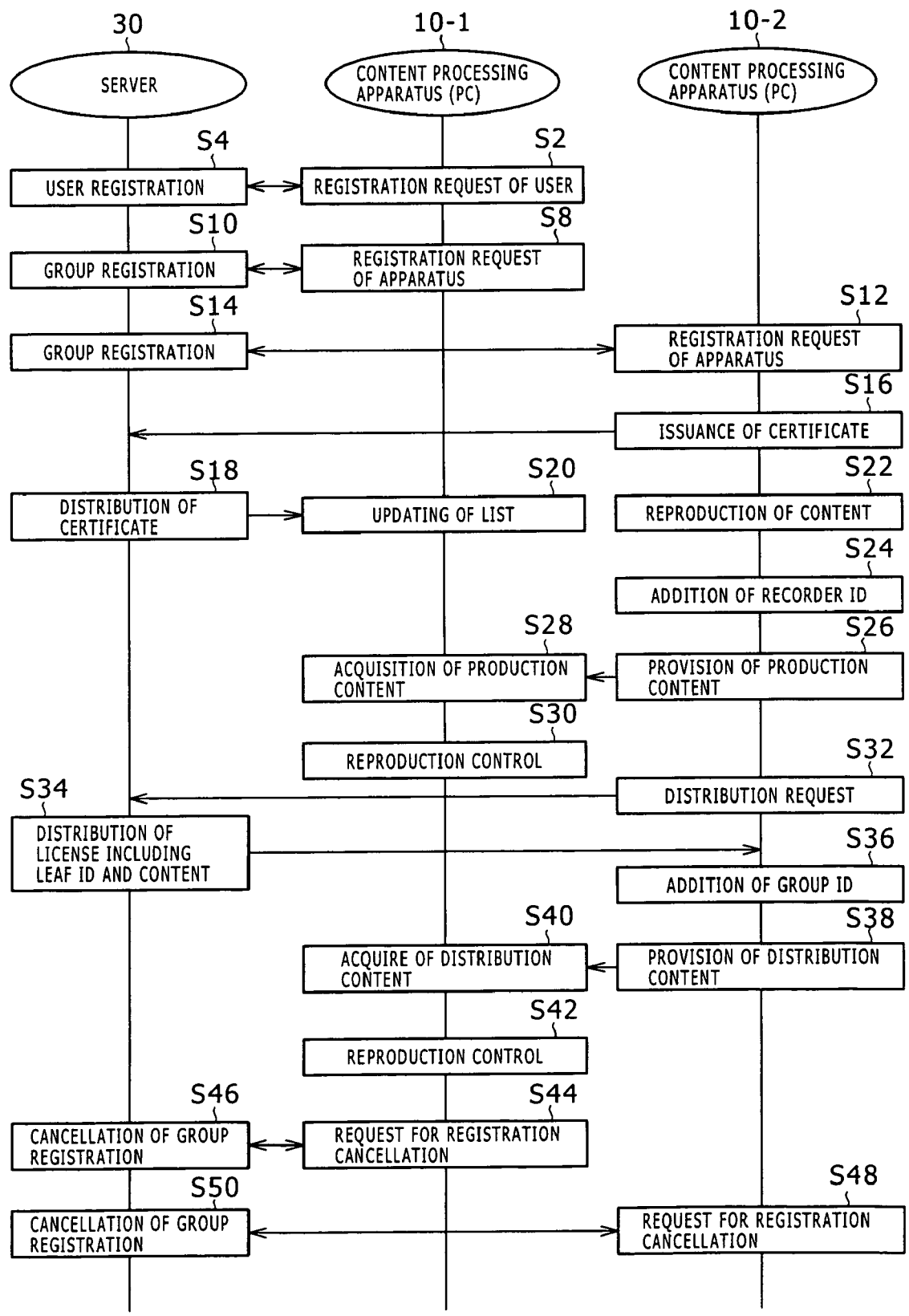
FIG. 13 is a timing chart illustrating a basic flow of a content sharing method according to the embodiment.

Now, a basic flow of a content sharing method which makes use of such a content sharing system 100 as described above is described with reference to FIG. 13. FIG. 13 is a timing chart illustrating a basic flow of the content sharing method according to the present embodiment.

As shown in FIG. 13, a new user would first use the content processing apparatus (PC) 10-1 owned by the user itself to issue a user registration request for the content sharing service utilizing a copyright management scheme of the group management type described hereinabove to the WWW server 31 of the server 30 (S2). Consequently, the WWW server 31 performs a user authentication process of the user to apply a new leaf ID to the user and register the user (S4). It is to be noted that the user registration of the content sharing service may serve also as user registration of the content distribution service. Further, the user registration process described above may be performed by the group management server 32 in place of the WWW server 31.

Then, the user would use the content processing apparatus (PC) 10-1 and 10-2 owned by the user itself to issue a registration request of the two individual apparatus to the server 30 (S8, S12). Consequently, the group management server 32 group-registers the content processing apparatus 10-1 and 10-2 into an apparatus group of the user in accordance with such a registration request of the apparatus as just mentioned and notifies the content processing apparatus 10-1 and 10-2 of a leaf ID corresponding to the user (S10, S14). The content processing apparatus 10-1 and 10-2 convert the received leaf ID into a group ID and add the group ID into the source ID lists L of the content processing apparatus 10-1 and 10-2 themselves. It is to be noted that such apparatus group registration of the content processing apparatus 10 as described above need not be performed at the same time but may be performed at arbitrary timings different from each other.

Then, the content processing apparatus 10-2 issues a group certificate G which associates the group ID corresponding to the content processing apparatus 10-2 itself and a recorder ID with each other and transmits the group certificate G to the certificate management server 36 of the server 30 (S16). Then, the certificate management server 36 distributes the group certificate G of the content processing apparatus 10-2 to the content processing apparatus 10-1 (S18). It is to be noted that such distribution of the group certificate G as just described may be performed from the content processing apparatus 10-2 directly to the content processing apparatus 10-1 without the intervention of the certificate management server 36. Further, the group certificate G of the content processing apparatus 10-1 may be distributed to the content processing apparatus 10-2 similarly.

After the content processing apparatus 10-1 acquires the group certificate G distributed in such a manner as described above, it performs an updating process of the source ID list L owned by the content processing apparatus 10-1 itself (S20). In this list updating process, where the content processing apparatus 10-1 and 10-2 are registered in the same apparatus group upon the group registration described hereinabove, since both apparatus have the same group ID, the content processing apparatus 10-1 can add the recorder ID of the content processing apparatus 10-2 included in the group certificate G to the source ID list L of the content processing apparatus 10-1 itself. On the other hand, where the content processing apparatus 10-1 and 10-2 are registered in different apparatus groups, since the two apparatus have different group IDs from each other, the content processing apparatus 10-1 cannot add the recorder ID included in the group certificate G to the source ID list L of the content processing apparatus 10-1 itself.

In the following, a case is described wherein a content provided from the content processing apparatus 10-2 in such a situation as described above is acquired and shared by the content processing apparatus 10-1.

First, a case wherein a production content such as a ripped content is shared is described. The content processing apparatus 10-2 produces a content by ripping, self recording or the like (S22) and applies a recorder ID corresponding to the content processing apparatus 10-2 to the production content (S24). Then, the content processing apparatus 10-2 provides the production content to which the recorder ID is applied to the content processing apparatus 10-1 through the network 5, local line 9, storage medium 7 or the like (S26).

Then, the content processing apparatus 10-1 acquires the production content (S28) and executes a reproduction control process of the production content, for example, in response to a reproduction request of the user (S30). In this instance, if the recorder ID applied to the production content is included in the source ID list L of the content processing apparatus 10-1, then the content processing apparatus 10-1 can reproduce the production content, but if the recorder ID is not included in the source ID list L, then the content processing apparatus 10-1 cannot reproduce the content.

Now, another case wherein distribution content data are shared is described. First, the content processing apparatus 10-2 issues a distribution request of a content to the group management server 32 (S32). Consequently, the group management server 32 distributes the content whose distribution is requested and a license including the leaf ID corresponding to the content processing apparatus 10-2 to the content processing apparatus 10-2 (S34). Then, the content processing apparatus 10-2 converts the leaf ID in the received license into a group ID and applies the group ID to the distribution content (S36). Then, the content processing apparatus 10-2 provides the distribution content having the group ID applied thereto to the content processing apparatus 10-1 in a similar manner as described above (S38), and the content processing apparatus 10-1 acquires the distribution content (S40). Then, the content processing apparatus 10-1 executes a reproduction control process of the distribution content, for example, in response to a reproduction request of the user (S42). In this instance, if the group ID applied to the distribution content is included in the source ID list L of the content processing apparatus 10-1, then the content processing apparatus 10-1 can reproduce the distribution content, but if the group ID is not included in the source ID list L, the content processing apparatus 10-1 cannot reproduce the distribution content.

Further, if the content processing apparatus 10-1 and 10-2 individually issue a registration cancellation request (S44, S48), then the group management server 32 cancels the group registrations of the content processing apparatus 10-1 and 10-2 in response to the registration cancellation requests (S46, S50).

In such a content sharing method in which the content sharing system 100 is used as described above, if a plurality of content processing apparatus 10 owned by the same user are registered into the same apparatus group, then a production content and a distribution content can be shared comparatively freely between the content processing apparatus 10.

Now, processes of group-registering/registration-canceling a content processing apparatus (PC) 10 or a content reproduction apparatus (PD) 20 into and in the group management server 32 are described in detail. It is to be noted that the following processing flow is started in a state wherein user registration of the content sharing service into the group management server 32 is completed already and a leaf ID is not applied to a user who owns a content processing apparatus 10.

Figure 14:
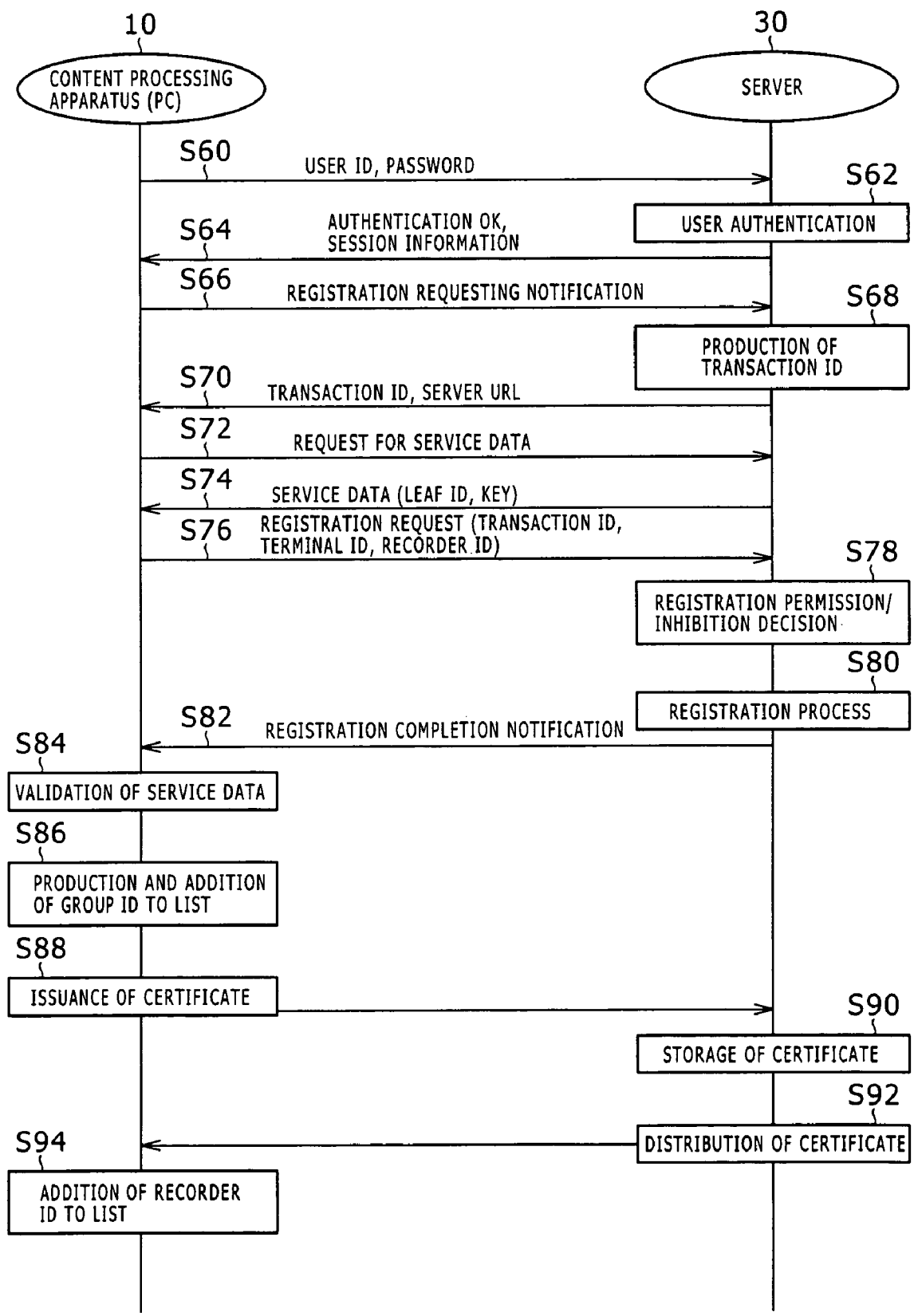
FIG. 14 is a timing chart illustrating a group registration process of a content processing apparatus (PC) according to the embodiment.

First, a process (group registration process) of apparatus-registering a content processing apparatus (PC) 10 into the group management server 32 according to the present embodiment is described. FIG. 14 is a timing chart illustrating a group registration process of the content processing apparatus (PC) 10 according to the present embodiment.

As shown in FIG. 14, first at steps S60 to S70, a communication connection is established safely between the content processing apparatus 10 of a registration requesting source and the server 30 through the network 5 and user authentication is performed. The processes at steps S60 to S70 are performed between a browser of the content processing apparatus 10 and the WWW server 31 of the server 30.

In particular, the content processing apparatus 10 of the registration requesting source first transmits a user ID and a password to the WWW server 31 in response to a user input (S60). Consequently, the WWW server 31 collates the received user ID and password with a user ID and a password registered in the group registration database 324 to perform a user authentication process (S62). If a result of this indicates that the user authentication results in failure, then the WWW server 31 does not permit the log-in and ends the registration process. On the other hand, if the user authentication results in success, then the WWW server 31 permits the log-in and transmits a notification that the user authentication results in success and session information for performing safe communication to the content processing apparatus 10 (S64). Then, the content processing apparatus 10 transmits a registration request notification to the WWW server 31 (S66). The WWW server 31 recognizes that the content processing apparatus 10 accesses the WWW server 31 for registration request based on the registration request notification. Then, the WWW server 31 produces a transaction ID (S68) and transmits the produced transaction ID and a URL (Uniform Resource Locator) which is an example of address information of the group management server 32 to the content processing apparatus 10 (S70). Consequently, the content processing apparatus 10 can thereafter access the group management server 32 referring to the received URL.

At next steps S72 to S86, processes for actually registering the content processing apparatus 10 into the group management server 32 are performed. The processes at steps S72 to S86 are performed between the copyright management section of the content processing apparatus 10 and the group management server 32 of the server 30.

In particular, the content processing apparatus 10 first issues a request for service data to the group management server 32 (S72). Consequently, the group management server 32 transmits service data to the content processing apparatus 10 (S74). The service data include a leaf ID corresponding to the authenticated user and a service common key described hereinabove. Then, the content processing apparatus 10 transmits the transaction ID received at step S70 described hereinabove and the terminal ID and the recorder ID corresponding to the content processing apparatus 10 itself to the group management server 32 to perform a registration request to the group management server 32 (S76). The terminal ID and the recorder ID are produced by the content processing apparatus 10. It is to be noted that the information transferred at steps S74 and S76 can be transmitted and received safely because falsification thereof from the outside is prevented by the session information described hereinabove.

Then, the group management server 32 decides whether or not registration of the content processing apparatus 10 should be permitted (S78). This registration permission/inhibition decision is performed, for example, based on an upper limit number of those content processing apparatus 10 which can be registered in the same apparatus group (for example, an upper limit number of terminal IDs (for example, three terminal IDs), an upper limit number of recorder IDs (for example, 10 recorder IDs)). More particularly, if, for example, three content processing apparatus 10 having different terminal IDs from each other are registered already in the apparatus group of the authenticated user, the group management server 32 inhibits registration of a new content processing apparatus 10. Further, if, for example, 10 content processing apparatus 10 having different recorder IDs from each other have been registered in the apparatus group of the user (irrespective of whether or not 10 content processing apparatus 10 remain registered), then the group management server 32 inhibits registration of a new content processing apparatus 10.

If such a result of the registration permission/inhibition decision at step S78 as described above indicates that the registration should not be permitted, then the group management server 32 transmits an error notification that the content processing apparatus 10 cannot be registered. On the other hand, if the result of the registration permission/inhibition decision indicates permission of the registration, then the group management server 32 performs a registration process of the content processing apparatus 10 of the registration requesting source described hereinabove (S80). In particular, the group management server 32 writes the terminal ID and the recorder ID received from the content processing apparatus 10 of the registration requesting source described above into a record of the authenticated user of the group registration database 324 to register the content processing apparatus 10. Further, the group management server 32 transmits a registration completion notification to the registered content processing apparatus 10 (S82).

Then, when the content processing apparatus 10 receives such a registration completion notification as described above, it validates the service data received at step S74 described hereinabove (S84). Further, the content processing apparatus 10 produces a group ID (both of a first group ID and a second group ID) based on the leaf ID in the validated service data and adds and stores the group ID to and into the source ID list L (S86). Consequently, the content processing apparatus 10 is enabled to reproduce a distribution content to which the group ID is applied and add a recorder ID of a group certificate G which includes the group ID into the source ID list L of the content processing apparatus 10 itself.

After such a registration process of the content processing apparatus 10 as described above, such a certificate issuance and distribution process as described below may be performed. In particular, the content processing apparatus 10 first issues a group certificate G including the group ID and the recorder ID corresponding to the content processing apparatus 10 itself and transmits the group certificate G to the certificate management server 36 (S88). Consequently, the certificate management server 36 stores the received group certificate G into the certificate database 364 (S90). Consequently, when a different content processing apparatus 10 is registered into the same apparatus group, the group certificate G can be distributed to share the recorder ID.

Furthermore, if one, two or more other content processing apparatus 10 are registered already in the same apparatus group, then the certificate management server 36 distributes the group certificates G of the other registered content processing apparatus 10 to the registered content processing apparatus 10 (S92). Consequently, the registered content processing apparatus 10 reads out the recorder IDs in the received group certificates G and adds the recorder IDs to the source ID list L of the content processing apparatus 10 itself (S94). Consequently, the content processing apparatus 10 can thereafter reproduce a ripped content ripped by any other content processing apparatus 10 which belongs to the same apparatus group.

Figure 15:
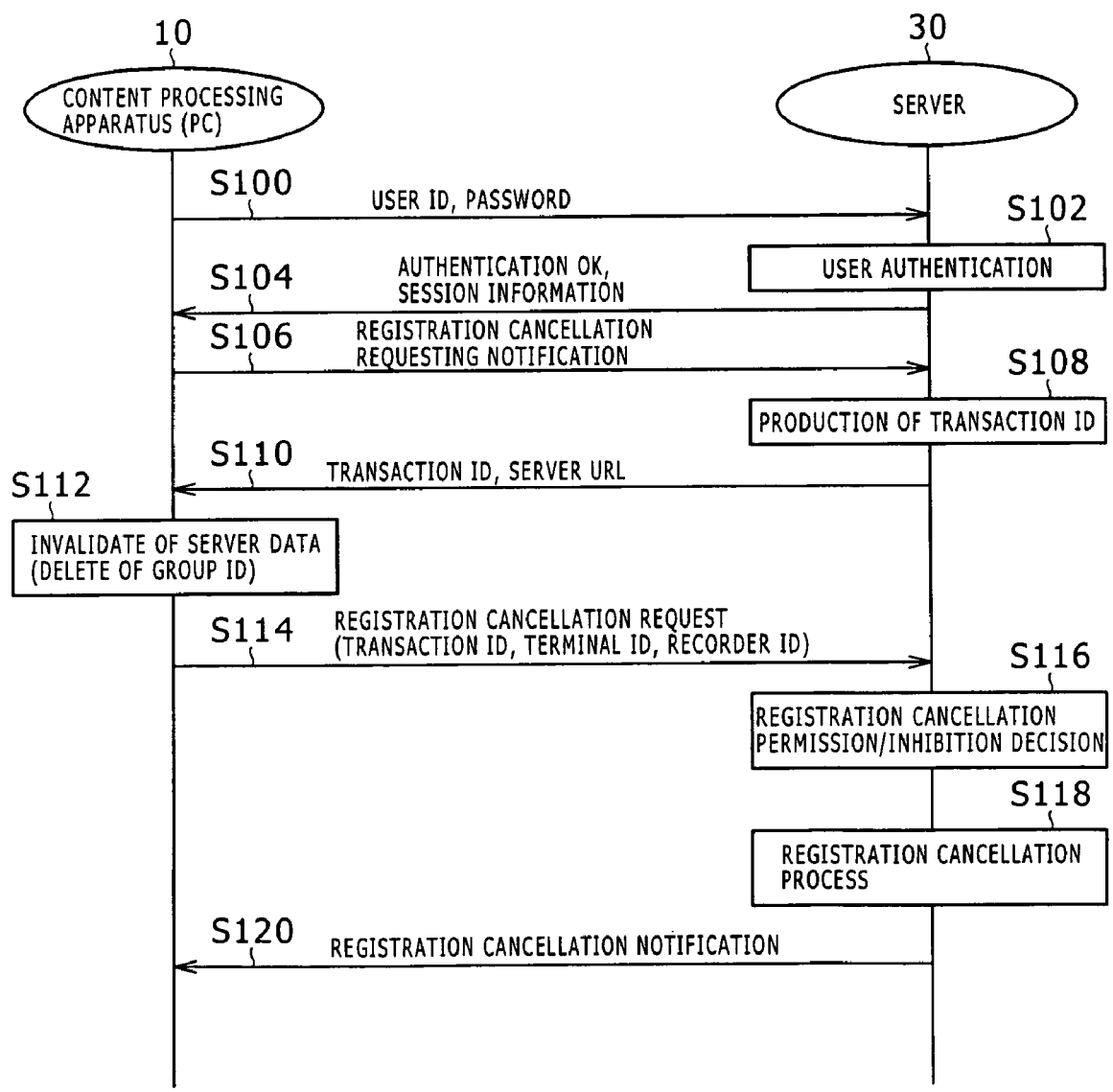
FIG. 15 is a timing chart illustrating a group registration cancellation process of the content processing apparatus (PC) according to the embodiment.

Now, a process (group registration cancellation process) of canceling the registration of a content processing apparatus (PC) 10 according to the present embodiment from an apparatus group registered already is described with reference to FIG. 15. FIG. 15 is a timing chart illustrating a group registration cancellation process of a content processing apparatus (PC) 10 according to the present embodiment.

As shown in FIG. 15, first at steps S100 to S110, a communication connection is established safely between the content processing apparatus 10 of a registration cancellation requesting source and the server 30 through the network 5 and user authentication is performed. The processes at steps S100 to S110 are performed between the browser of the content processing apparatus 10 and the WWW server 31 of the server 30. It is to be noted that, since the processes at such steps S100 to S110 mentioned above are substantially same as those at steps S60 to S70 of the group registration process of the content processing apparatus 10 described hereinabove with reference to FIG. 14 except that a registration cancellation requesting notification is issued from the content processing apparatus 10 to the WWW server 31 at step S106, detailed description of them is omitted.

At next steps S112 to S120, processes for actually canceling the registration of the content processing apparatus 10 are performed. The processes at steps S112 to S120 are performed between the copyright management section of the content processing apparatus 10 and the group management server 32 of the server 30.

In particular, the content processing apparatus 10 invalidates service data acquired from the group management server 32 upon the group registration described hereinabove and held in the content processing apparatus 10 (S112). More particularly, the content processing apparatus 10 deletes the group ID and the recorder ID included in the source ID list L of the content processing apparatus 10 itself. Consequently, the content processing apparatus 10 is disabled to reproduce a content to which any of the source IDs is applied.

Then, the content processing apparatus 10 transmits the transaction ID received at step S110 described hereinabove and the terminal ID and the recorder ID corresponding to the content processing apparatus 10 itself to the group management server 32 to issue a registration cancellation request to the group management server 32 (S114). It is to be noted that the information transmitted at step S114 can be transmitted safely because falsification thereof from the outside is prevented with the session information described hereinabove.

Then, when the registration cancellation request is received, the group management server 32 decides whether or not the registration of the content processing apparatus 10 can be canceled (S116). For example, in a case wherein the content processing apparatus 10 of the registration cancellation requesting source is not registered as yet or the registration cancellation request is illegal or in a like case, the group management server 32 does not permit the registration cancellation.

If the registration cancellation is not permitted as a result of such a registration permission/inhibition decision at step S116 as described above, then the group management server 32 transmits an error notification that the registration cancellation in the content processing apparatus 10 is not permitted.

On the other hand, if the registration cancellation is permitted as a result of the registration permission/inhibition decision at step S116, then the group management server 32 performs a registration cancellation process of the content processing apparatus 10 of the registration cancellation requesting source (S118). In particular, the group management server 32 deletes the terminal ID of the content processing apparatus 10 of the registration cancellation source from the record of the authenticated user of the group registration database 324. Thereupon, the record ID of the content processing apparatus 10 of the registration requesting source is left without being deleted from the group registration database 324. Consequently, when the ripped content sharing service is provided, a disadvantage that an excessively great number of content processing apparatus 10 having a ripping function are registered and a ripped content becomes shared by the large number of content processing apparatus 10 can be prevented.

Then, the group management server 32 transmits a registration cancellation completion notification to the content processing apparatus 10 whose registration has been canceled (S120).

As described above, in the registration cancellation process of the content processing apparatus 10, after service data are invalidated first on the group management server 32 side (S112), the registration cancellation process is performed on the group management server 32 side (S118). Consequently, as regards the content processing apparatus 10 whose registration is cancelled by the group management server 32 side, service data held by the content processing apparatus 10 can be invalidated with certainty to delete the group ID and so forth from the source ID list L. Therefore, such a situation that, although the registration of a content processing apparatus 10 is cancelled on the group management server 32, service data of the content processing apparatus 10 are not actually invalidated can be prevented.

The group registration process and the registration cancellation process of the content processing apparatus (PC) 10 are described above. It is to be noted that, in order to register a content processing apparatus 10 registered already once again, the registration of the content processing apparatus 10 must be cancelled once.

Figure 16:
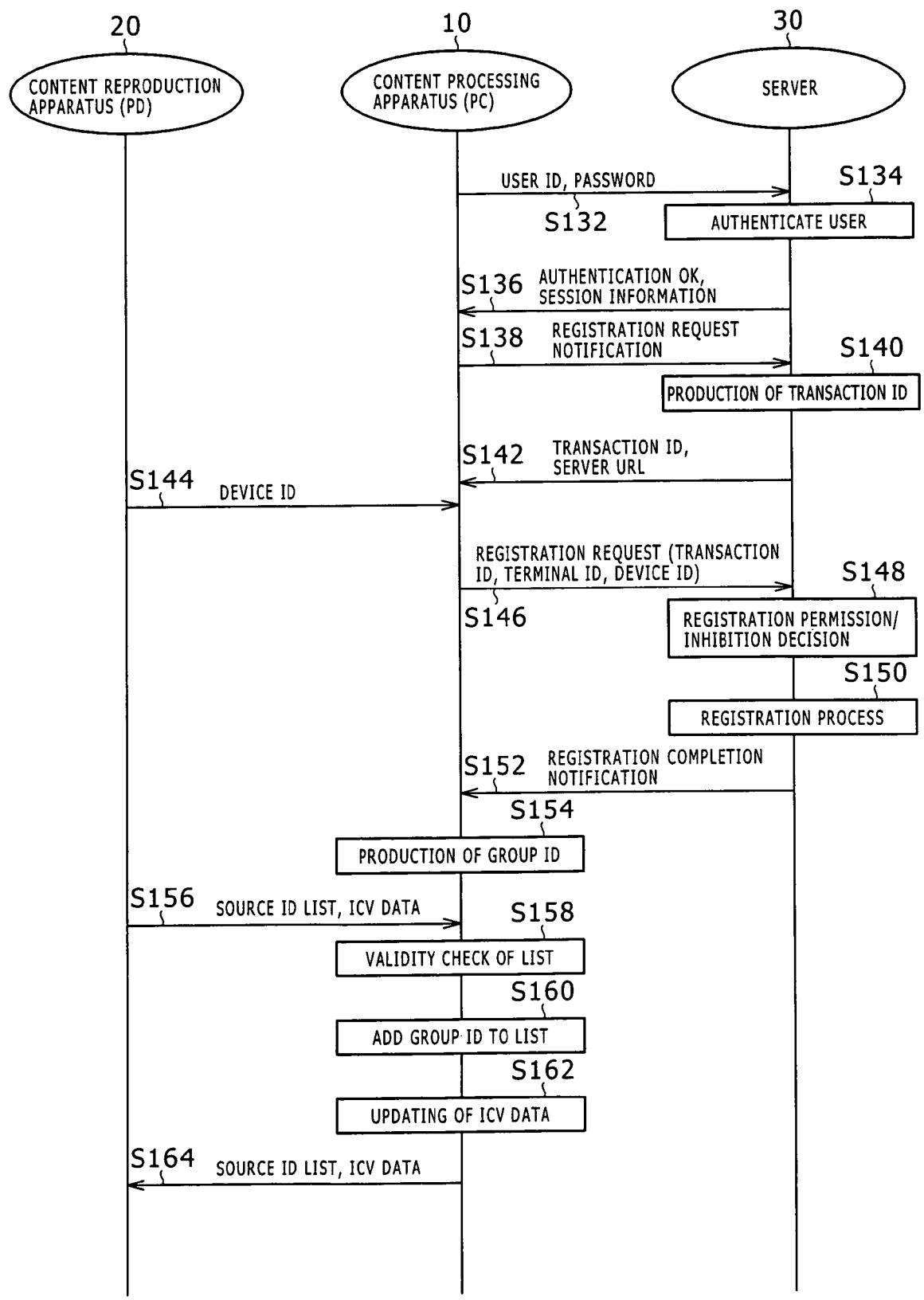
FIG. 16 is a timing chart illustrating a group registration process of a content reproduction apparatus (PD) according to the embodiment.

Now, a process (group registration process) of apparatus-registering a content reproduction apparatus (PD) 20 into the group management server 32 is described with reference to FIG. 16. FIG. 16 is a timing chart illustrating a group registration process of the content reproduction apparatus (PD) 20 according to the present invention.

In order to group-register a content reproduction apparatus (PD) 20, the content reproduction apparatus (PD) 20 of the object of registration is connected to a content processing apparatus (PC) 10, which is group-registered already, through the local line 9, and this content processing apparatus (PC) 10 is used to group-register the content reproduction apparatus (PD) 20 into the group management server 32.

As shown in FIG. 16, first at steps S132 to S142, a communication connection is established safely between the content processing apparatus 10 of the registration requesting source connected to the content reproduction apparatus 20 of the registration object and the server 30 to perform user authentication. The processes at steps S132 to S142 are performed between the browser of the content processing apparatus 10 and the WWW server 31 of the server 30. It is to be noted that, since the processes at such steps S132 to S142 mentioned above are substantially same as those at steps S60 to S70 of the group registration process of the content processing apparatus 10 described hereinabove with reference to FIG. 14 except that a registration requesting notification of the content reproduction apparatus 20 is issued from the content processing apparatus 10 to the WWW server 31 at step S138, detailed description of them is omitted.

Then at steps S144 to S164, processes for actually registering the content reproduction apparatus 20 into the group management server 32 using the content processing apparatus 10 are performed. The processes at steps S144 to S164 are executed among the content reproduction apparatus 20, the copyright management section of the content processing apparatus 10 and the group management server 32 of the server 30.

In particular, the content processing apparatus 10 first acquires the device ID of the content reproduction apparatus 20 of the registration object from the content reproduction apparatus 20 through the local line 5 (S144). Then, the content processing apparatus 10 transmits the transaction ID received at step S142 described hereinabove, the terminal ID of the content processing apparatus 10 itself and the recorder ID of the content reproduction apparatus 20 to the group management server 32 to issue a registration request of the content reproduction apparatus 20 to the group management server 32 (S146). It is to be noted that the information transferred at step S144 can be transmitted and received safely because falsification thereof from the outside is prevented with the session information described hereinabove.

Then, when the group management server 32 receives the registration request, it decides whether or not registration of the content reproduction apparatus 20 of the registration object should be permitted (S148). In the present embodiment, since there is no restriction to the registration number of content reproduction apparatus 20, the registration is permitted unconditionally. However, the restriction is not limited to that of the present example, but an upper limit number may be set to the registration number of content reproduction apparatus 20. Further, if the content processing apparatus 10 of the registration requesting source is not registered as yet, then the group management server 32 does not permit the registration of the content reproduction apparatus 20 of the registration object.

If the registration permission/inhibition decision at step S148 indicates a result that the registration should not be permitted, then the group management server 32 transmits an error notification to the content processing apparatus 10 that the registration is not permitted.

On the other hand, if the result of the registration permission/inhibition decision indicates that the registration should be permitted, then the group management server 32 performs a registration process of the content reproduction apparatus 20 of the registration object (S150). In particular, the group management server 32 sets a record of the authenticated user in the group registration database 324 based on the terminal ID and so forth of the content processing apparatus 10 of the registration requesting source described hereinabove and writes the device ID of the content reproduction apparatus 20 of the registration object into the record just described. Further, the group management server 32 transmits a registration completion notification to the content processing apparatus 10 of the registration requesting source (S152).

Then, when the content processing apparatus 10 receives the registration completion notification, it produces a group ID (both of a first group ID and a second group ID) based on the leaf ID included in the service data acquired upon registration of the content processing apparatus 10 itself (S154).

Then, the content processing apparatus 10 acquires the source ID list L and the ICV data of the registered content reproduction apparatus 20 from the content reproduction apparatus 20 (S156).

Furthermore, the content processing apparatus 10 checks the validity of the source ID list L based on the ICV data acquired at S156 (S158). As described hereinabove, in the copyright management scheme of the group management type, since ICV data includes a MAC value which is a hash value of the source ID list L, the content processing apparatus 10 can determine the MAC value of the source ID list L acquired from the content processing apparatus 10 and collate the MAC value with the MAC value of the ICV data to detect whether or not the source ID list L is in a falsified condition.

If it is decided as a result of the check of the validity at S158 that the source ID list L is not valid (is falsified), then an error is decided and updating of the source ID list L is not performed.

On the other hand, if it is decided as a result of the check of the validity at S158 that the source ID list L is valid, then the content processing apparatus 10 updates the source ID list L of the content reproduction apparatus 20 (S160). In particular, the content processing apparatus 10 adds the group ID produced at S154 described hereinabove to the source ID list L acquired from the content reproduction apparatus 20. Thereupon, the recorder ID included in the source ID list L of the content processing apparatus 10 itself may be further added to the source ID list L acquired from the content reproduction apparatus 20.

Furthermore, the content processing apparatus 10 updates the ICV data of the content reproduction apparatus 20 (S162). In particular, the content processing apparatus 10 determines the MAC value of the source ID list L of the content reproduction apparatus 20 updated at S160 described hereinabove to produce ICV data newly.

Thereafter, the content processing apparatus 10 transmits the source ID list L updated at S160 and the ICV data updated at S162 to the content reproduction apparatus 20 so as to be written into the storage section of the content reproduction apparatus 20 (S164). It is to be noted that, at S156 and S164, the ICV data are transmitted and received between the content processing apparatus 10 and the content reproduction apparatus 20 so as not to be falsified using the session information.

Since the group ID is added to the source ID list L of the content reproduction apparatus 20 through such a group registration process of the content reproduction apparatus 20 as described above, the content reproduction apparatus 20 itself can thereafter reproduce a distribution content to which the group ID is applied.

Figure 17:
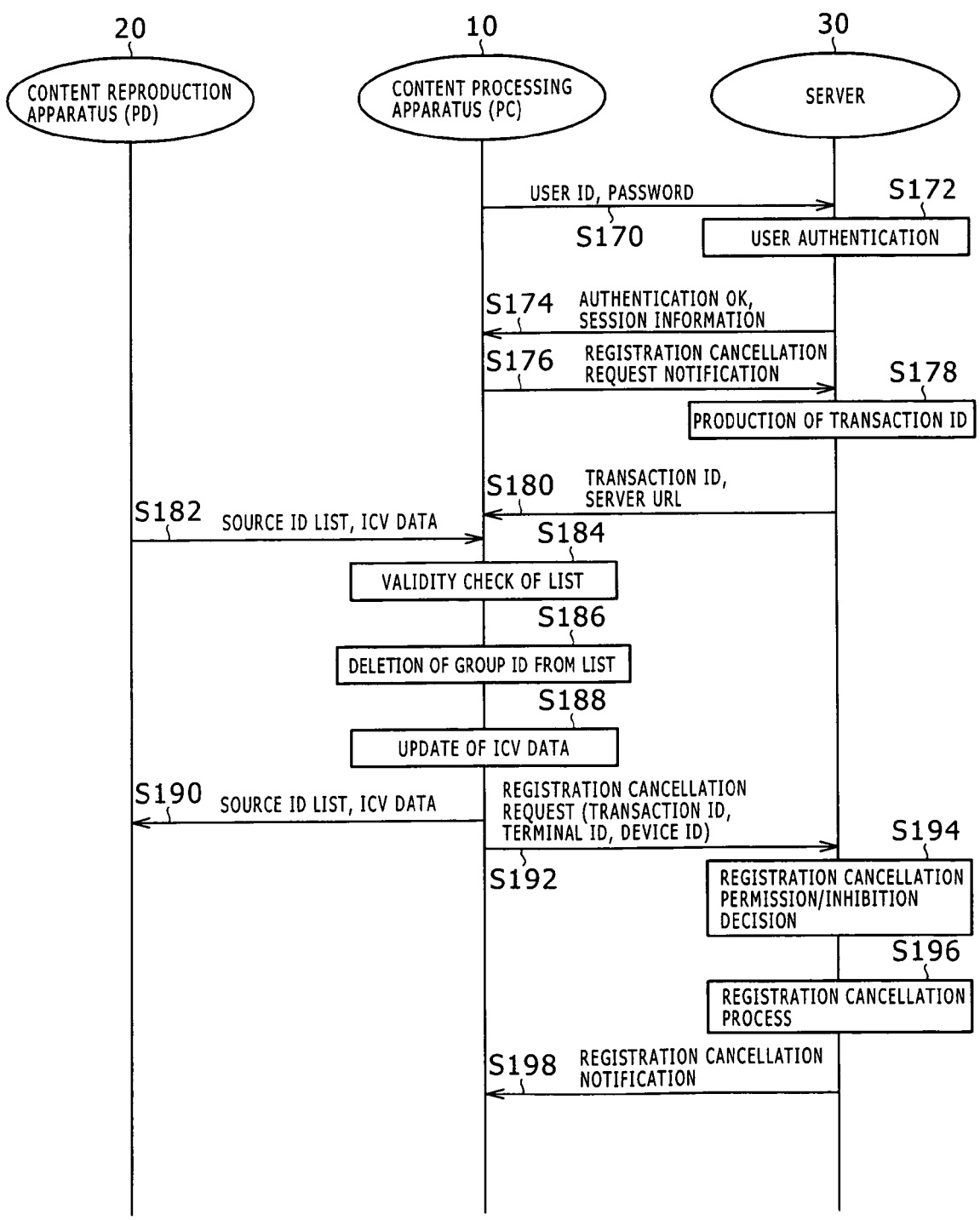
FIG. 17 is a timing chart illustrating a group registration cancellation process of the content reproduction apparatus (PD) according to the embodiment.

Now, a process (group registration cancellation process) of canceling a registration of a content reproduction apparatus (PD) 20 according to the present embodiment from an apparatus group registered already is described with reference to FIG. 17. FIG. 17 is a timing chart illustrating a group registration cancellation process of a content reproduction apparatus (PD) 20 according to the present embodiment.

Also such a group registration cancellation process of a content reproduction apparatus (PD) 20 as just mentioned is performed by locally connecting the content reproduction apparatus (PD) 20 to a content processing apparatus (PC) 10 such that the content processing apparatus (PC) 10 issues a registration cancellation request to the server 30 similarly as in the group registration process of the content reproduction apparatus (PD) 20 described hereinabove.

As shown in FIG. 17, first at steps S170 to S180, a communication connection is established safely between the content processing apparatus 10 of the registration requesting source and the server 30 through the network 5 to perform user authentication. The processes at S170 to S180 are performed between the browser of the content processing apparatus 10 and the WWW server 31 of the server 30. It is to be noted that such processes at S170 to S180 are substantially similar to those at steps S60 to S70 of the content processing apparatus 10 described hereinabove with reference to FIG. 14 except that a registration cancellation requesting notification of the content reproduction apparatus 20 is issued from the content processing apparatus 10 to the WWW server 31, and therefore, detailed description of the same is omitted.

At next steps S182 to S198, processes for actually canceling the registration of the content processing apparatus 10 are performed. The processes at S182 to S198 are performed between the copyright management section of the content processing apparatus 10 of the registration cancellation requesting source and the group management server 32 of the server 30.

In particular, the content processing apparatus 10 first acquires the source ID list L and the ICV data of the content reproduction apparatus 20 of the registration cancellation object from the content reproduction apparatus 20 (S182).

Further, the content processing apparatus 10 checks the validity of the acquired source ID list L based on the ICV data acquired at S182 in a similar manner as at S158 described hereinabove (S184). If it is decided as a result of the check of the validity at S184 that the source ID list L is not valid (is falsified), then an error is decided and updating of the source ID list L is not performed.

On the other hand, if it is decided as a result of the check of the validity at S184 that the source ID list L is valid, then the content processing apparatus 10 updates the source ID list L of the content reproduction apparatus 20 (S186). In particular, the content processing apparatus 10 deletes the group ID from the source ID list L acquired from the content reproduction apparatus 20. Thereupon, the recorder ID included in the source ID list L may be deleted further. By this, the content reproduction apparatus 20 is disabled from reproducing a content to which the source ID is applied.

Furthermore, the content processing apparatus 10 updates the ICV data of the content reproduction apparatus 20 (S188). In particular, the content processing apparatus 10 determines the MAC value of the source ID list L of the content reproduction apparatus 20 updated at S186 to produce new ICV data.

Thereafter, the content processing apparatus 10 transmits the source ID list L updated at S186 and the ICV data updated at S188 to the content reproduction apparatus 20 so as to be written into the storage section of the content reproduction apparatus 20 (S190).

Then, the content processing apparatus 10 issues a registration cancellation request of the content reproduction apparatus 20 of the registration cancellation object to the group management server 32 (S192). In particular, the content processing apparatus 10 transmits the transaction ID received at S180 described hereinabove, the terminal ID corresponding to the content processing apparatus 10 itself and the device ID of the content reproduction apparatus 20 of the registration cancellation object to the group management server 32 to issue a registration cancellation request. It is to be noted that the information transmitted at S192 can be transmitted safely because falsification thereof from the outside is prevented with the session information described hereinabove.

Thereafter, when the group management server 32 receives the registration cancellation request, it decides whether or not the registration of the content reproduction apparatus 20 should be canceled (S194). For example, if the registration cancellation request is illegal, then the group management server 32 does not permit cancellation of the registration.

If the registration cancellation should not be permitted as a result of such a registration permission/inhibition decision at S194 as described above, then the group management server 32 transmits an error notification that the registration cancellation of the content processing apparatus 10 is not permitted.

On the other hand, if the registration cancellation should be permitted as a result of the registration permission/inhibition decision at 5194, then the group management server 32 performs a registration cancellation process of the content reproduction apparatus 20 of the registration cancellation object (S196). In particular, the group management server 32 specifies a record of the authenticated user in the group registration database 324 based on the terminal ID and so forth of the content processing apparatus 10 of the registration requesting source and deletes the device ID of the content reproduction apparatus 20 of the registration calculation object from the record.

Thereafter, the group management server 32 transmits a registration cancellation completion notification to the content processing apparatus 10 of the registration cancellation requesting source (S198).

As described above, in the registration cancellation process of the content reproduction apparatus 20, after the group ID is deleted (S186) from the source ID list L of the content reproduction apparatus 20 on the content processing apparatus 10 side first, the registration cancellation process (S196) is performed on the group management server 32 side. Consequently, as regards the content reproduction apparatus 20 whose registration is canceled by the group management server 32 side, the group ID can be deleted with certainty from the source ID list L of the content reproduction apparatus 20. Therefore, such a situation that, although the registration is cancelled on the group management server 32, the group ID remains in the source ID list L of the content reproduction apparatus 20 can be prevented.

The basic flows of the group registration process and the group registration cancellation process of the content processing apparatus (PC) 10 and the content reproduction apparatus (PD) 20 are described above. By such processes as just mentioned, even when the owner of the same content processing apparatus 10 or content reproduction apparatus 20 changes, a group change of the content processing apparatus 10 can be performed by performing registration cancellation and re-registration.

It is to be noted that, even if registration of a new group or changing of a group of a content processing apparatus 10 which has a ripping function is performed, the recorder ID of the content processing apparatus 10 does not vary. Therefore, a content ripped by the content processing apparatus 10 before the new group registration or the group change can be reproduced freely by any apparatus of the apparatus group to which the content processing apparatus 10 belongs also after the new group registration or the group change. Consequently, the convenience to the user of the content processing apparatus 10 having a ripping function is enhanced and the purchase merit rises.

Figure 18:
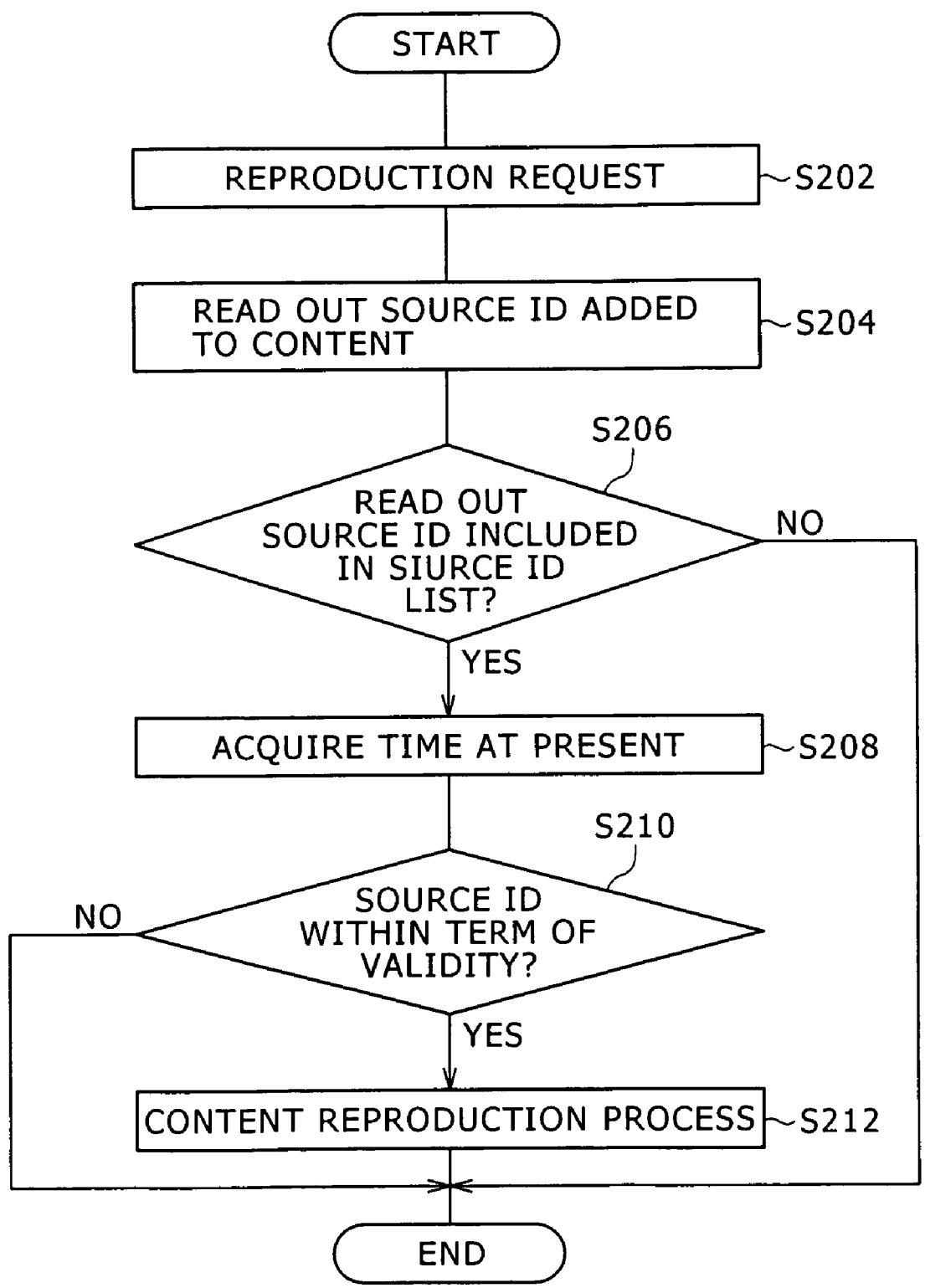
FIG. 18 is a flow chart illustrating a content reproduction control process of the group management type of the content processing apparatus (PC) according to the embodiment.

Now, a content reproduction control process of the group management type by a content processing apparatus 10 according to the present embodiment is described with reference to FIG. 18. FIG. 18 is a flow chart illustrating a content reproduction control process of the group management type by a content processing apparatus 10 according to the present embodiment. It is to be noted that the reproduction control process of the group management type is a process of controlling reproduction of a content based on a source ID applied to a content and a source ID list L.

As shown in FIG. 18, first at step S202, a reproduction request is issued, for example, by the user (step S202; reproduction requesting step). The user would operate the inputting apparatus 108 of the content processing apparatus 10 to select a desired content and issue an instruction to the content reproduction section 170 to reproduce the selected content.

Then at step S204, the source ID applied to the content is read out (step S204). The reproduction permission/inhibition decision section 172 of the content reproduction section 170 first reads out the content of the reproduction requesting object from the content database 116, storage medium 7 or the like and then reads out and interprets the source ID included in a license applied to the content.

Further at step S206, it is decided whether or not the source ID read out from the content described above is included in the source ID list L of the content processing apparatus 10 (step S206). In particular, the reproduction permission/inhibition decision section 172 of the content reproduction section 170 reads out the source ID list L, for example, from the storage apparatus 111 and interprets the source ID list L. Then, the reproduction permission/inhibition decision section 172 compares the source ID read out from the content described above and the source IDs included in the source ID list L with each other to decide whether or not the source ID read out from the content described above is included in the source ID list L.

If a result of the decision reveals that the source ID read out from the content is included in the source ID list L, then the reproduction permission/inhibition decision section 172 permits reproduction of the content, whereafter the processing advances to step S208. On the other hand, if the source ID read out from the content is not included in the source ID list L, then the reproduction permission/inhibition decision section 172 does not permit reproduction of the content, and the reproduction control process is ended.

Further, at step S208, the present time is acquired (step S208). The reproduction permission/inhibition decision section 172 acquires the present time from a clock apparatus (not shown) built in the content processing apparatus 10.

Thereafter, at step S210, it is decided whether or not the present time acquired as described above is within a term of validity of the source ID read out from the content described hereinabove (step S210). In particular, the reproduction permission/inhibition decision section 172 first reads out validity term information corresponding to the source ID read out from the content described hereinabove from the source ID list L. The validity term information corresponding to the source ID read out from the content described hereinabove is recorded in an associated relationship with the source ID, for example, in the source ID list L.

Then, the reproduction permission/inhibition decision section 172 decides whether or not the acquired present time described above exceeds the term of validity of the source ID described above. If a result of the decision reveals that the present time exceeds the term of validity of the source ID described above, then the term of the source ID has run out. Therefore, the reproduction permission/inhibition decision section 172 does not permit reproduction of the content described above but ends the reproduction control process.

On the other hand, if the present time is within the term of validity of the source ID described above, the reproduction permission/inhibition decision section 172 permits reproduction of the content, whereafter the processing advances to step S212. As a result, at step S212, the reproduction execution section 174 reproduces the content (step S212).

As described above, the content reproduction control process of the group management type according to the present embodiment is executed based on the source ID in the source ID list L applied to the content and the validity term information of the source ID. According to such reproduction control as just described, it is possible to set a term of validity of reproduction of a content in a unit of a source ID to permit/inhibit reproduction of the content. It is to be noted that the validity of term of the source ID need not necessarily be set.

Figure 19:
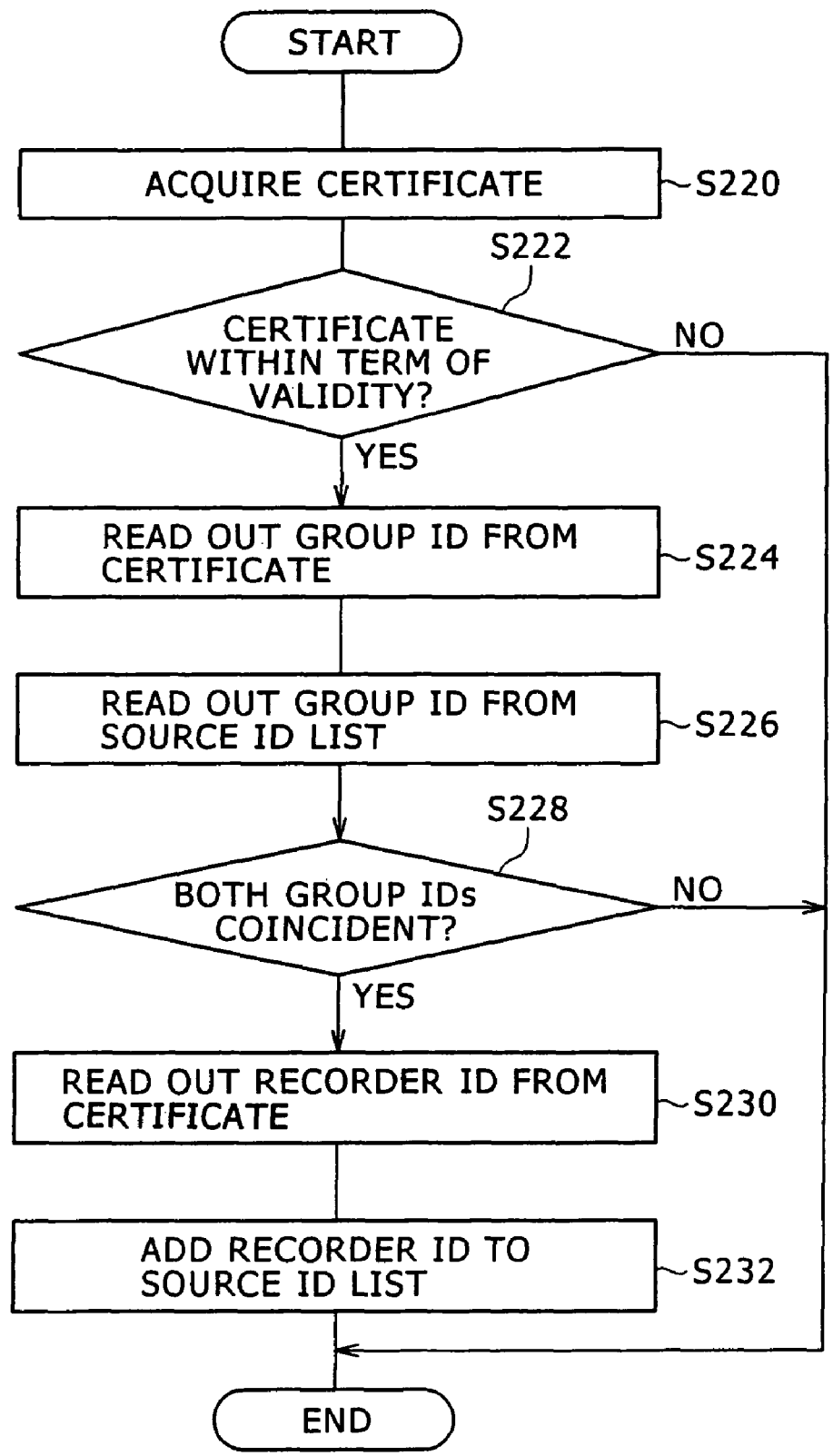
FIG. 19 is a flow chart illustrating a source ID list updating process of the content processing apparatus according to the embodiment.

Now, an updating process of the source ID list L by a content processing apparatus (PC) 10 according to the present embodiment is described with reference to FIG. 19. FIG. 19 is a flow chart illustrating an updating process of the source ID list L by a content processing apparatus 10 according to the present embodiment. The present list updating process is an example wherein the content processing apparatus 10 acquires a distributed group certificate G and updates the source ID list L of the content processing apparatus 10 itself or the source ID list L of a content reproduction apparatus 20 locally connected to the content processing apparatus 10 based on the acquired group certificate G.

As shown in FIG. 19, first at step S220, the content processing apparatus 10 acquires a group certificate G distributed from a different content processing apparatus 10 or the certificate management server 36 (step S220). The content processing apparatus 10 can acquire a group certificate G by receiving the group certificate G through the network 5 or the local line 9 or by reading out the group certificate G recorded on the storage medium 7.

Then at step S222, the content processing apparatus 10 decides whether or not the acquired group certificate G is within a term of validity (step S222). In particular, the list updating section 140 of the content processing apparatus 10 first reads out validity term information included in the group certificate G and acquires present time information from the clock apparatus built in the content processing apparatus 10. Then, the list updating section 140 decides whether or not the present time is within the term of validity of the group certificate G. If a result of the decision proves that the group certificate G is within the term of validity, then the processing advances to S224. On the other hand, if the group certificate G is no longer valid, then updating of the list is rejected and the list updating process is ended.

Further, at step S224, the list updating section 140 reads out the group ID included in the acquired group certificate G (step S224).

Thereafter, at step S226, the list updating section 140 reads out the group ID possessed by the content processing apparatus 10 itself (step S226). In the present embodiment, since each content processing apparatus 10 retains a group ID in the source ID list L thereof, the list updating section 140 reads out the group ID corresponding to the content processing apparatus 10 from the source ID list L.

Then at step S228, the list updating section 140 decides whether or not the group ID read out from the acquired group certificate G and the group ID corresponding to the content processing apparatus 10 itself coincide with each other (step S228). If a result of the decision proves that the two group IDs coincide with each other, then the updating of the list is permitted, and the processing advances to step S230. On the other hand, if the two group IDs are different from each other, then the updating of the list is rejected, and the list updating process is ended.

Further at step S230, the list updating section 140 adds the recorder ID included in the group certificate G to the source ID list L (step S230). In particular, the list updating section 140 reads out the recorder ID from the acquired group certificate G and writes the recorder ID into the source ID list L. Consequently, the content processing apparatus 10 can thereafter reproduce a ripped content to which the recorder ID is applied. The updating process of the source ID list L based on the group certificate G is ended thereby.

The basic configuration of the content sharing system 100 and the content sharing method which utilizes the content sharing system 100 according to the present embodiment is described above. According to the content sharing system 100, copyright management of the group management method and the copyright management system of the check-in check-out type complying with the SDMI can be implemented.

Where the copyright management of the group management type from between the two copyright management systems described above is to be performed by the content sharing system 100, contents shared between a plurality of apparatus are managed in a unit of a content providing source (in a unit of a user or a unit of an apparatus of a providing source) and reproduction of a content by a content processing apparatus 10 is restricted in response to the content providing source to perform copyright management of the content. In other words, sharing of a content between apparatus can be permitted/inhibited in a unit of a content providing source.

Therefore, where the content providing source is an illegal content providing source, the content processing apparatus 10 of the content acquiring side can collectively inhibit reproduction of all of contents acquired from the illegal content providing source. Accordingly, such illegal acts as an act of distributing a large amount of ripped contents to many and unspecific users and an act of laying a distribution content open on the Internet so that it can be downloaded can be prevented effectively.

On the other hand, where the content providing source is a legal content providing source, if the source ID of the content providing source is added to the source ID list L once to permit sharing of contents, then also another content can later be reproduced freely only if the content is provided from the content providing source by which the sharing has been permitted. Therefore, a content can be copied freely between a plurality of apparatus within a range of private use. Consequently, copyright management proximate to that of a conventional distribution system of analog contents by which unrestricted copying is acknowledged only within private utilization can be implemented.

Consequently, the content sharing system 100 according to the embodiment described above can achieve both of (1) a copyright management function of restricting an act of illegally utilizing a content without paying a reasonable consideration for a content distribution service and so forth and (2) enhancement of the degree of freedom in content utilization within a range of private utilization with a reasonable consideration paid.

Further, in such a copyright management process of the group management type as described above, only it is necessary in principle to perform a process of adding a source ID of a source ID list L only once upon registration of a content distribution service or a ripped content sharing service or in a like case. Accordingly, enhancement in efficiency of a copyright management process can be achieved when compared with an alternative case wherein a copyright management process is executed every time copying (check-in/check-out) of a content is performed as in the case of a copyright management process of the conventional check-in check-out type.

Furthermore, where different apparatus are group-registered into a group in a unit of an owner (user) of content processing apparatus 10 or content reproduction apparatus 20, a content can be copied and utilized freely between those apparatus which are registered in the same apparatus group. Therefore, a legal user which performs private use can copy a content freely between apparatus owned by the user itself, and since there is no necessity for the user to be conscious of a copying source or the number of times of copying of a content, the user is less likely to feel the presence of the copyright management system. Accordingly, within a range of private use, the degree of freedom in content utilization by a user and the convenience can be further raised and user-friendly copyright management can be executed.

Incidentally, one of pleasures of music is to share music among many and unspecific persons. It is possible for a user to legally share music with many and unspecific persons by using the content processing apparatus 10 which complies with the copyright management scheme of the group management system described hereinabove. In the following, a method of legally sharing a content making use of the copyright management scheme of the group management system is described.

The method of legally sharing a content making use of the copyright management scheme of the group management system is implemented by such a content sharing system 100 as shown in FIG. 3. In the following, a configuration for legally sharing a content is described in more detail.

First, an outline of the content reproduction apparatus according to the present embodiment is described. The content reproduction apparatus according to the present embodiment is an apparatus which can reproduce a content of music or the like which can communicate by radio and may be, for example, a portable device (PD), a cell phone or any of various music players. Particularly, in the present embodiment, a portable player on which a content of music or the like can be enjoyed and which can be carried is described as an example.

Figure 20:
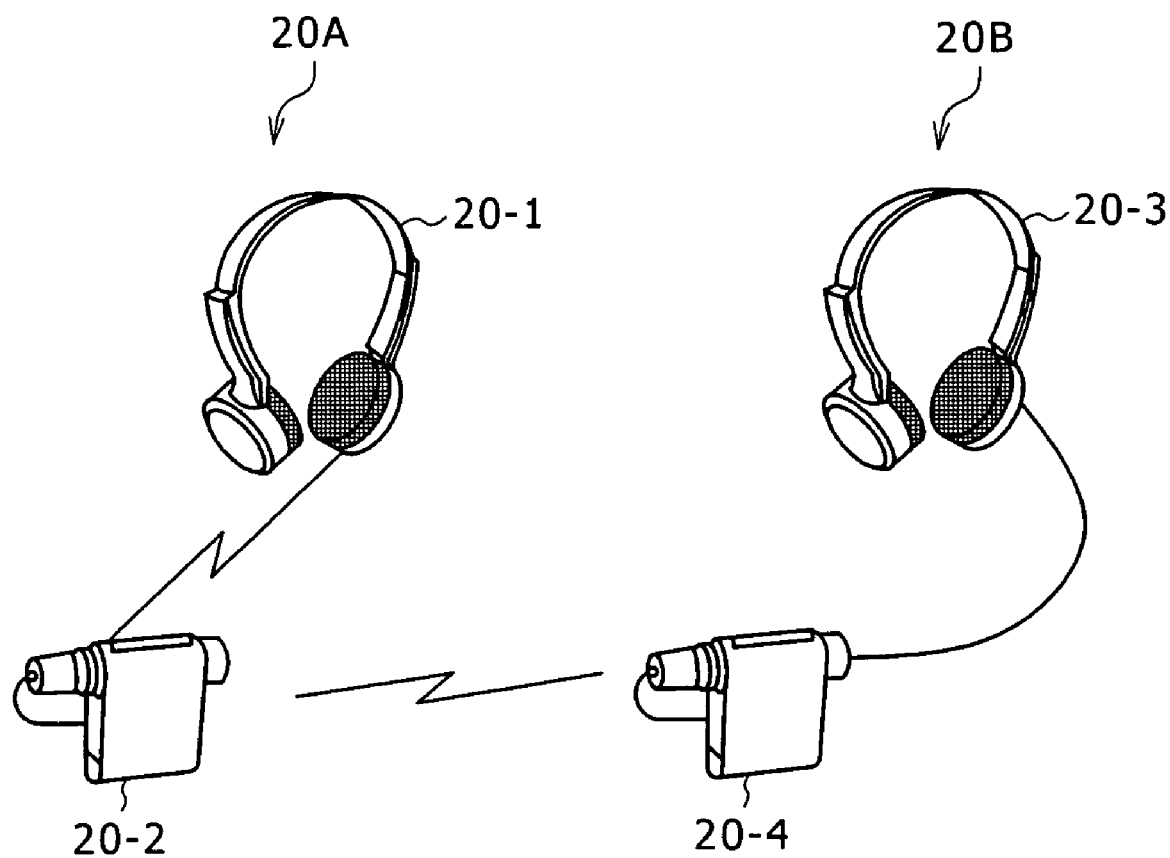
FIG. 20 is a view showing an outline of the content reproduction apparatus according to the embodiment.

FIG. 20 is a view showing an outline of the content reproduction apparatus according to the present embodiment. As shown in FIG. 20, the content reproduction apparatus 20A may be formed from a body 20-2 and headphones 20-1. The body 20-2 and the headphones 20-1 are apparatus which can communicate by radio with each other, and, for example, the body 20-2 records a content and transmits the content to the headphones 20-1. Meanwhile, the headphones 20-1 can receive and reproduce the content transmitted from the body 20-2.

Here, although, as the means for radio communication, for example, the IEEE802.11a, IEEE802.11b, IEEE802.11g, UWB (Ultra Wide Band) or Bluetooth (registered trademark) can be used, the means is not limited to any of such examples. Further, the range of the radio communication area according to the present embodiment is a range of a comparatively small distance of several meters to several tens meters or the like although it differs depending upon the radio communication standards mentioned above.

Accordingly, any apparatus which can communicate by radio with each other can be used as the body 20-2 and the headphones 20-1, and, for example, the body 20-2 can be placed in a bag while the pair of headphones 20-1 is secured to the head to listen to a reproduced content. Although the content reproduction apparatus may be configured such that a body 20-4 and headphones 20-3 are connected to each other by means of a wire to transmit and receive a content therebetween, where an apparatus wherein the body and the headphones can communicate by radio with each other is used, the user is not disturbed by any cable, which is convenient to the user.

Now, transmission and reception of a content between content reproduction apparatus are described. As described hereinabove, the headphones 20-1 of the content reproduction apparatus 20A can transmit a content by radio communication. Where, for example, the content reproduction apparatus 20B is positioned at a short distance from the content reproduction apparatus 20A as shown in FIG. 20 and also the content reproduction apparatus 20B can communicate by radio, a content transmitted from the body 20-2 of the content reproduction apparatus 20A is received by the body 20-4 of the content reproduction apparatus 20B, and the content can be reproduced by the headphones 20-3.

In short, the content reproduced by the content reproduction apparatus 20A can be reproduced also by the content reproduction apparatus 20B positioned in the proximity of the content reproduction apparatus 20A.

A network wherein individual apparatus are connected to each other by radio communication in this manner and utilized by an individual may be an ad hoc network which does not include a particular control station as a communication station and in which individual communication apparatus operate autonomously and discretely.

Figure 21:
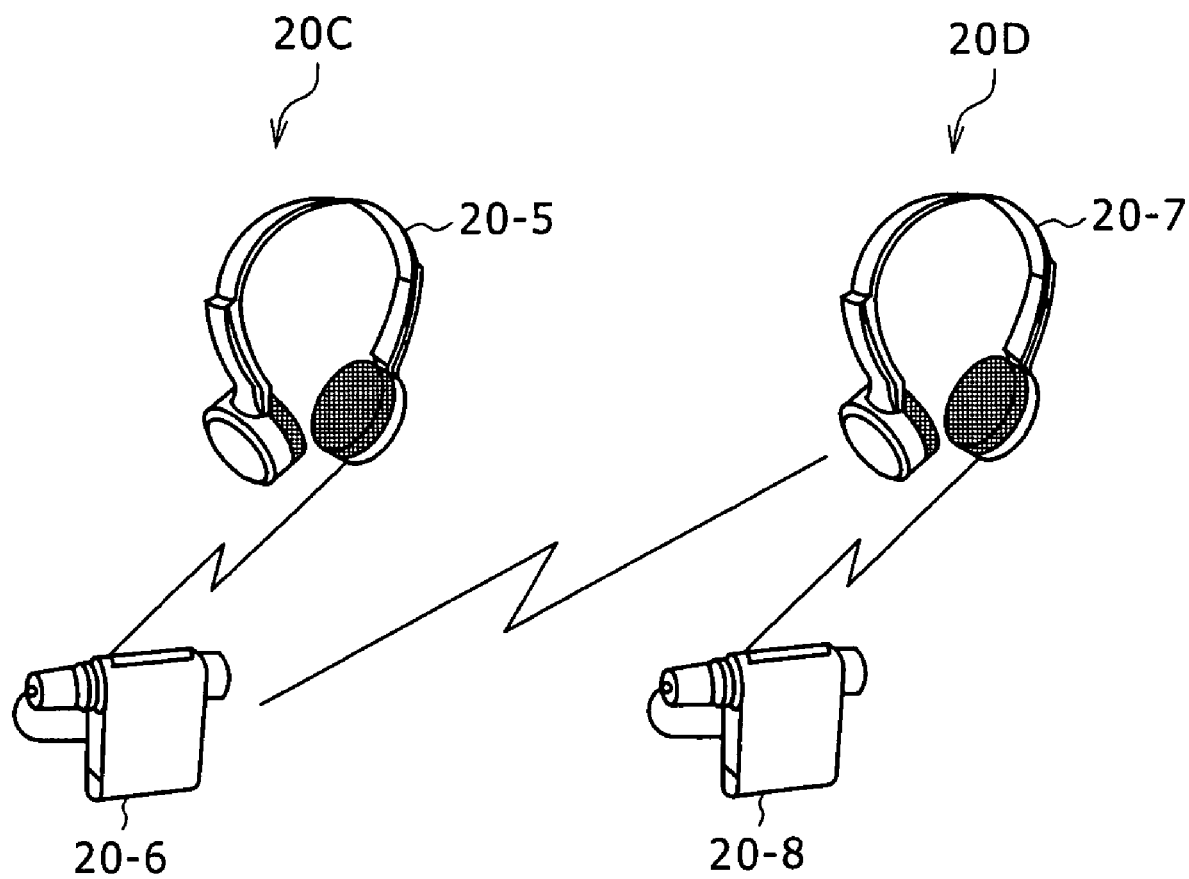
FIG. 21 is a view showing an outline of the content reproduction apparatus according to the embodiment.

Now, another embodiment of transmission and reception of a content between content reproduction apparatus is described. As shown in FIG. 21, a content reproduction apparatus 20C and a content reproduction apparatus 20D are apparatus which can communicate by radio with each other.

A body 20-6 of the content reproduction apparatus 20C records a content and can transmit the content by radio communication. The content transmitted from the body 20-6 of the content reproduction apparatus 20C is received by headphones 20-5. Meanwhile, the content reproduction apparatus 20D is positioned in the proximity of the content reproduction apparatus 20C, and the content transmitted from the content reproduction apparatus 20C can be received by headphones 20-7 of the content reproduction apparatus 20D.

Accordingly, the content reproduced by the content reproduction apparatus 20C can be reproduced also on the content reproduction apparatus 20D.

As described above, a plurality of users who own content reproduction apparatus are positioned at a short distance, each of them can receive and reproduce a content of the other one of them. However, if the reproduced content can be recorded and transmitted to another different content reproduction apparatus, then this gives rise to a problem on the copyright.

However, in the present embodiment, since the copyright management scheme of the group management system is utilized, each content includes a group ID, and transmission and reception of the content can be restricted based on the group ID and the content can be shared legally. Also it is possible to encrypt the content so that the content can be transmitted and received further securely. Furthermore, it is possible to prevent, although it is possible to receive and reproduce the content, the received content from being recorded by the content reproduction apparatus.

In the present embodiment wherein a system for managing illegal copying is implemented, in order to make it possible to record a content using a content reproduction apparatus, the content must be purchased and downloaded from the content distribution server.

For example, if a content is received and reproduced by a content reproduction apparatus and the user likes the content, then the content may be purchased later and downloaded from the content distribution server. In short, to receive and reproduce a content in the present embodiment signifies that it is possible to trial listen to the content.

Further, a user D who owns the content reproduction apparatus 20D can select whether or not received music should be reproduced. Further, if the user D likes the reproduced music, then the user may purchase the music later. For example, a content reproduced by the user C may be received and reproduced not only by the user D but also by a plurality of users, resulting in purchase of the content by the plural users. Since each content includes a group ID, a user who becomes a source of purchase (source of reproduction) of the content can be identified.

If contents reproduced by the user C are purchased frequently by a different user, then the user C becomes a source of purchase among a plurality of users. Further, it can be regarded that the user C is a listener supported from a plurality of users. In the present embodiment, a listener supported from a great number of users in this manner is referred to as charismatic listener. Which one of users the charismatic listener is can be managed by the group ID on the content distribution server.

If a content reproduced by the user C is purchased, then it is considered that the content is spread through the user C and this leads to purchase by other users, and the reliability of the user C enhances. For example, points may be added in such a manner that, if a content reproduced by the user C is purchased by the user D, then one reliability point is added and, if the content is purchased by a different user, then two reliability points are added, and may be managed as reliability information by the content distribution server. Further, the reliability information can be managed in an associated relationship with the user IDs of users by the content distribution server.

The user C can receive the reliability information of the user C itself from the content distribution server and transmit the content with the reliability information applied. The user D receiving the content to which the reliability information is applied can decide whether or not the content should be reproduced depending upon the reliability applied to the content.

Figure 22:
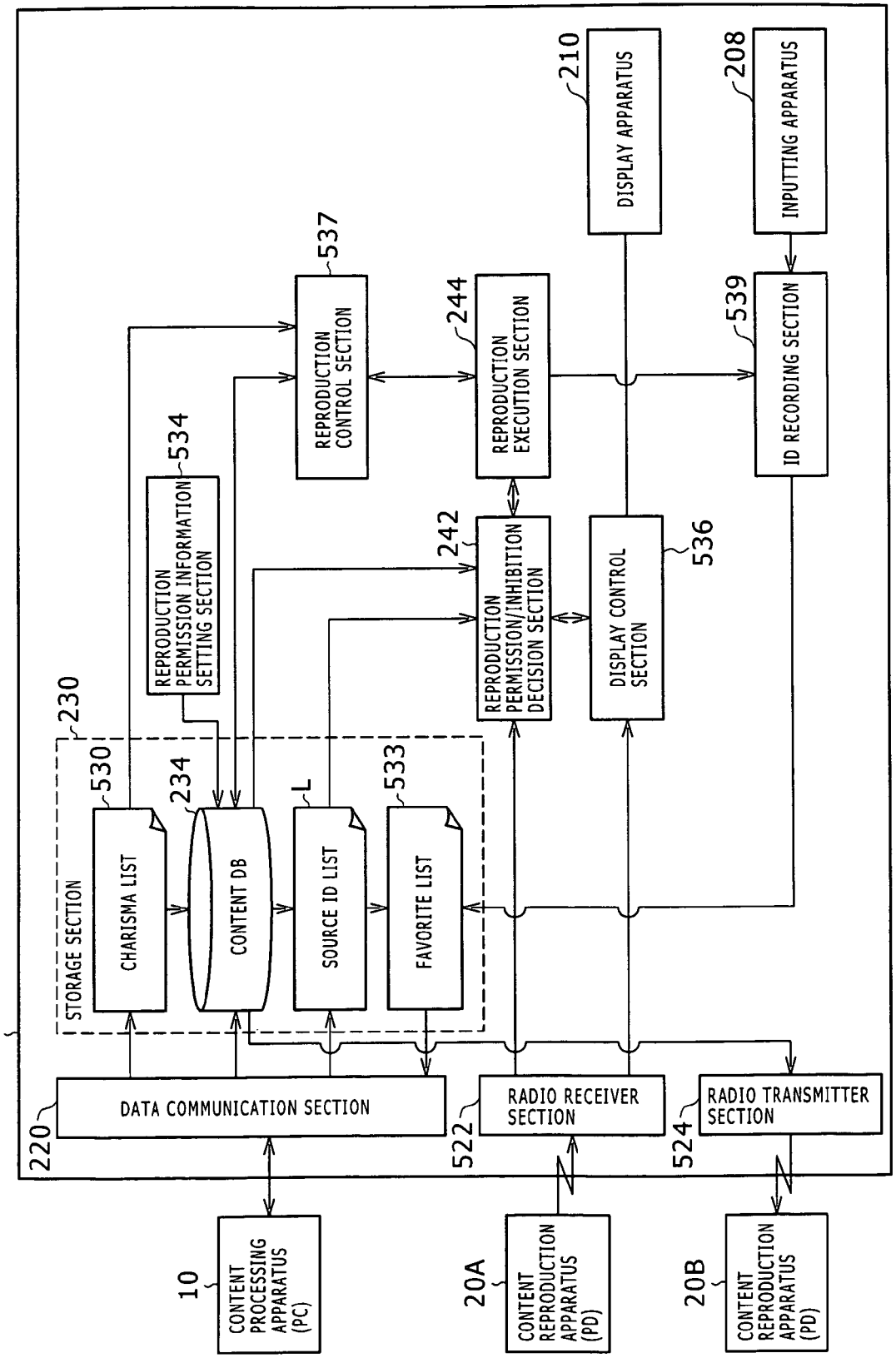
FIG. 22 is a view showing an outline of the content reproduction apparatus according to the embodiment.

The outline of the content reproduction apparatus is such as described above. Now, a general configuration of the content reproduction apparatus according to the present embodiment is described. FIG. 22 is a block diagram showing a general configuration of the content reproduction apparatus according to the present embodiment.

The content reproduction apparatus 20 is an information processing apparatus which receives a music content or the like transmitted from the content processing apparatus 10 and reproduces the content. The content reproduction apparatus 20 can be locally connected to the content processing apparatus 10 by a wire cable such as a USB (Universal Serial Bus) cable or a SCSI (Small Computer System Interface) cable. Alternatively, the content reproduction apparatus 20 may be connected to the content processing apparatus 10 by radio connection. The content reproduction apparatus 20 may be a portable device (PD), a PC, a portable telephone set or any of various music players which can reproduce a music content. In the description of the present embodiment, the content reproduction apparatus 20 is applied to a portable device which can be carried.

Further, as described hereinabove, the content reproduction apparatus 20 is an information processing apparatus which can transmit and receive data by radio communication to and from another content reproduction apparatus 20.

As shown in FIG. 22, the content reproduction apparatus 20 is composed principally of a data communication section 220, a radio receiver section 522, a radio transmitter section 524, a charisma list 530, a content database (hereinafter referred to as content DB) 234, a source ID list L, a favorite list 533, a reproduction permission information setting section 534, a reproduction permission/inhibition decision section 242, a display control section 536, a reproduction control section 537, a reproduction execution section 244, an ID recording section 539, a display apparatus 210, an inputting apparatus 208 and so forth.

Here, the charisma list 530, content DB 234, source ID list L and favorite list 533 may be stored in the storage section 230 described hereinabove. Further, since the source ID list L includes a group ID as described hereinabove, in the present embodiment, the storage section 230 may be used as a group ID storage section for storing a group ID.

The data communication section 220 allows a content, a source ID list and a charisma list transmitted thereto from the content processing apparatus 10 to be recorded into the content DB 234, source ID list L and charisma list 530, respectively. The source ID list L includes a group ID of the content reproduction apparatus 20 as described hereinabove. Further, the charisma list 530 has a group ID of a charismatic listener described hereinabove stored therein. The charisma list 530 is data which is updated when the user purchases a content and is managed by the content distribution server 34.

The radio receiver section 522 receives a content from the content reproduction apparatus 20A and provides the content to the reproduction permission/inhibition decision section 242 or the display control section 536.

The reproduction permission/inhibition decision section 242 compares a group ID included in a content provided from the radio receiver section 522 and the group ID of the content reproduction apparatus 20 included in the source ID list L with each other to decide whether or not the provided content can be reproduced. Further, if the content is in an encrypted form, then it may be decrypted by the reproduction permission/inhibition decision section 242. In this instance, it is necessary for the content reproduction apparatus 20A which transmits the content and the content reproduction apparatus 20 which receives the content to own a common secret key to be used to encrypt the content to be transmitted and received.

If it is decided by the reproduction permission/inhibition decision section 242 that the content can be reproduced, then the content is provided to the reproduction execution section 244, by which reproduction of the content is executed.

The display control section 536 controls, when a content is provided thereto from the radio receiver section 522, the display apparatus 210 to display that a content is received. The user can confirm from the content reception display of the display apparatus 210 that a content is received.

The reproduction control section 537 decides based on reliability information applied to a content provided from the reproduction execution section 244 whether or not the content should be reproduced. If the reliability information exhibits a value higher than a particular value, then the reproduction control section 537 interrupts reproduction of a content reproduced from the content DB 234 and now reproduces the content provided thereto.

Further, the reproduction control section 537 compares a group ID included in a content provided from the reproduction execution section 244 and the group ID stored in the charisma list 530 with each other. Then, if the two group IDs coincide with each other, then the reproduction control section 537 interrupts reproduction of the content reproduced from the content DB 234 and now reproduces the content provided thereto.

In this manner, if the user who owns the content reproduction apparatus 20A from which a content is transmitted is a charismatic listener or the reliability of the user is high, then a content transmitted from the user may be reproduced automatically or selection of whether or not the reproduction should be performed may be performed by an input of the user. Alternatively, the user may select whether all of received contents are reproduced or reproduction is not performed even if a content is received.

An ID of a content whose reproduction is executed by the reproduction execution section 244 and a group ID included in the content are stored into the storage section 230 in response to a user input from the inputting apparatus 208 by the ID recording section 539. The favorite list 533 may be an example of the ID storage section in which the content ID and the group ID are stored. For example, if the user likes a reproduced content, then the user might depress, for example, a favorite button, which is an inputting apparatus provided on the content reproduction apparatus. In response to the depression of the favorite button, the content ID of the content provided and the group ID included in the content are stored into the favorite list 533.

The content ID and the group ID stored in the favorite list 533 are transmitted to the outside through the data communication section 220. Here, the outside may be a content processing apparatus 10 as shown in FIG. 22 or the content distribution server. When the content ID and the group ID are transmitted to the content processing apparatus 10, they are transmitted to the content distribution server 34 through the content processing apparatus 10. On the other hand, where the content reproduction apparatus 20 is connected to the content distribution server 34, the content ID and the group ID are transmitted to the content distribution server 34.

The radio transmitter section 524 transmits a content stored in the content DB to the content reproduction apparatus 20B. The reproduction permission information setting section 534 applies to a content stored in the content DB a flag representative of whether or not the content should be transmitted to a different content reproduction apparatus. Only when reproduction permission information is applied, the content may be transmitted to a different content reproduction apparatus. Consequently, it is possible to set reproduction permission information to those of contents stored in the content DB which may be transmitted to a different content reproduction apparatus but not set reproduction permission information to those contents which should not be transmitted.

Further, the content reproduction apparatus 20 may be formed from a body and headphones separate from each other. In this instance, the body and the headphones can communicate with each other by radio communication or by wire communication, and the body includes at least the data communication section 220, radio transmitter section 524 and ID recording section 539 while the headphones includes at least the radio receiver section 522, source ID list L, reproduction permission/inhibition decision section 242 and reproduction execution section 244. By this, such a content reproduction apparatus 20 as shown in FIGS. 20 and 21 can be configured.

The general configuration of the content reproduction apparatus is such as described above. Now, a favorite list according to the present embodiment is described. FIG. 23 illustrates a data structure of the favorite list in the present embodiment.

As described hereinabove, in the favorite list 533, a group ID 5331 and a content ID 5332 which are included in a content received by the content reproduction apparatus are stored. As shown in FIG. 23, the group ID 5331 represents a type of a content and a type of a distribution service and is composed of, for example, a genre code of high-order 5 digits and a unique ID applied in a unit of a user. Of the genre code of the high-order 5 digits, for example, two digits represent a code of a type of distribution service. In the present embodiment, if the distribution service codes are the same, then a content transmitted and received between content reproduction apparatus can be reproduced.

A content used in the present embodiment can be purchased and downloaded from the distribution management server. If the distribution services included in group IDs are the same, then the users are members of the same distribution service and are permitted to download a content from the same distribution management server. Where members of the same distribution service transmit and receive a content and share the content, a user who reproduces a received content may purchase the content with a high degree of possibility after the content is reproduced because the user already is a member of the distribution service.

Figure 24:
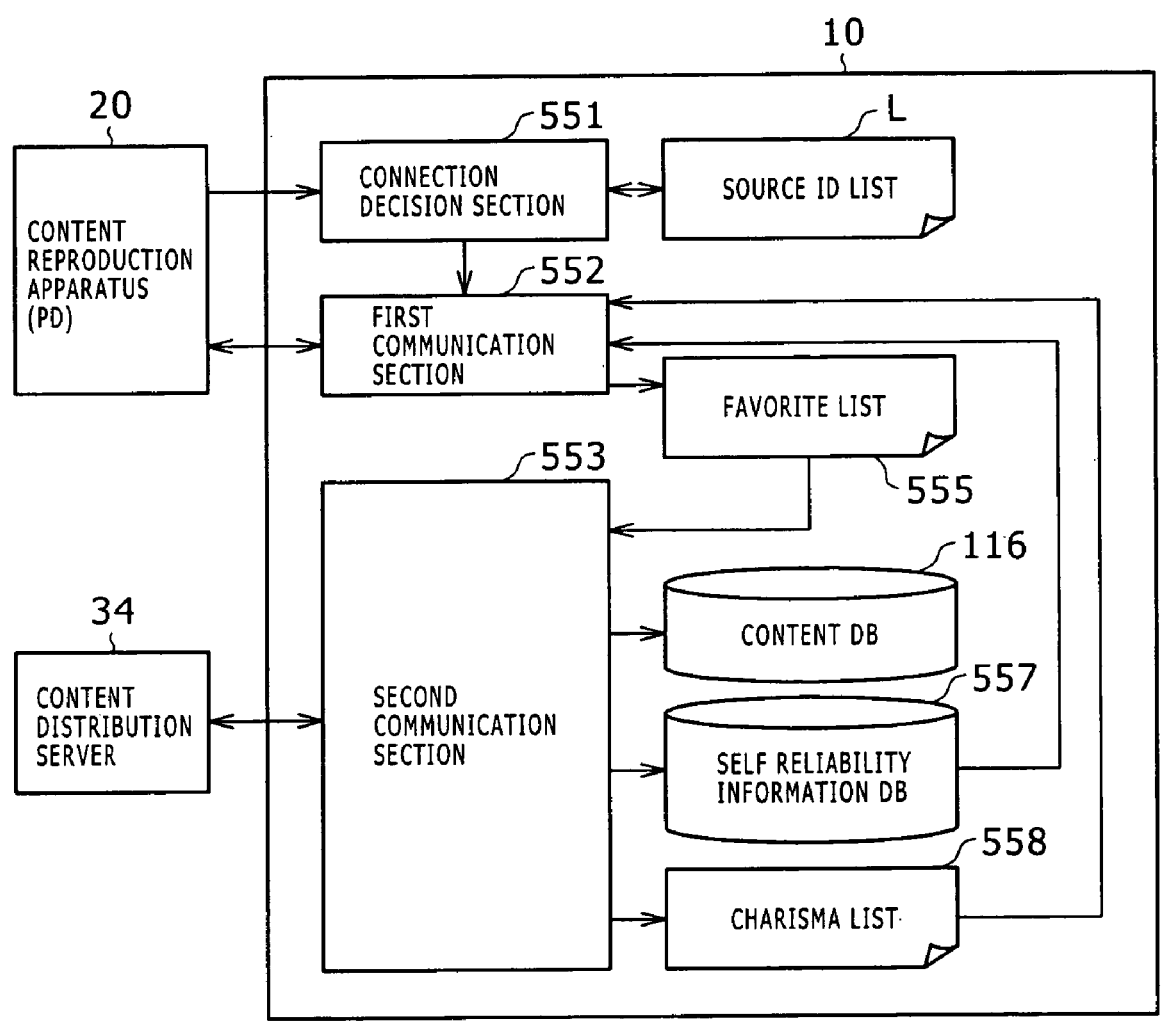
FIG. 24 is a schematic block diagram of the content processing apparatus according to the embodiment.

The data structure of the favorite list is such as described above. Now, a general configuration of the content processing apparatus is described. FIG. 24 is a schematic block diagram of the content processing apparatus 10. As described hereinabove, the content processing apparatus 10 can be connected for communication to a content reproduction apparatus 20 and the content distribution server 34 and can transmit and receive data of a content and so forth.

The content processing apparatus 10 principally includes a connection decision section 551, a first communication section 552, a second communication section 553, a source ID list L, a favorite list 555, a content DB 116, a self reliability information DB 557, a charisma list 558 and so forth.

The connection decision section 551 decides whether or not the content reproduction apparatus 20 is connected to the content processing apparatus 10. If it is decided that the content reproduction apparatus 20 is connected, then the connection decision section 551 decides whether or not the group ID stored in the source ID list L and the group ID stored in the content reproduction apparatus 20 coincide with each other. If it is decided that the group IDs of the content processing apparatus 10 and the content reproduction apparatus 20 coincide with each other, then the connection decision section 551 notifies the first communication section 552 that the content processing apparatus 10 and the content reproduction apparatus 20 coincide with each other.

When the first communication section 552 receives the notification from the connection decision section 551 that the content processing apparatus 10 and the content reproduction apparatus 20 coincide with each other, it stores the group ID and the content ID stored in the favorite list of the content reproduction apparatus 20 into the favorite list 555.

The second communication section 553 transmits the group ID and the content ID stored in the favorite list 555 to the content distribution server 34. Further, the second communication section 553 receives a content stored in the favorite list 555 and corresponding to the content ID from the content distribution server 34 and stores the content into the content DB 116. It is to be noted that the content DB 116 is an example of the content storage section according to the present invention.

Further, the second communication section 553 receives reliability information corresponding to the group ID of the content processing apparatus 10 from the content distribution server 34 and stores the reliability information into the self reliability information DB 557. Furthermore, the second communication section 553 receives also the charisma list 558 from the content distribution server 34.

Then, the content stored in the content DB 116, the reliability information stored in the self reliability information DB and the group ID of the charisma list stored in the charisma list are transmitted to the content reproduction apparatus 20 through the first communication section.

In this manner, even if the content reproduction apparatus 20 cannot be connected directly to the content distribution server 34, it can acquire data managed by the content distribution server 34 through the content processing apparatus 10.

Since the content reproduction apparatus 20 is a portable information processing apparatus, the storage capacity thereof may possibly be smaller than that of the content processing apparatus 10. In this instance, all of the data stored in the content processing apparatus 10 may not be transmitted to the content reproduction apparatus 20, but only data selected by the user may be transmitted to the content reproduction apparatus 20.

Figure 25:
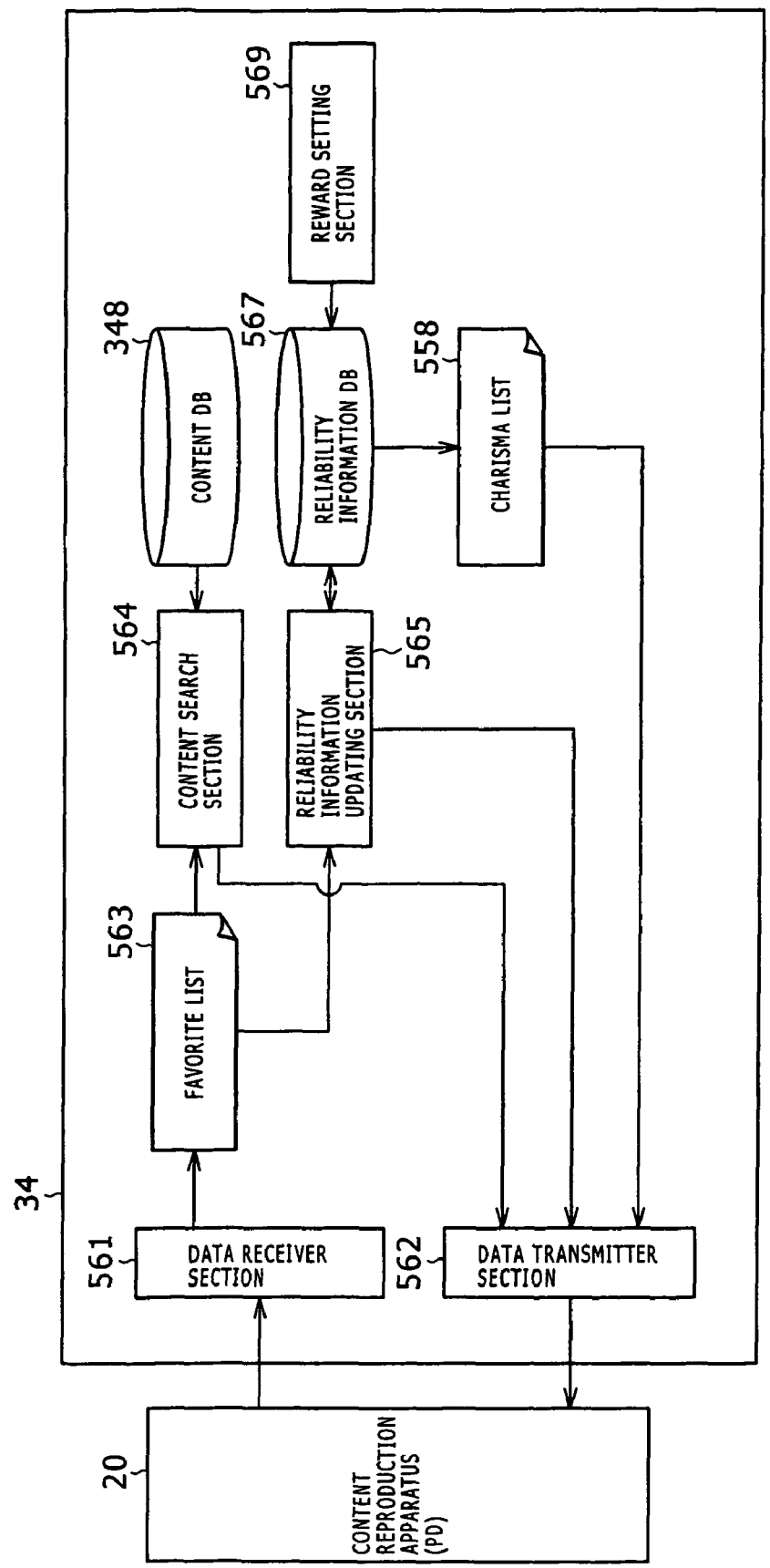
FIG. 25 is a schematic block diagram of a content distribution server according to the embodiment.

The general configuration of the content reproduction apparatus 20 is such as described above. Now, a general configuration of the content distribution server is described. FIG. 25 is a block diagram of the content distribution server.

The content distribution server 34 can be connected for communication to a content reproduction apparatus 20 and can transmit and receive data to and from the content reproduction apparatus 20. Further, where the favorite list and so forth stored in the content reproduction apparatus 20 are transmitted to a content processing apparatus 10 and stored in the favorite list of the content processing apparatus 10, the content reproduction apparatus 20 of FIG. 25 may alternatively be the content processing apparatus 10.

As shown in FIG. 25, the content distribution server 34 is principally composed of a data receiver section 561, a data transmitter section 562, a favorite list 563, a content search section 564, a reliability information updating section 565, a content DB 348, a reliability information DB 567, a charisma list 558, a reward setting section 569 and so forth.

The data receiver section 561 receives a group ID and a content ID stored in the favorite list of the content reproduction apparatus 20 and stores the group ID and the content ID into the favorite list 563. The content search section 564 searches for a content corresponding to the group ID stored in the favorite list from the content DB 348 and provides the content to the data transmitter section 562.

The reliability information updating section 565 updates the reliability information stored in the reliability information DB corresponding to the group ID stored in the favorite list. Further, the reliability information updating section 565 stores the updated reliability information into the data transmitter section 562.

From the reliability information DB in which the reliability information is updated by the reliability information updating section 565, the group ID having a high degree of reliability information is stored into the charisma list 558. The charisma list 558 is provided to the data transmitter section 562.

The content, reliability information and charisma list provided to the data transmitter section 562 are transmitted to the content reproduction apparatus 20 through the data transmitter section.

The reward setting section 569 sets a reward to the corresponding group ID in response to the reliability information stored in the reliability information DB 567. For example, such a reward as a discount privilege upon subsequent purchase of a content is set to a group ID having high reliability information. Where a reward is set, a user who has a group ID to which the reward is set may further purchase a content and transmit the content to many people thereby to contribute to sales promotion of the content.

In this manner, it can be managed by the content distribution server 34, which manages group IDs, which group ID a user has through whom a content is purchased. For example, the content provider can spread a new content only by providing the content free of charge to a user having high reliability.

The general configuration of the content distribution sever is such as described above. Now, a data structure of the reliability information database is described. FIG. 26 is a view illustrating a data structure of the reliability information database.

As shown in FIG. 26, the reliability information DB 567 includes a group ID 5671 and reliability information 5672. The group ID 5671 represents a type of a content and/or a type of a distribution service as described hereinabove and includes, for example, a genre code of 5 digits and a unique ID applied in a unit of a user. The reliability information 5672 is information representative of the degree of reliability of the group ID 5671 and particularly is a purchase number of a content which includes the group ID 5671. Further, a group ID having high reliability information may be selected and stored into the charisma list. For example, if it is assumed that those group IDs whose reliability information is higher than 100 are to be stored into the charisma list, then the group IDs 01234-0000A and 01234-0000D are stored into the charisma list.

Alternatively, only the users of those 10 group IDs which have the highest reliability information may be stored into the charisma list. Since the reliability information is updated every time a user purchases a content, the charisma list may be updated, for example, every day or every week. Furthermore, some reward may be set to those users whose group ID is stored in the charisma list. In this instance, since a user is given a reward only if it purchases and reproduces a content, any user who is stored in the charisma list can be urged to further purchase a content. Further, the content provider can provide a content to users stored in the charisma list to legally spread the content.

Figure 27:
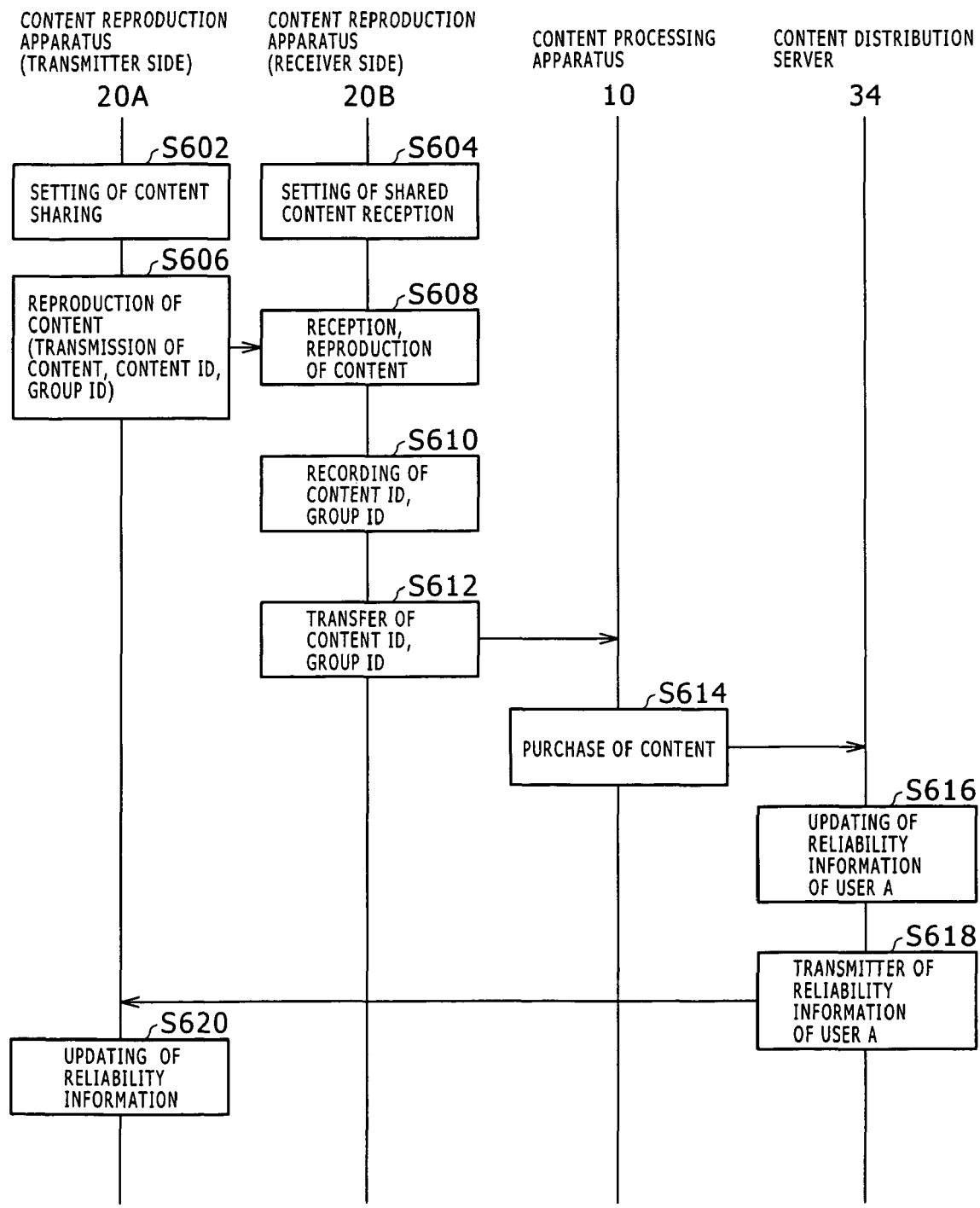
FIG. 27 is a timing chart illustrating transmission and reception of data of a content or the like according to the embodiment.

The data structure of the reliability information database is such as described above. Now, transmission and reception of data of a content and so forth in the present embodiment are described. FIG. 27 is a timing chart illustrating transmission and reception of data of a content or the like in the present embodiment.

First, the content reproduction apparatus 20A which is to transmit a content performs setting so that the content may be shared (step S602). For example, a content sharing flag may be set to the content in response to a user input. The content reproduction apparatus 20B which is to receive a content is set so that it can receive a content when the content is of the type which can be shared.

The content reproduction apparatus 20A reproduces the content (step S606). Here, since the content is set at step S602 so that it can be shared, when the content is reproduced at step S606, the content and a content ID and a group ID included in the content are transmitted simultaneously.

The content reproduction apparatus 20B receives the content transmitted from the content reproduction apparatus 20A and reproduces the content (step S608). Then, the content ID and the group ID transmitted at step S608 are recorded into the content reproduction apparatus 20B (step S610). When the content reproduction apparatus 20B is connected to the content processing apparatus 10, the content ID and the group ID recorded at step S610 are transferred to the content processing apparatus 10 (step S612).

The content processing apparatus 10 receives the content ID and the group ID transferred from the content reproduction apparatus 20B and purchases a content corresponding to the content ID (step S614). When the content is purchased at step S614 and downloaded from the content distribution server 34 to the content processing apparatus 10, the reliability information of the user A who owns the content reproduction apparatus 20A is updated (step S616).

When the content reproduction apparatus 20A is connected to the content distribution server 34, the reliability information updated at step S616 is transmitted to the content reproduction apparatus 20A owned by the user A (step S618). The content reproduction apparatus 20A to which the reliability information is transmitted from the content distribution server 34 updates the reliability information recorded in the content reproduction apparatus 20A (step S620).

Figure 28:
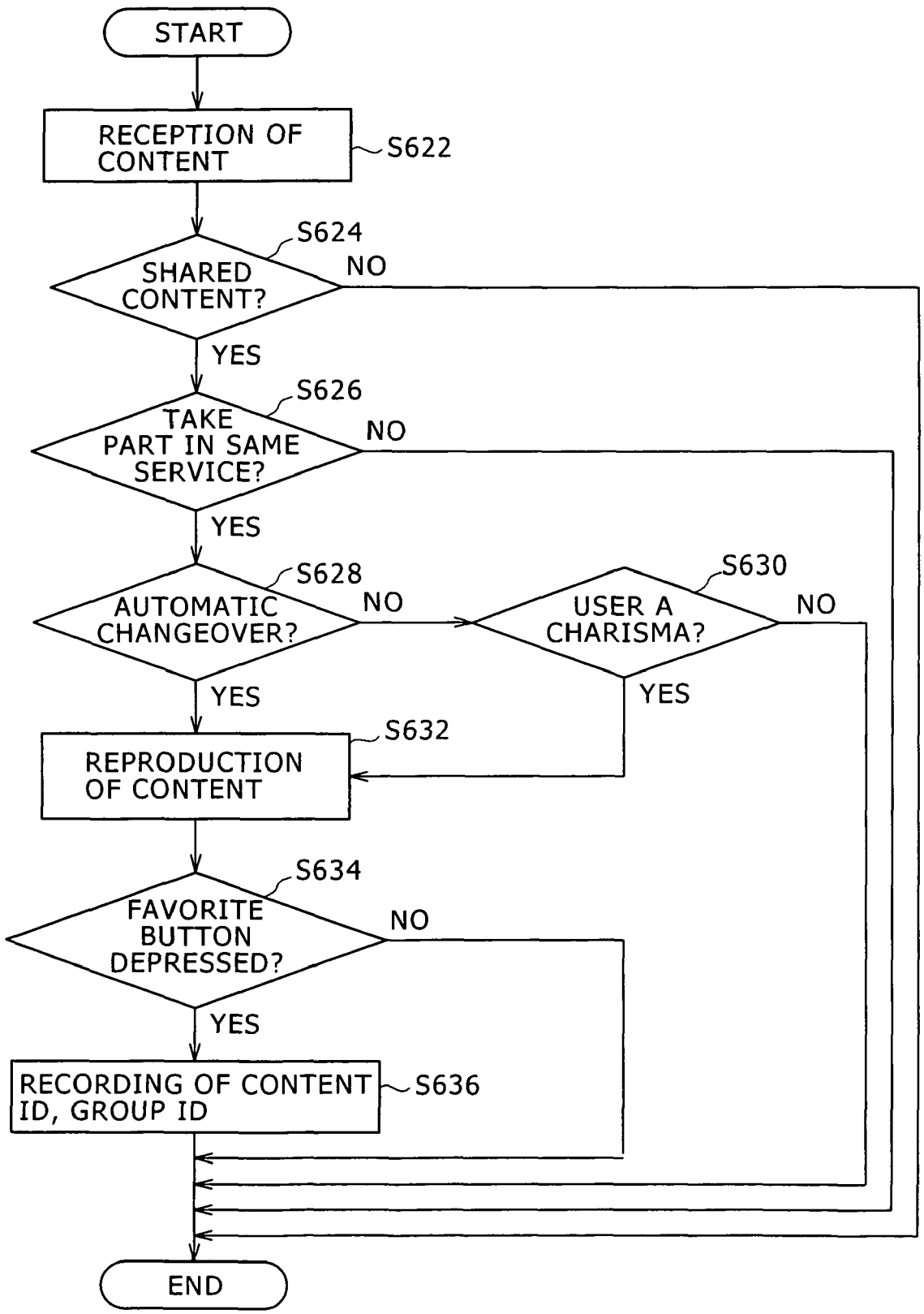
FIG. 28 is a flow chart illustrating operation of the content reproduction apparatus according to the embodiment after reception of a content till recording of a content ID and a group ID of the content.

The transmission and reception of data of a content or the like in the present embodiment are such as described above. Now, the processes of "reception, reproduction of content" at step S608 and "recording of content ID, group ID" at step S610 of FIG. 27 are described in detail. FIG. 28 is a flow chart illustrating operation of the content reproduction apparatus 20B after reception of a content till recording of the content ID of the content and a group ID.

The content reproduction apparatus 20B receives a content reproduced by the content reproduction apparatus 20A (step S622). Then, the content reproduction apparatus 20B decides whether or not the received content is of the type which can be shared (step S624). If the content is not of the type which can be shared at step S624, then the processing is ended. If it is decided at step S624 that the content is of the type which can be shared, then the content reproduction apparatus 20B compares the group ID of the content reproduction apparatus 20B and the group ID included in the received content with each other to decide whether or not the service types included in the group IDs are same as each other (step S626).

If the service types are different from each other at step S626, then the processing is ended. If the service types are same as each other at step S626, then it is decided whether or not it is set such that, when the content reproduction apparatus 20B receives the content, it automatically performs changeover so that reproduction of a content being enjoyed when the content is received from the content reproduction apparatus 20A is interrupted and now the received content is reproduced (step S628).

If it is decided at step S628 that the content reproduction apparatus 20B is set such that it automatically performs changeover to reproduce the received content, then it reproduces the received content (step S632). If it is not decided at step S628 that the content reproduction apparatus 20B is set such that it automatically performs changeover to reproduce the received content, then the content reproduction apparatus 20B decides whether or not the group ID of the user A who owns the content reproduction apparatus 20A is stored in the charisma list (step S630).

If it is decided at step S630 that the group ID of the user A is not stored in the charisma list, then the processing is ended. If the group ID of the user A is stored in the charisma list at step S630, then the content reproduction apparatus 20B interrupts reproduction of the content being enjoyed when the content is received from the content reproduction apparatus 20A and now reproduces the received content.

After the content is reproduced at step S632, the content reproduction apparatus 20B decides whether or not the favorite button is depressed by the user B (step S634). If it is decided at step S634 that the favorite button is not depressed, then the processing is ended. If it is decided at step S634 that the favorite button is depressed, then the content reproduction apparatus 20B stores the content ID and the group ID of the reproduced content into the favorite list (step S636).

Figure 29:
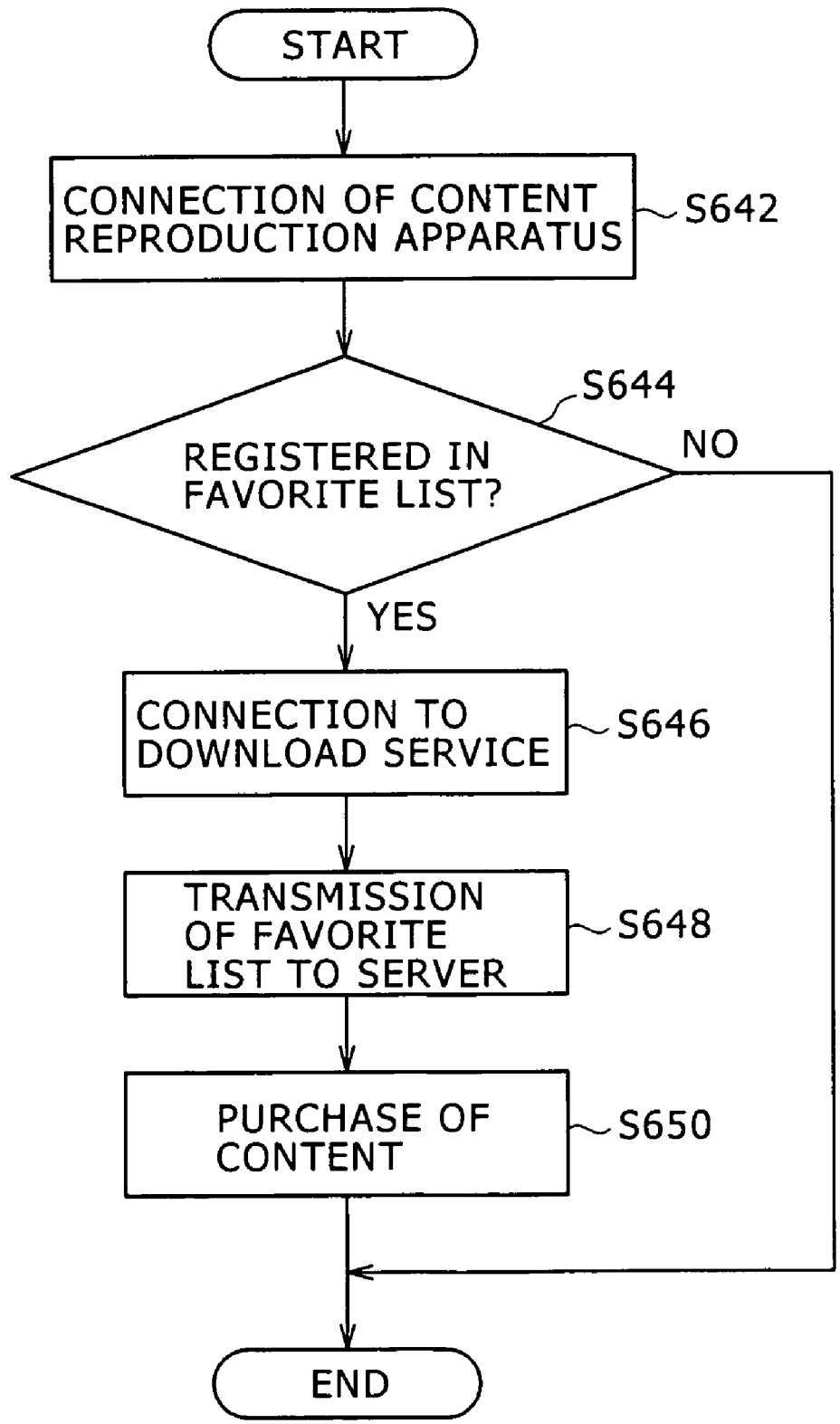
FIG. 29 is a flow chart illustrating a content purchase process by the content processing apparatus according to the embodiment.

The operation of the content reproduction apparatus 20B after reception of a content till recording of a content ID and a group ID of the content is such as described above. Now, the "purchase of content" at step S614 in FIG. 27 is described in detail. FIG. 29 is a flow chart illustrating a content purchase process of the content processing apparatus 10.

First, the content reproduction apparatus 20B is connected to the content processing apparatus 10 (step S642). Then, the content processing apparatus 10 decides whether or not a content ID and a group ID are registered in the favorite list of the content reproduction apparatus connected thereto (step S644). If it is decided at step S644 that a content ID and a group ID are not registered in the favorite list, then the processing is ended.

If it is decided at step S644 that a content ID and a group ID are registered in the favorite list, then the content processing apparatus 10 establishes a connection to the content distribution server 34 to connect to the download service (step S646). Then, the content processing apparatus 10 transmits the favorite list of the content processing apparatus 10 to the content distribution server 34 (step S648). A content corresponding to the content ID is transmitted from the content processing apparatus 10, and the content processing apparatus 10 purchases the content (step S650).

Figure 30:
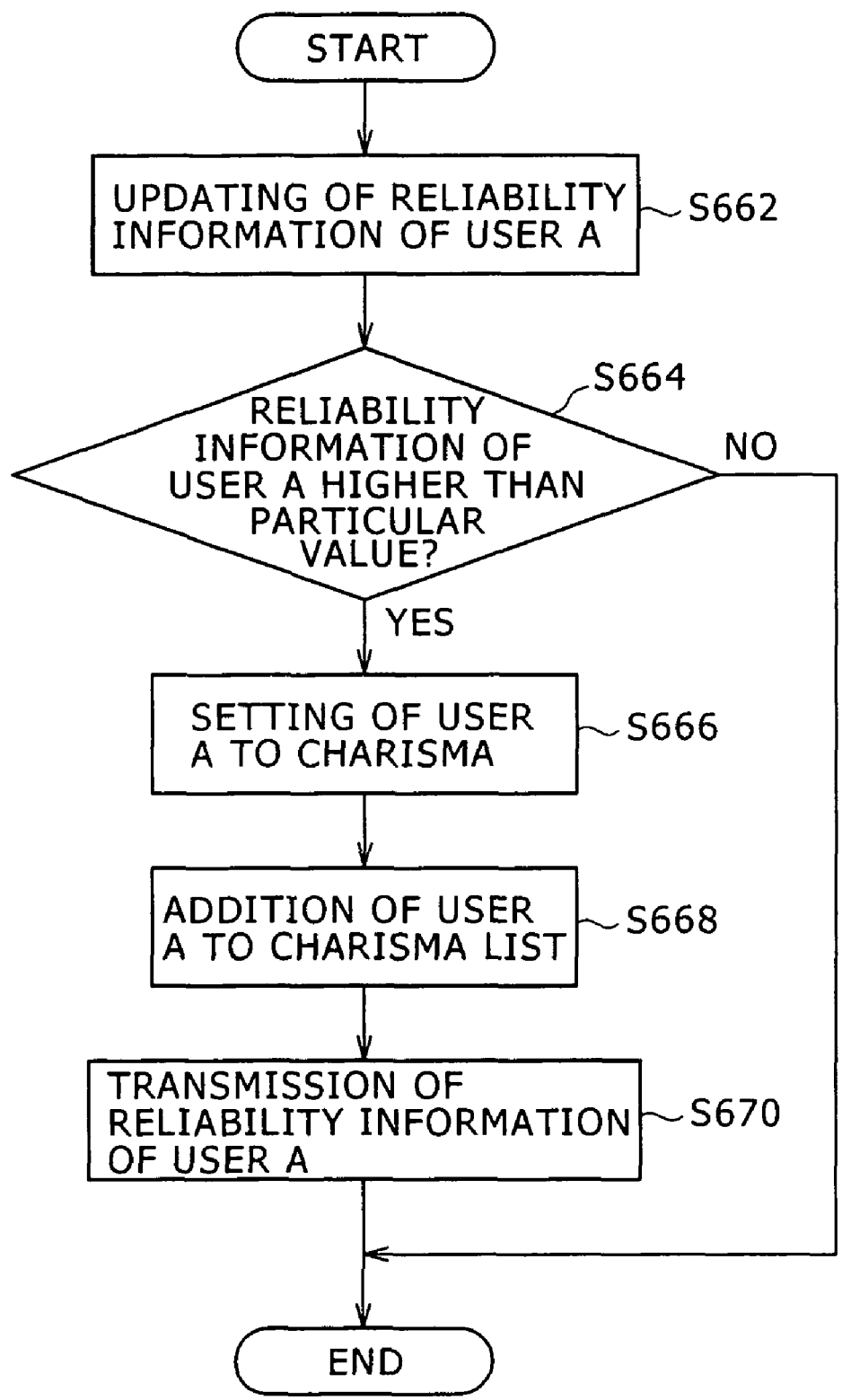
FIG. 30 is a flow chart illustrating operation of the content distribution server according to the embodiment after reliability information updating till reliability information transmission.

The content purchase process of the content processing apparatus 10 is such as described above. Now, the operation from the "updating of reliability information of user A" at step S616 to the "transmission of reliability information of user A" at step S618 of FIG. 27 is described. FIG. 30 is a flow chart illustrating the operation of the content distribution server 34 after updating of reliability information of the user A till reliability information transmission.

First, when the content processing apparatus 10 purchases a content including the group ID of the user A from the content distribution server 34, the content distribution server 34 updates the reliability information of the user A (step S662). After the reliability information of the user A is updated at step S662, the content distribution server 34 decides whether or not the reliability information of the user A has a value higher than a particular value (step S664). If it is decided at step S664 that the reliability information of the user A has a value higher than the particular value, then the content distribution server 34 sets the user A as a charisma (step S666). Then, the content distribution server 34 adds the group ID of the user A to the charisma list. Thereafter, the content distribution server 34 transmits the updated reliability information of the user A to the content reproduction apparatus 20A (step S670).

On the other hand, if it is decided at step S664 that the reliability information of the user A does not have a value higher than the particular value, then the content distribution server 34 ends the processing without transmitting the updated reliability information of the user A to the content reproduction apparatus 20A.

As described above, as a content in which a group ID is included is transmitted and received between content reproduction apparatus which can communicate with each other by radio communication, the content can be shared and enjoyed legally. Further, a desire of a user who wants to know what contents the others enjoy can be satisfied.

Further, as a content in which a group ID is included is transmitted and received and managed by the content distribution server, it can be discriminated by which user a content which is purchased has been listened to. Then, if a user who is supported from many users is specified and a new content is provided to the user so as to be reproduced, then sales of the content can be promoted.

A preferred embodiment of the present invention is described above with reference to the accompanying drawings. However, naturally the present invention is not limited to the embodiment described above. It is apparent that various alterations or modifications may be made by those skilled in the art within the scope of the invention described in the claims, and it is to be understood that also such alterations and modifications naturally fall within the technical scope of the present invention.

The present invention can be applied to a content reproduction apparatus, a content processing apparatus, a content distribution server, a content reproduction method, a content processing method and a program.

The invention claimed is:

1. A content reproduction apparatus, comprising:
a group ID storage section configured to store a group ID produced uniquely according to a user account when said content reproduction apparatus is registered to the user account in a management server;
a radio transmitter section configured to transmit content stored in a content storage section to a different apparatus by radio communication;
a radio receiver section configured to receive content transmitted from the different apparatus by radio communication;
a reproduction decision section configured to determine, based on a group ID included in the received content and the group ID stored in said group ID storage section, whether or not the content received by said radio receiver section can be reproduced;
a reproduction execution section configured to reproduce the content received by said radio receiver section when said reproduction permission/inhibition decision section determines that the content can be reproduced;
an ID recording section configured to record in an ID storage section a content ID and group ID corresponding to content reproduced by said reproduction execution section; and a data communication section configured to transmit the content ID and the group ID recorded in said ID storage section to a content distribution server, when the content reproduction apparatus is directly or indirectly connected to the content distribution server.

2. The content reproduction apparatus according to claim 1, wherein said content reproduction apparatus includes a body section and a headphones section, said body section includes said radio transmitter section, said ID recording section and said data communication section, and said headphones section includes said radio receiver section, said reproduction permission/inhibition decision section and said reproduction execution section.

3. The content reproduction apparatus according to claim 1, further comprising a reproduction permission information setting section configured to apply to the content reproduction permission information for permitting reproduction of the content to be transmitted from said radio transmitter section.

4. The content reproduction apparatus according to claim 3, wherein said reproduction permission/inhibition decision section determines whether the content can be reproduced based on the reproduction permission information applied to the content received by said radio receiver section.

5. The content reproduction apparatus according to claim 1, further comprising a display control section configured to output a message to a display apparatus, when said radio receiver section receives a content transmitted from the different apparatus by radio communication, the message indicating reception of the content.

6. The content reproduction apparatus according to claim 1, further comprising a reproduction control section configured to control, when said radio receiver section receives a content transmitted from the different apparatus by radio communication, said reproduction execution section to interrupt reproduction of a content stored in a storage medium provided in said content reproduction apparatus and reproduce the content transmitted from the different apparatus by radio communication.

7. The content reproduction apparatus according to claim 6, wherein said reproduction control section controls, when said radio receiver section receives a content transmitted from the different apparatus by radio communication and reliability information included in the content has a value higher than a predetermined value, said reproduction control section to interrupt the reproduction of the content stored in the storage medium provided in said content reproduction apparatus and reproduce the content transmitted from the different apparatus by radio communication.

8. The content reproduction apparatus according to claim 6, wherein said reproduction control section controls, when said radio receiver section receives a content transmitted from the different apparatus by radio communication and the group ID included in the content and the group ID provided from the distribution server coincide with each other, said reproduction control section to interrupt the reproduction of the content stored in the storage medium provided in said content reproduction apparatus and reproduce the content transmitted from the different apparatus by radio communication.

9. A content processing apparatus, comprising:
a connection decision section configured to decide whether a connection is to be established to a content reproduction apparatus which stores a group ID produced uniquely according to a user account when said content processing apparatus is registered in the user account in a management server;

a first communication section configured to communicate with the content reproduction apparatus, when said connection decision section decides that a connection is to be established, the first communication section receiving a content ID corresponding to content reproduced by the content reproduction apparatus and the group ID stored in said content reproduction apparatus;
a second communication section configured to communicate with a content distribution server, the second communication section transmitting the content ID and the group ID to the content distribution server which provides a content download service; and
a content storage section configured to store additional content corresponding to the content ID transmitted from said content distribution server and received through said second communication section, the contents stored in said content storage section being transmitted to said content reproduction apparatus through said first communication section.

10. The content processing apparatus according to claim 9, wherein said second communication section receives reliability information corresponding to the group ID from said content distribution server, and
said first communication section transmits the reliability information received by said second communication section to said content reproduction apparatus.

11. The content processing apparatus according to claim 9, wherein said second communication section receives a reliable group ID from said content distribution server, and
said first communication section transmits the received reliable group ID to said content reproduction apparatus.

12. A content reproduction controlling method for controlling a content reproduction apparatus to reproduce a content, comprising:
storing, into a group ID storage section, a group ID produced uniquely in accordance with a user account when said content reproduction apparatus is registered in the user account on a management server;
transmitting, via a radio transmitter, content stored in a content storage section to a different apparatus by radio communication;
receiving, via a radio receiver, content transmitted from the different apparatus by radio communication;
deciding, in a reproduction decision section and based on a group ID included in the received content and the group ID stored in said group ID storage section, whether or not the received content can be reproduced;
reproducing, in a content reproduction section, the received content when content reproduction is decided;
recording a content ID and the group ID corresponding to the reproduced content into an ID storage section; and
transmitting, from a transmitter, the content ID and the group ID recorded in said ID storage section to said content distribution server, when the content reproduction apparatus and a content distribution server are directly or indirectly connected.

13. A content processing method for controlling a content processing apparatus to process a content, comprising:
deciding, in a connection decision section, whether connection is to be established to a content reproduction apparatus which stores a group ID produced uniquely according to a user account when said content processing apparatus is registered in the user account on a management server;
receiving, at a receiver and when connection to said content reproduction apparatus is to be established, a content ID corresponding to content reproduced in the content reproduction apparatus and the group ID stored in said content reproduction apparatus;

transmitting, from a transmitter, the content ID and the group ID to a content distribution server which provides a content download;

storing a additional content corresponding to the content ID received from said content distribution server into a content storage section; and transmitting the stored additional contents to said content reproduction apparatus.

14. A non-transitory computer-readable medium storing computer-readable instructions thereon, the computer-readable instructions when executed by a computer cause the computer to perform the method comprising:

storing, into a group ID storage section of a content reproduction apparatus, a group ID produced uniquely according to a user account when said content reproduction apparatus is registered in the user account on a management server;

transmitting, from the content reproduction apparatus, content stored in a content storage section to a different apparatus by radio communication;

receiving, at the content reproduction apparatus, content transmitted from the different apparatus by radio communication;

deciding, based on a group ID included in the received content and the group ID stored in said group ID storage section, whether the received content can be reproduced;

reproducing the received content when content reproduction is decided;

recording a content ID corresponding to the reproduced content and the group ID added to the content into an ID storage section; and transmitting, from the content reproduction apparatus, the content ID and the group ID recorded in said ID storage section to said content distribution server, when the content reproduction apparatus and the content distribution server are directly or indirectly connected.

15. A non-transitory computer-readable medium storing computer-readable instructions thereon, the computer-readable instructions when executed by a computer cause the computer to perform the method comprising:

deciding, at a content processing apparatus, whether connection is to be established to a content reproduction apparatus which stores a group ID produced uniquely according to a user account when said content processing apparatus is registered in the user account on a management server;

receiving, at the content processing apparatus, when the connection to said content reproduction apparatus is to be established, content ID corresponding to reproduced content and the group ID stored in said content reproduction apparatus;

transmitting the content ID and the group ID to a content distribution server which provides a content download;

storing additional content corresponding to the content ID and received from said content distribution server into a content storage section of the content processing apparatus; and transmitting the additional stored contents to said content reproduction apparatus.

\* \* \* \* \*